United States Patent
Okamoto et al.

(10) Patent No.: US 9,459,155 B2
(45) Date of Patent: Oct. 4, 2016

(54) METHOD FOR MEASURING OPTICAL PHASE, DEVICE FOR MEASURING OPTICAL PHASE, AND OPTICAL COMMUNICATION DEVICE

(71) Applicant: NATIONAL UNIVERSITY CORPORATION HOKKAIDO UNIVERSITY, Sapporo-shi, Hokkaido (JP)

(72) Inventors: Atsushi Okamoto, Sapporo (JP); Jin Nozawa, Sapporo (JP); Yuta Wakayama, Sapporo (JP)

(73) Assignee: NATIONAL UNIVERSITY CORPORATION HOKKAIDO UNIVERSITY, Sapporo-Shi, Hokkaido (JP)

(*) Notice: Subject to any disclaimer, the term of this patent is extended or adjusted under 35 U.S.C. 154(b) by 0 days.

(21) Appl. No.: 14/431,593

(22) PCT Filed: Sep. 27, 2013

(86) PCT No.: PCT/JP2013/005774
§ 371 (c)(1),
(2) Date: Mar. 26, 2015

(87) PCT Pub. No.: WO2014/050141
PCT Pub. Date: Apr. 3, 2014

(65) Prior Publication Data
US 2015/0253197 A1    Sep. 10, 2015

(30) Foreign Application Priority Data
Sep. 27, 2012 (JP) .................. 2012-215000

(51) Int. Cl.
*H04B 10/08* (2006.01)
*G01J 9/02* (2006.01)
(Continued)

(52) U.S. Cl.
CPC ............... *G01J 9/02* (2013.01); *G01J 9/0215* (2013.01); *G03H 1/0443* (2013.01);
(Continued)

(58) Field of Classification Search
CPC ..... H04B 10/00; H04B 10/0795; G01J 9/02; G01J 3/45; G01J 9/0215; G01J 9/04; G01J 1/08; G03H 1/00; G03H 1/0443; G03H 1/0866; G03H 1/12; G03H 2001/0447; G03H 2001/0458; G03H 2226/13; H01S 5/4012
USPC ................. 398/25, 28, 38, 202, 30, 32, 33
See application file for complete search history.

(56) References Cited

U.S. PATENT DOCUMENTS

| 3,694,088 A * | 9/1972 | Gallagher ........... G01J 9/02 356/495 |
| 4,759,628 A * | 7/1988 | Tatsuno ................ G01J 9/04 356/489 |

(Continued)

FOREIGN PATENT DOCUMENTS

| JP | 06-014324 A | 1/1994 |
| JP | 11-194011 A | 7/1999 |

(Continued)

OTHER PUBLICATIONS

International Search Report dated Nov. 12, 2013 in International Application No. PCT/JP2013/005774.
(Continued)

*Primary Examiner* — Hibret Woldekidan
(74) *Attorney, Agent, or Firm* — Nath, Goldberg & Meyer; Jerald L. Meyer; Stanley N. Protigal

(57) ABSTRACT

The present invention relates to an optical phase measuring method and an optical phase measuring device which can measure phase information contained in an object beam with high accuracy. Intensity distributions of a test object beam, a first reference beam and a first hologram made from the object beam and the first reference beam are detected by the first light intensity detection section. Intensity distributions of the test object beam, a second reference beam and a second hologram made from the object beam and the second reference beam are detected in the second light intensity detection section. Phase information contained in the object beam is computed on the basis of the intensity distributions detected in the first light intensity detection section and the intensity distributions detected in the second light intensity detection section.

8 Claims, 53 Drawing Sheets

(51) Int. Cl.
*G03H 1/08* (2006.01)
*H04B 10/00* (2013.01)
*H04B 10/079* (2013.01)
*G03H 1/12* (2006.01)
*G03H 1/04* (2006.01)

(52) U.S. Cl.
CPC .......... *G03H 1/0866* (2013.01); *H04B 10/00* (2013.01); *H04B 10/0795* (2013.01); *G03H 1/12* (2013.01); *G03H 2001/0447* (2013.01); *G03H 2001/0458* (2013.01); *G03H 2226/13* (2013.01)

(56) References Cited

U.S. PATENT DOCUMENTS

| | | | | |
|---|---|---|---|---|
| 5,555,128 | A * | 9/1996 | Khoury | G03H 1/00 359/10 |
| 6,028,686 | A * | 2/2000 | Mirell | G01J 1/08 356/450 |
| 6,118,560 | A * | 9/2000 | Stappaerts | G03H 1/26 359/22 |
| 6,721,094 | B1 * | 4/2004 | Sinclair | G01B 9/04 356/445 |
| 6,809,845 | B1 * | 10/2004 | Kim | G03H 1/0866 356/457 |
| 6,885,449 | B1 * | 4/2005 | Cook | G01B 9/08 356/237.1 |
| 7,034,271 | B1 * | 4/2006 | Sinclair | G02B 21/18 250/201.3 |
| 7,054,556 | B2 * | 5/2006 | Wan | H04B 10/505 398/32 |
| 7,158,723 | B2 * | 1/2007 | Wan | H04B 10/505 398/183 |
| 7,609,388 | B2 * | 10/2009 | Arieli | G01J 9/02 356/512 |
| 7,643,157 | B2 * | 1/2010 | Takizawa | G01J 9/0215 356/520 |
| 7,660,534 | B2 * | 2/2010 | Al-Chalabi | H04B 10/806 398/113 |
| 7,725,026 | B2 * | 5/2010 | Patel | A61K 8/25 398/16 |
| 7,791,737 | B2 * | 9/2010 | Doerband | G01B 9/02039 356/512 |
| 8,309,900 | B1 * | 11/2012 | Marron | G03H 1/0443 250/208.1 |
| 8,687,253 | B2 * | 4/2014 | Yu | G03H 1/0443 359/22 |
| 8,817,585 | B2 * | 8/2014 | Okamoto | G11B 7/0065 369/103 |
| 9,176,054 | B2 * | 11/2015 | Matsubara | G01B 9/02024 |
| 2002/0181035 | A1 * | 12/2002 | Donoghue | G02B 5/32 359/10 |
| 2008/0174786 | A1 | 7/2008 | Takizawa et al. | |
| 2008/0198432 | A1 * | 8/2008 | Tanaka | G11B 7/1369 359/32 |
| 2011/0149298 | A1 * | 6/2011 | Arieli | G01J 9/02 356/521 |
| 2013/0215730 | A1 * | 8/2013 | Okamoto | G11B 7/0065 369/103 |
| 2014/0233942 | A1 * | 8/2014 | Kanter | G01S 17/102 398/25 |
| 2014/0327735 | A1 * | 11/2014 | Ruchet | G02B 6/385 348/40 |

FOREIGN PATENT DOCUMENTS

| | | |
|---|---|---|
| JP | 2000-329514 A | 11/2000 |
| JP | 2003-148933 A | 5/2003 |
| JP | 2005-024248 A | 1/2005 |
| JP | 2008-185582 A | 8/2008 |
| WO | 2011/052405 A1 | 5/2011 |
| WO | 2012/053198 A1 | 4/2012 |

OTHER PUBLICATIONS

Cuche, et al., "Spatial filtering for zero-order and twin-image elimination in digital off-axis holography", Applied Optics, vol. 39, No. 23, pp. 4070-4075, Aug. 10, 2000.

Shaked, et al., "Two-step-only phase-shifting interferometry with optimized detector bandwidth for microscopy of live cells", Optics Express, vol. 17, No. 18, pp. 15585-15591, Aug. 31, 2009.

Gabor, et al., "Interference Microscope with Total Wavefront Reconstruction", Journal of the Optical Society of America, vol. 56, No. 7, pp. 849-858, Mar. 9, 1966.

Yamaguchi, et al., "Image formation in phase-shifting digital holography and application to microscopy", Optical Society of America, vol. 40, No. 34, pp. 6177-6186, Dec. 1, 2001.

Hariharan, Optical Holography: Principles, techniques, and applications, Second Edition, New York: Press Syndicate of University of Cambridge, 1996.

Meng, et al., "Two-step phase-shifting interferometry and its application in image encryption", Optics Letters, vol. 31, No. 10, pp. 1414-1416, May 15, 2006.

Awatsuji, et al., "Parallel two-step phase-shifting digital holography", Applied Optics, vol. 47, No. 19, pp. D183-D189, Jul. 1, 2008.

McMichael, et al., "Correction of polarization and modal scrambling in multimode fibers by phase conjugation", Optics Letters, vol. 12, No. 7, pp. 507-509, Jul. 1987.

Feinberg, et al., "Phase-conjugating mirror with continuous-wave gain", Optics Letters, vol. 5, No. 12, pp. 519-521, Aug. 19, 1980.

Feinberg, et al., "Self-pumped, continuous-wave conjugator using internal reflection", Optics Letters, vol. 7, No. 10, pp. 486-488, Jun. 9, 1982.

* cited by examiner

METHOD FOR MEASURING OPTICAL PHASE, DEVICE FOR MEASURING OPTICAL PHASE, AND OPTICAL COMMUNICATION DEVICE

This is a National Phase Application filed under 35 U.S.C. 371 as a national stage of PCT/JP2013/005774, filed Sep. 27, 2013, an application claiming the benefit of Japanese Application No. 2012-215000, filed Sep. 27, 2012, the content of each of which is hereby incorporated by reference in its entirety.

TECHNICAL FIELD

The present invention relates to an optical phase measuring method, an optical phase measuring device and an optical communication apparatus.

BACKGROUND ART

Digital holography can highly accurately measure phase information which cannot be directly detected by a light detector, and as such plays a very important role in the field of three-dimensional measurement of object shapes, biological samples, and the like. In digital holography, a hologram (interference fringes) made from an object beam from an inspection object and a reference beam which can interfere with the object beam is acquired in the form of a digital image with use of an imaging device, and, from the distribution of the interference fringes, the intensity distribution and the phase distribution (complex amplitude distribution) of the object beam are computed. Digital holography in which the propagation angle of the object beam and the propagation angle of the reference beam are different at the time when a hologram is made as illustrated in FIG. 1 is called "off-axis digital holography." A digital holography in which the propagation angle of the object beam and the propagation angle of the reference beam are identical to each other is called "on-axis digital holography."

The following describes the principles and problems of spatial filtering and phase-shifting interferometry, which are typical methods for measuring a complex amplitude distribution in digital holography.

(Spatial Filtering)

In off-axis digital holography, a complex amplitude of an object beam can be computed from one hologram (Non-PTL 1). When a reference beam which is a plane wave having a uniform intensity distribution and a uniform phase interferes with an object beam while being shifted by angle θ with respect to the object beam as illustrated in FIG. 1, hologram H made from object beam O (Expression (1)) and reference beam R (Expression (2)) is expressed by Expression (3).

[Expression 1]

$$O = A_0 \exp(i\phi) \quad (1)$$

$$R = A_r \exp(i\psi + i\theta) \quad (2)$$

$$H = |O|^2 + |R|^2 + O^*R + OR^* \quad (3)$$

where $A_o$ and $A_r$ are amplitudes of object beam O and reference beam R, respectively, and $\phi$ and $\psi$ are phases of object beam O and reference beam R, respectively. In Expression (3), the first term and second term on right side represent the zero-order beam (direct current component), the third term represents the + primary beam (conjugate image), and the fourth term represents the − primary beam (real image).

The − primary beam, an object beam component, can be extracted from the above-mentioned beams by applying Fourier transform to Expression (3) by virtual reference beam $R_D$ (Expression (4)) which is called a digital reference beam and simulated in a calculator, and by performing spatial filtering in accordance with Nyquist aperture W around the center of the frequency of the real image to perform inverse Fourier transform (Expression (5)), as illustrated in FIG. 2.

[Expression 2]

$$R_D \equiv 1/R^* \quad (4)$$

$$O = \mathrm{IFT}\{\mathrm{FT}[H_1 R_D] \times W\} \quad (5)$$

where FT and IFT are Fourier transform and inverse Fourier transform, respectively.

In order to effectively extract the − primary beam in the frequency space, it is necessary to sufficiently increase angle θ. However, there is a problem that the resolution of the object beam component significantly decreases as angle θ increases. In addition, there is a limitation that the real image cannot be properly reproduced when angle θ is greater than maximum incident angle $\theta_{max}$ (Expression (6)) defined by the Nyquist frequency.

[Expression 3]

$$\theta_{max} = \arcsin\left(\frac{\lambda}{2\Delta x}\right) \quad (6)$$

where λ represents the wavelength of an object beam and a reference beam, and Δx represents the pixel width of the imaging device.

Expression (6) means that interval Λ of the interference fringes (Expression (7)) is excessively narrowed in comparison with pixel width Δx of the imaging device when θ is greater than $\theta_{max}$ (θ>$\theta_{max}$). This suggests that the sampling theorem cannot be satisfied in the recorded hologram. For example, when wavelength λ is 0.532 μm and the pixel width Δx is 3.75 μm, maximum incident angle $\theta_{max}$ is 4.07°.

[Expression 4]

$$\Lambda = \frac{\lambda}{2\sin\theta} \quad (7)$$

As described above, the greater angle θ between the object beam and the reference beam, the − primary beam can be more effectively extracted. When a record-reproduce simulation of a digital holography is performed with θ being set at 4.00 degrees which is close to maximum incident angle $\theta_{max}$ in the above-mentioned example, a striped pattern is undesirably formed in the reproduced image, since the zero-order beam and the − primary beam are not sufficiently separated as illustrated in FIG. 3. In order to separate the zero-order beam and the − primary beam from each other, it is necessary to calculate the diffraction propagation of the reproducing image by Fresnel diffraction integral and the like to compute the complex amplitude of the distance where the zero-order beam and the − primary beam are not spatially superimposed in a numerical analysis manner. This, however, requires to adjust the distance between the object and the imaging device such that the zero-order beam and the − primary beam can be spatially separated from each other. In such a configuration, the size of the optical system is large, and high-frequency components do not incident on the imaging device, and therefore it is difficult to achieve high resolution.

Under such circumstances, a method has been proposed in which a – primary beam is efficiently extracted even when angle θ is small (Non-PTL 2). In the method disclosed in Non-PTL 2, two reference beams with different phases are used to make two holograms, and the difference thereof is obtained to eliminate the zero-order beam component, whereby a real image is effectively computed. Two holograms $H_1$ and $H_2$ are expressed by Expression (8) and Expression (9), respectively, with the phase difference between the holograms being ψ.

[Expression 5]

$$H_1 = |O_1|^2 + |R_1|^2 + O_1^* R_1 + O_1 R_1^* \quad (8)$$

$$H_2 = |O_2|^2 + |R_2|^2 + O_2^* R_2 + O_2 R_2^* \quad (9)$$

where object beams $O_1$ and $O_2$ making two holograms $H_1$ and $H_2$ are expressed by Expression (10) and Expression (11), respectively. In addition, reference beams $R_1$ and $R_2$ making two holograms $H_1$ and $H_2$ are expressed by Expression (12) and Expression (13), respectively.

[Expression 6]

$$O_1 = A_{o1} \exp(i\phi_1) \quad (10)$$

$$O_2 = A_{o2} \exp(i\phi_2) \quad (11)$$

$$R_1 = A_{r1} \exp(i\psi_1 + i\theta) \quad (12)$$

$$R_2 = A_{r2} \exp(i\psi_2 + i\theta) \quad (13)$$

In the method disclosed in Non-PTL 2, $A_{o1}$, $A_{o2}$, $A_{r1}$, $A_{r2}$, $\phi_1$ and $\phi_2$ are assumed as in Expression (14) to Expression (16), and the object beam and the reference beam are assumed as in Expression (17) and Expression (18), respectively, whereby Expression (8) and Expression (9) are rewritten as Expression (19) and Expression (20).

[Expression 7]

$$A_o \equiv A_{o1} = A_{o2} \quad (14)$$

$$A_r \equiv A_{r1} = A_{r2} \quad (15)$$

$$\phi \equiv \phi_1 = \phi_2 \quad (16)$$

$$O \equiv A_o \exp(i\phi) \quad (17)$$

$$R \equiv A_r \exp(i\theta) \quad (18)$$

$$H_1 = |O|^2 + |R|^2 + O^* R \exp(i\psi_1) + OR^* \exp(-i\psi_1) \quad (19)$$

$$H_2 = |O|^2 + O^* R \exp(i\psi_2) + OR^* \exp(-i\psi_2) \quad (20)$$

The difference between Expression (19) and Expression (20) is expressed by Expression (21), in which the zero-order beam is eliminated and only the ± primary beams remain. With use of this relationship, the object beam component can be computed as expressed by Expression (22) similarly to Expression (5).

[Expression 8]

$$H_1 - H_2 = O^* R[\exp(i\psi_1) - \exp(i\psi_2)] + OR^*[\exp(-i\psi_1) - \exp(-i\psi_2)] \quad (21)$$

$$O = \frac{IFT\{FT[(H_1 - H_2)R_D] \times W\}}{\exp(-i\psi_1) - \exp(-i\psi_2)} \quad (22)$$

When the method disclosed in Non-PTL 2 is applied, the zero-order beam component, which cannot be completely eliminated by the conventional off-axis digital holography (see FIG. 2), can be sufficiently removed as illustrated in FIG. 4 and FIG. 5. However, with the method disclosed in Non-PTL 2, since an image is reproduced after spatial filtering is performed, the image is undesirably blurred (see FIG. 5). In addition, since Fourier transform is required to be performed twice before the complex amplitude is computed, the calculation cost is high, and discretization errors and calculation errors of numerical calculations are undesirably accumulated. As a result, it is difficult to measure complex amplitude with high accuracy. Further, when Fourier transform is performed, it is necessary to expand the analysis area at least fourfold in order to enhance the calculation accuracy, and a process (zero padding) for appending zero to the expanded part is required to be performed. When the number of pixels of the imaging device is represented by $N^2$, the calculation quantity is $4N^2 \log(2N)$ even when only the part subject to Fourier transform is taken into consideration. Accordingly, the computer is required to have a sufficient memory region and a sufficient arithmetic speed. As such, in the off-axis digital holography, it is difficult to measure phase information with high accuracy.

(Phase-Shifting Interferometry)

On the other hand, on-axis digital holography can maximize the resolution of an imaging device. For this reason, in recent years, on-axis digital holography is most broadly studied and developed as a method having a potential to detect a complex amplitude of an object beam with high definition and high accuracy. In on-axis digital holography, three optical waves, a zero-order beam and ± primary beams, propagate at the same angle, and therefore the waves cannot be effectively separated by a space filter. Therefore, in on-axis digital holography, a phase measurement method called phase-shifting interferometry is used.

Digital holography utilizing phase-shifting interferometry is called phase-shift digital holography. In phase-shift digital holography, multiple holograms in which phases of reference beams are different from each other are recorded by an imaging device, and complex amplitude information of an object beam is computed from the holograms. The type of phase-shift digital holography is classified by the method of changing the phase of a reference beam, number of required holograms, and the like. For example, phase-shift digital holography is roughly categorized by the method of changing the phase of a reference beam into sequential type (sequential phase-shift digital holography) in which the phase is changed in a time-dependent manner, and parallel type (parallel phase-shift digital holography) in which the phase is spatially changed. In addition, phase-shift digital holography is roughly categorized by the required number of holograms into a 4-step method using four holograms, a 3-step method using three holograms, a 2-step method using two holograms, and the like. It is to be noted that, in phase-shift digital holography, at least two holograms are required.

Sequential phase-shifting interferometry is a scheme in which the phase of a reference beam is sequentially changed with use of a piezoelectric element and the like to sequentially acquire multiple holograms. FIG. 6 illustrates a configuration of a sequential phase shift interferometer used in sequential phase-shifting interferometry. FIG. 7 shows procedures of sequential phase-shifting interferometry (4-step method), and FIG. 8 shows procedures of sequential phase-shifting interferometry (2-step method). In FIGS. 7 and 8, $O_1$ to $O_4$, and O represent object beams, $R_1$ to $R_4$ represent reference beams, and $H_1$ to $H_4$ represent holograms. As illustrated in FIGS. 7 and 8, in the sequential scheme, phases of object beams are computed from holograms recorded at different times, and therefore a large measurement error may possibly be caused when phase information of an object beam from an object that changes with time (for example, microbe) is measured.

Parallel phase-shifting interferometry is a scheme in which a reference beam is spatially split, and the phase is changed for each of the split reference beams with use of a phase shift array device and the like to simultaneously acquire multiple holograms. FIG. 9 illustrates a configuration of a phase-shifting interferometer used in parallel phase-shifting interferometry. FIG. 10 illustrates an operation of a phase shift array device in a phase-shifting interferometer. FIG. 11 illustrates division of a hologram and interpolation of pixels in parallel phase-shifting interferometry. FIG. 12 illustrates procedures in parallel phase-shifting interferometry (2-step method). In FIGS. 12, $O_1$ and O represent object beams, $R_0$ to $R_2$ represent reference beams, and H, $H_1$, and $H_2$ represent holograms. Parallel phase-shifting interferometry can measure phase information in a short time, but at the same time has a disadvantage that a measurement error in association with the interpolation is inevitably caused (see FIG. 11).

As described above, in the phase-shifting interferometry, at least two holograms are required. A method of reproducing an object beam from two holograms was first proposed by Gabor et al. in 1966 (Non-PTL 3). The method proposed by Gabor el at., however, has the problem of complicated optical system. For this reason, today, methods have been broadly used which can be achieved with a simple optical system, with which an object beam is reproduced from three (Non-PTL 4) or four (Non-PTL 5) holograms. In particular, phase-shifting interferometry of a sequential scheme using four holograms illustrated in FIG. 7 has been most frequently used because of its simple calculation formula. The 4-step method can be achieved with a simple optical system; however, the 4-step method requires a large number of holograms and lacks high-speed performance, and therefore the temporal change of an object beam cannot be handled. Likewise, parallel phase-shifting interferometry using four holograms requires a large number of holograms, and thus has the problem of occurrence of large interpolation errors. Further, in the 4-step method, only the proportional relationship of the amplitude can be evaluated, and the proportional constant cannot be computed, and therefore, the amplitude value cannot be determined.

Under such circumstances, sequential phase-shifting interferometry (2-step method) has been proposed in which an object beam can be reproduced from two holograms with use of a simple optical system illustrated in FIG. 8 (Non-PTL 6). In this method, from Expression (19) and Expression (20) in which $\theta=0$, $\psi_1=0$, and $\psi_2=\pi/2$, the complex amplitude of object beam O is obtained as follows (Expression (23) to Expression (26)).

[Expression 9]

$$H_1 = |A_o|^2 + |A_r|^2 + 2A_0 A_r \cos\phi \quad (23)$$

$$H_2 = |A_o|^2 + |A_r|^2 + 2A_0 A_r \sin\phi \quad (24)$$

$$O = A_o \exp(i\phi) \quad (25)$$
$$= \frac{H_1 - I}{2A_r} + i\frac{H_2 - I}{2A_r}$$

$$2I = H_1 + H_2 + 2A_r^2 - \left[(H_1 + H_2 + 2A_r^2)^2 - 2(H_1^2 + H_2^2 + 4A_r^4)\right]^{1/2} \quad (26)$$

While the phase of the reference beam may have any values, $\psi_1=0$ and $\psi_2=\pi/2$ which are widely used are assumed in this case. As illustrated in FIG. 8, in this method, intensity distribution $|R_1|^2$ of the reference beam is required to be preliminary recorded before the measurement. However, after intensity distribution $|R_1|^2$ of the reference beam is once recorded and stored, the phase measurement can be continuously performed unless its distribution is changed. In addition, while a reference beam having a uniform intensity distribution is required to be prepared in the 4-step method, the intensity distribution of a reference beam is not required to be uniform in the 2-step method according to Non-PTL 6 as long as the intensity of the reference beam is more than double the intensity of the object beam. Further, the 2-step method according to Non-PTL 6 can compute the value of amplitude, and therefore is highly usable.

The 2-step method according to Non-PTL 6 is a breakthrough method in which the required number of holograms can be reduced from four to two with use of a simple optical system. In the 2-step method according to Non-PTL 6, the calculation quantity is $N^2$, and therefore calculation cost can be considerably reduced in comparison with the above-mentioned method that requires Fourier transform. However, since it is necessary to image at least two holograms having different phases, the frame rate of the imaging device decreases to one-half or less in the case of the sequential scheme. Thus, the 2-step method according to Non-PTL 6 has a problem that a large measurement error is caused when the phase information of an object which changes with time is measured.

In addition, when the 2-step method according to Non-PTL 6 is applied in the parallel scheme, it is necessary to modulate the phase of a reference beam in a unit of at least two pixels with use of a special phase shift array device as illustrated in FIG. 10. Thus, disadvantageously, the resolution of the imaging device is halved, and interpolation errors for interpolating the resolution are inevitably caused as illustrated in FIG. 11 (Non-PTL 7). Here, the "interpolation error" does not refers to simple reduction in resolution, but refers to increase in measurement error caused by the phase measurement which is performed on the basis of the interpolated information. The interpolation error cannot be prevented from occurring by increasing the resolution of the imaging device. In addition, the phase shift array device causes unnecessary diffraction phenomenon, which is a cause of noise. Further, in the 2-step method according to Non-PTL 6, the spatial division for acquiring a hologram is not assumed unlike parallel phase-shifting interferometry, and therefore only one of intensity distributions ($|R_1|^2$ and $|R_2|^2$) of two reference beams $R_1$ and $R_2$ is allowed to be taken into consideration as illustrated in FIG. 12. In general, there is a difference between these intensity distributions, and thus measurement errors are caused.

A diversity scheme (diversity phase-shifting interferometry) has been proposed (PTL 1) as illustrated in FIG. 13 and FIG. 14, as a method for solving both of the problems of the above-mentioned sequential scheme and parallel scheme. In the diversity phase-shifting interferometry, an object beam and a reference beam are not spatially split, but multiple holograms are simultaneously recorded by generating copies of an object beam and a reference beam with use of a beam splitter. Thus, a complex amplitude distribution of an object beam can be measured with high speed and high accuracy without causing reduction in resolution and interpolation errors. The interferometer illustrated in FIG. 13 is a 4-channel holographic diversity interferometer for use in the case where the 4-step method is applied (FIG. 8 of PTL 1). In FIG. 13, "BS" is a beam splitter, "PBS" is a polarization beam splitter, "HWP" is a ½ wavelength plate, and "QWP" is a ¼ wavelength plate. In this interferometer, the required number of imaging devices can be reduced by designing the optical arrangement with use of a mirror and the like; however, the optical system is complicated and the size is increased since it is necessary to ensure four image regions. Under such circumstances, as illustrated in FIG. 15 and FIG. 16, a two-channel holographic diversity interferometer has been proposed (FIG. 15 of PTL 1) in which the number of holograms to be simultaneously recorded is reduced by adopting the 2-step method.

Holographic diversity interferometry (2-step method) can considerably simplify the optical system to downsize the apparatus. Holographic diversity interferometry (2-step method), however, can take the intensity distribution of only one of two reference beams into consideration, as with parallel phase-shifting interferometry. For this reason, when there is a difference between the intensity distributions of two reference beams, measurement error is caused. In an actual system, a difference in intensity distributions of an object beam and a reference beam may possibly be caused due to difference in light receiving sensitivity between imaging devices, the roughness of the surface shape of the optical device and the like, thus reducing the accuracy of measurement.

In all of the above-mentioned sequential scheme, parallel scheme and diversity scheme, the measurement accuracy is largely dependent on the difference in intensity distributions of an object beam and a reference beam between holograms in the phase-shifting interferometry. Table 1 shows characteristics of the above-mentioned schemes. FIGS. 17A to 17F show measurement errors which may possibly be caused in the schemes. The measurement errors shown in FIGS. 17A to 17F were analytically computed on the basis of Expression (23) to Expression (26). The "Intensity ratio of reference beams" in FIGS. 17A and 17B are defined by (intensity of object beam of hologram $H_2$)/(intensity of object beam of hologram $H_1$). The "Intensity ratio of reference beams" in FIGS. 17E and 17F is defined by (intensity of reference beam of hologram $H_2$)/(intensity of reference beam of hologram $H_1$). The "$\phi_1$" and "$\phi_2$" in FIGS. 17C and 17D are phases of object beams in holograms $H_1$ and $H_2$, respectively.

TABLE 1

|  | Sequential scheme | Parallel scheme | Diversity scheme |
| --- | --- | --- | --- |
| Time resolution | Low | High | High |
| Space resolution | High | Low | High |
| Difference in intensity of object beam between holograms | Large | Large | Small |
| Difference in phase of object beam between holograms | Large | Large | Negligible |
| Difference in intensity of reference beam between holograms | Negligible | Small | Small |
| Difference in phase of reference beam between holograms | Negligible | Negligible | Negligible |

As shown in Table 1, in the sequential scheme, the time resolution is low, and therefore, when the phase information of a moving object is measured, the intensity distribution and the phase distribution of the object beam may largely vary between holograms. Meanwhile, it can be said that, except for the phase difference to be given, only an intensity difference and a phase difference which are negligible in terms of time and space are caused since the reference beam is recorded without spatial division. Accordingly, in this case, measurement errors shown in FIGS. 17A to 17D may possibly be caused.

In the parallel scheme, since multiple holograms can be acquired by a single imaging, the time resolution is high. However, since a hologram is acquired in a spatially dividing manner in the parallel scheme, it is necessary to interpolate the intensity distribution and the phase distribution of an object beam and the intensity distribution of a reference beam, and thus an interpolation error is inevitably caused. Consequently, in the parallel scheme, a large measurement error may possibly be caused depending on the interpolation accuracy and the shape of the inspection object. In this case, the measurement errors shown in FIGS. 17A to 17F may possibly be caused.

The diversity scheme can achieve a high resolution, in terms of time and space. However, in the diversity scheme, a measurement error may be caused by a difference in intensity distributions of an object beam and a reference beam due to difference in sensitivity of imaging devices. In this case, the measurement errors shown in FIGS. 17A, 17B, 17E, and 17F may be caused.

As described, phase-shift digital holography has a potential to achieve a high-definition and highly accurate complex amplitude measurement, but at the same time has a problem that a measurement error is caused by non-uniformity in the intensity distributions of object beams and the reference beams between holograms. Therefore, a phase measurement method which can solve these problems is desired.

CITATION LIST

Patent Literature

PTL 1
WO2012/053198

Non-PTLs

Non-PTL 1
E. Cuche, P. Marquet, and C. Depeursinge, "Spatial filtering for zero-order and twin-image elimination in digital off-axis holography", Applied Optics, Vol. 39, No. 23, pp. 4070-4075.
Non-PTL 2
N. T. Shaked, Y. Zhu, M. T. Rinehart, and A. Wax, "Two-step-only phase-shifting interferometry with optimized detector bandwidth for microscopy of live cells", Optics Express, Vol. 17, No. 18, pp. 15585-15591.
Non-PTL 3
D. Gabor, and W. P. Goss, "Interference microscope with total wavefront reconstruction", Journal of the Optical Society of America, Vol. 56, No. 7, pp. 849-858.
Non-PTL 4
I. Yamaguchi, J. Kato, S. Ohta, and J. Mizuno, "Image formation in phase-shifting digital holography and applications to microscopy", Applied Optics, Vol. 40, No. 34, pp. 6177-6186.
Non-PTL 5
P. Hariharan, "Optical Holography", Cambridge U. Press, pp. 291-310.
Non-PTL 6
X. F. Meng, L. Z. Cai, X. F. Xu, X. I. Yang, X. X. Shen, G. Y. Dong, and Y. R. Wang, "Two-step phase-shifting interferometry and its application in image encryption", Optics Letters, Vol. 31, No. 10, pp. 1414-1416.

Non-PTL 7

Y. Awatsuji, T. Tahara, A. Kaneko, T. Koyama, K. Nishio, S. Uta, T. Kubota, and O. Matoba, "Parallel two-step phase-shifting digital holography", Applied Optics, Vol. 47, No. 19, pp. D183-D189.

SUMMARY OF INVENTION

Technical Problem

As mentioned above, phase-shift digital holography has a potential that, with use of a two-channel holographic diversity interferometer, two holograms which are required for phase measurement can be simultaneously acquired and a high-definition phase measurement can be achieved. However, in an actual system, propagation paths of optical waves for producing two holograms are different from each other, and due to a difference in sensitivity of pixels of imaging devices, the roughness of the surface shape of a component of an interferometer such as a beam splitter and the like, a difference in intensity distribution is inevitably caused between the two holograms, thus causing an measurement error.

In addition, the conventional phase-shift digital holography is not designed for spatial division of a hologram and use of multiple imaging devices, but is on the assumption that only one reference beam can be preliminary measured. As such, the difference in light intensity between two light detection pixels which is a problem of the parallel scheme, and the difference in light intensity between two imaging devices which is a problem of the diversity scheme cannot be handled.

An object of the present invention is to provide an optical phase measuring method and an optical phase measuring device which can compensate for non-uniformity in the intensity distributions of an object beam and a reference beam between two holograms, and can measure phase information contained in the object beam with high accuracy.

Another object of the present invention is to provide an optical communication apparatus having the optical phase measuring device.

Solution to Problem

A first aspect of the present invention relates to an optical phase measuring method described below.

[1] An optical phase measuring method of measuring phase information contained in an object beam, the method including: detecting an intensity distribution of a test object beam in a first light intensity detection section and a second light intensity detection section; generating a first reference beam and a second reference beam which have different phases by changing a phase of a reference beam which is interferable with the test object beam; detecting an intensity distribution of the first reference beam in the first light intensity detection section, and an intensity distribution of the second reference beam in the second light intensity detection section; making a first hologram from an object beam and the first reference beam, and a second hologram from the object beam and the second reference beam; detecting an intensity distribution of the first hologram in the first light intensity detection section, and an intensity distribution of the second hologram in the second light intensity detection section; and computing phase information contained in the object beam based on the intensity distribution of the test object beam, the intensity distribution of the first reference beam and the intensity distribution of the first hologram which are detected in the first light intensity detection section, and an intensity distribution of the test object beam, an intensity distribution of the second reference beam and an intensity distribution of the second hologram which are detected in the second light intensity detection section.

[2] The optical phase measuring method according to [1], wherein the reference beam is generated by extracting a low spatial frequency component from part of the object beam by spatial filtering.

A second aspect of the present invention relates to an optical phase measuring device described below.

[3] An optical phase measuring device configured to measure phase information contained in an object beam, the optical phase measuring device including: a reference beam generation section configured to generate a first reference beam and a second reference beam which have different phases by changing a phase of a reference beam which is interferable with the object beam; a first hologram making section configured to make a first hologram from the object beam and the first reference beam; a second hologram making section configured to make a second hologram from the object beam and the second reference beam; a first light intensity detection section configured to detect an intensity distribution of a test object beam, an intensity distribution of the first reference beam and an intensity distribution of the first hologram; a second light intensity detection section configured to detect an intensity distribution of the test object beam, an intensity distribution of the second reference beam and an intensity distribution of the second hologram; and a processing section configured to compute phase information contained in the object beam based on the intensity distribution of the test object beam, the intensity distribution of the first reference beam and the intensity distribution of the first hologram which are detected in the first light intensity detection section, and the intensity distribution of the test object beam, the intensity distribution of the second reference beam and the intensity distribution of the second hologram which are detected in the second light intensity detection section.

[4] The optical phase measuring device according to [3] further including a second reference beam generation section configured to generate the reference beam by extracting a low spatial frequency component from part of the object beam by spatial filtering.

[5] The optical phase measuring device according to [4], wherein the second reference beam generation section includes: a first beam splitter configured to split the object beam into two beams; a ½ wavelength plate configured to convert into 45-degree linear polarization a polarization state of one of the beams of the object beam split by the first beam splitter; a ¼ wavelength plate configured to convert into circular polarization a polarization state of the other part of the object beam split by the first beam splitter; and a space filter configured to extract a low spatial frequency component from one of the object beam of the 45-degree linear polarization and the object beam of the circular polarization to generate the reference beam.

A third aspect of the present invention relates to an optical communication apparatus described below.

[6] An optical communication apparatus including: the optical phase measuring device according to any one of [3] to [5], the optical phase measuring device being configured to receive a pilot beam sent from an external communication apparatus via an optical fiber, and to measure spatial mode propagation information contained in the pilot beam; a phase conjugation calculation section configured to compute a light complex amplitude for cancelling conversion and rotation of a mode in the optical fiber based on spatial mode propagation information measured by the optical phase measuring device; and a transmission section configured to send a beam obtained by adding a time-series signal to a beam containing the light complex amplitude to the external communication apparatus via the optical fiber.

Advantageous Effects of Invention

With the phase measurement method and the phase measuring device according to an embodiment of the present invention, phase information contained in an object beam can be measured with high accuracy. In addition, with the optical communication apparatus according to an embodiment of the present invention, a mode division multiplex communication and a mode diffusion multiplex communication can be achieved.

DESCRIPTION OF EMBODIMENTS

Figure 1:
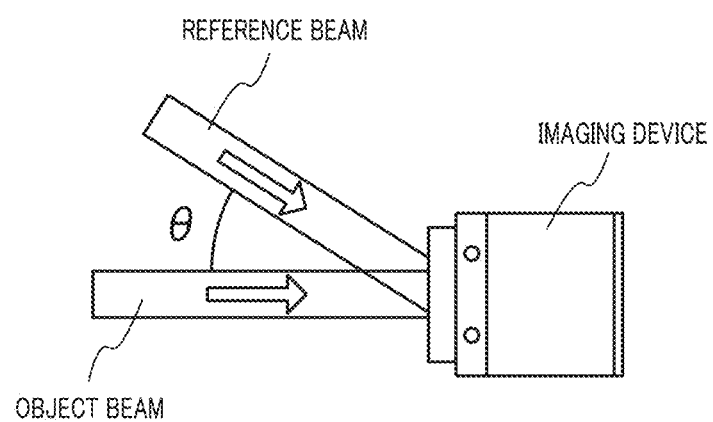
FIG. 1 illustrates an angle between an object beam and a reference beam in digital holography.
Figure 2:
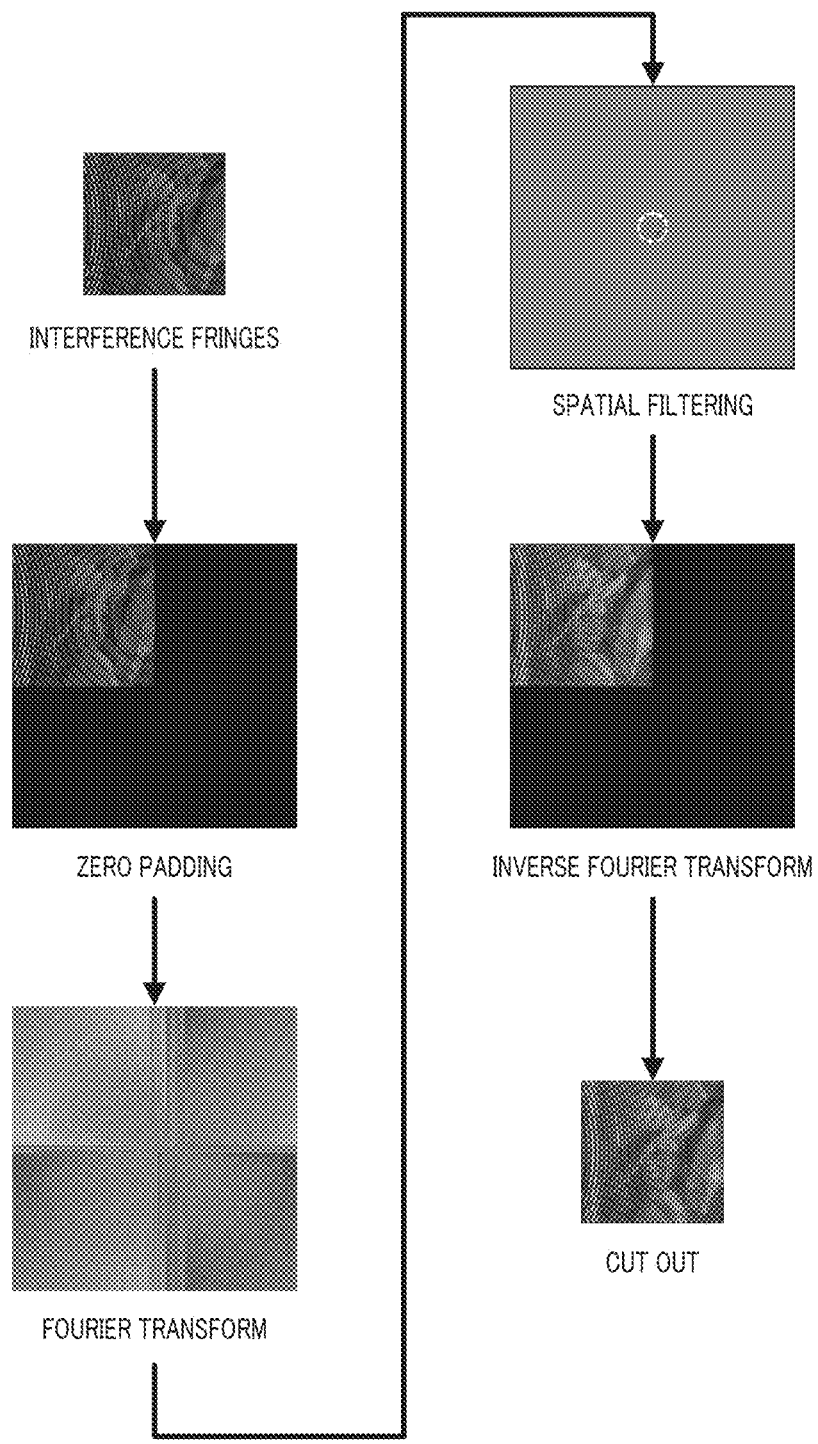
FIG. 2 illustrates reproduction processes in off-axis digital holography.
Figure 3:
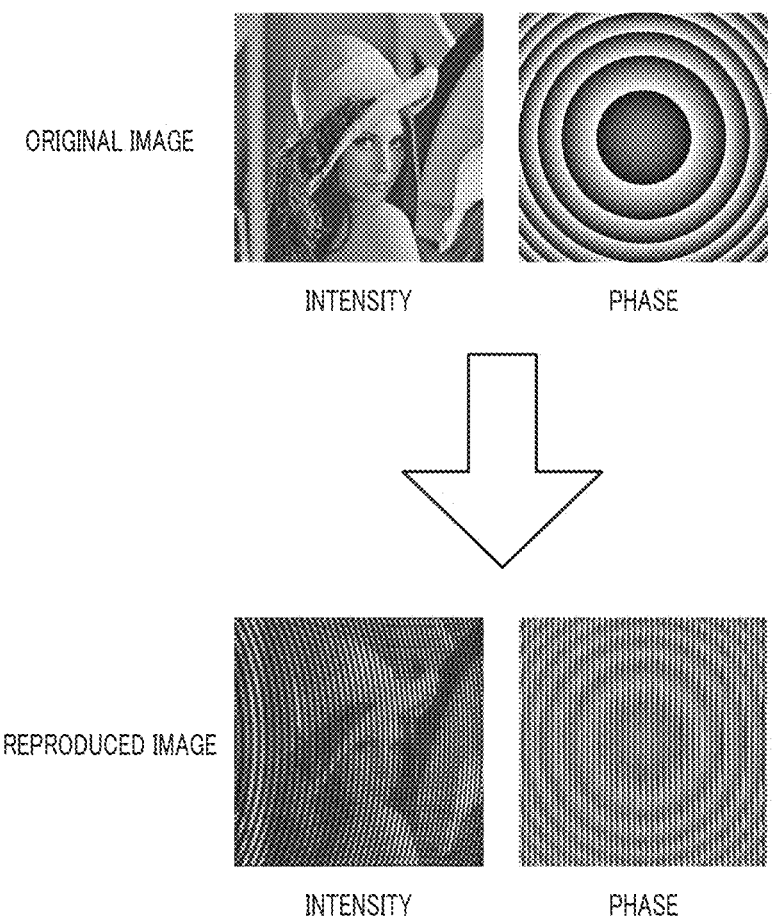
FIG. 3 illustrates a comparison between original images and reproduced images which are reproduced through the processes of FIG. 2.
Figure 4:
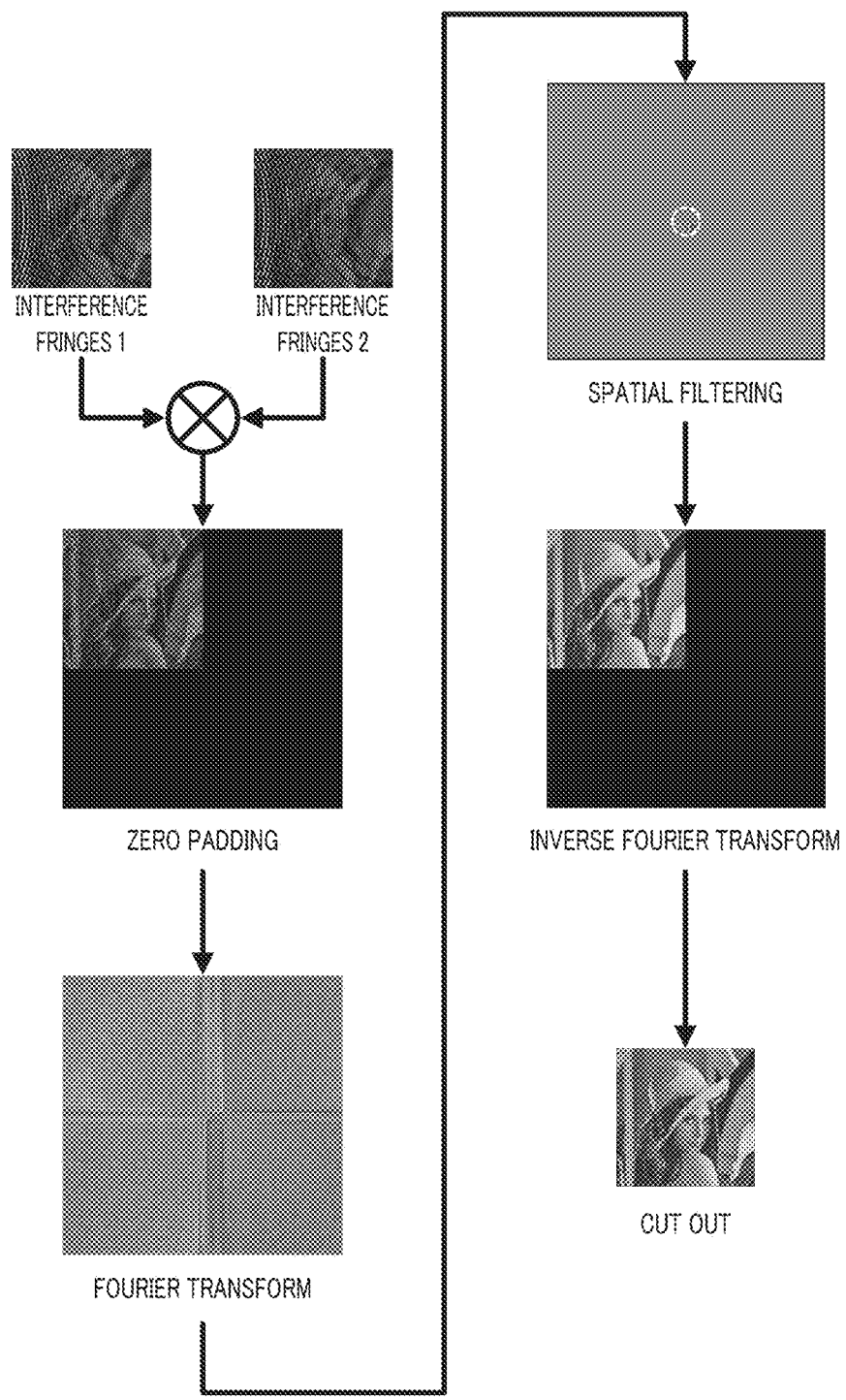
FIG. 4 illustrates reproduction processes from two holograms in off-axis digital holography.
Figure 5:
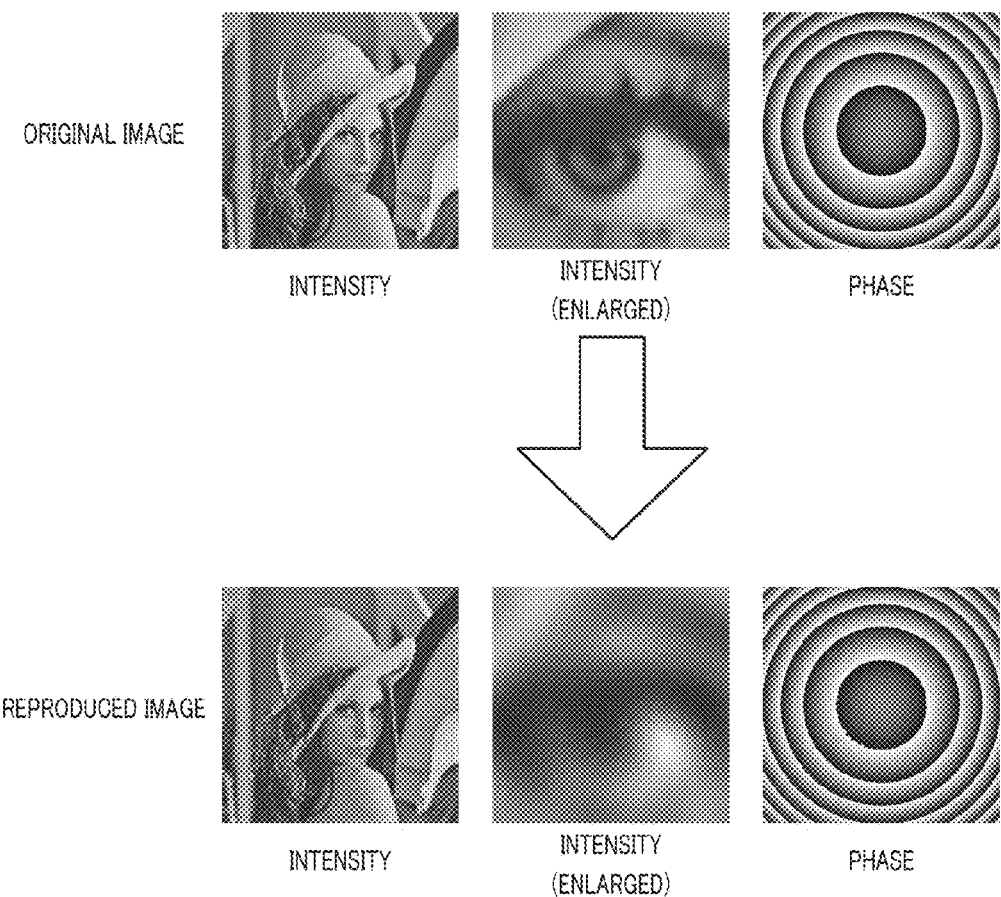
FIG. 5 illustrates a comparison between original images and reproduced images which are reproduced through the reproduction processes illustrated in FIG. 4.

1. Optical Phase Measuring Method and Optical Phase Measuring Device

An optical phase measuring method according to an embodiment of the present invention is a method of measuring phase information contained in an object beam, and includes: i) detecting an intensity distribution of a test object beam in a first light intensity detection section and a second light intensity detection section; ii) generating a first reference beam and a second reference beam which have different phases by changing a phase of a reference beam which is interferable with the test object beam; iii) detecting an intensity distribution of the first reference beam in the first light intensity detection section, and an intensity distribution of the second reference beam in the second light intensity detection section; iv) making a first hologram from an object beam and the first reference beam, and a second hologram from the object beam and the second reference beam; v) detecting an intensity distribution of the first hologram in the first light intensity detection section, and an intensity distribution of the second hologram in the second light intensity detection section; and vi) computing phase information contained in the object beam based on the intensity distribution of the test object beam, the intensity distribution of the first reference beam and the intensity distribution of the first hologram which are detected in the first light intensity detection section, and the intensity distribution of the test object beam, the intensity distribution of the second reference beam and the intensity distribution of the second hologram which are detected in the second light intensity detection section.

The phase measuring device according to the embodiment of the present invention is an optical phase measuring device suitable for implementing the optical phase measuring method, and includes a reference beam generation section, a first hologram making section, a second hologram making section, a first light intensity detection section, a second light intensity detection section, and a processing section. The reference beam generation section generates a first reference beam and a second reference beam which have different phases by changing a phase of a reference beam which is interferable with the object beam. The first hologram making section makes a first hologram from the object beam and the first reference beam. The second hologram making section makes a second hologram from the object beam and the second reference beam. The first light intensity detection section detects an intensity distribution of a test object beam, an intensity distribution of the first reference beam, and an intensity distribution of the first hologram. The second light intensity detection section detects an intensity distribution of the test object beam, an intensity distribution of the second reference beam, and an intensity distribution of the second hologram. The processing section computes phase information contained in the object beam based on the intensity distribution of the test object beam, the intensity distribution of the first reference beam, and the intensity distribution of the first hologram which are detected in the first light intensity detection section, and the intensity distribution of the test object beam, the intensity distribution of the second reference beam, and the intensity distribution of the second hologram which are detected in the second light intensity detection section.

The phase measuring device according to the embodiment of the present invention is achieved by, for example, a two-channel holographic diversity meter illustrated in FIG. 15, a phase-shifting interferometer illustrated in FIG. 9, a reference-beam unnecessary type phase measuring device described later (two-channel holographic diversity meter) and the like. In the two-channel holographic diversity meter illustrated in FIG. 15, a ¼ wavelength plate (QWP) and a polarization beam splitter (PBS1) function as a reference beam generation section. A beam splitter (BS2) and a polarization beam splitter (PBS1) function as a first hologram making section and a second hologram making section. Two imaging devices (CCD1, CCD2) function as a first light intensity detection section and a second light intensity detection section, respectively. In the phase-shifting interferometer illustrated in FIG. 9, a phase shift array device functions as a reference beam generation section. A beam splitter functions as the first hologram making section and the second hologram making section in a time dependent manner. An imaging device functions as the first light intensity detection section and the second light intensity detection section in a time dependent manner.

In the following description, the above-mentioned steps i) to iii) of the phase measurement method according to the embodiment of the present invention are referred to as "preprocessing step," and the steps iv) to vi) are referred to as "phase evaluation step." In the phase measurement method and the phase measuring device according to the embodiment of the present invention, phase information contained in an object beam is computed with use of, in addition to intensity distributions of two holograms detected by the first light intensity detection section and the second light intensity detection section in the phase evaluation step, an intensity distribution of a test object beam and intensity distributions of two reference beams detected by the first light intensity detection section and the second light intensity detection section in the preprocessing step.

In the following, the phase measurement method and the phase measuring device according to the embodiment of the present invention are described. It is to be noted that, while both of the terms "object beam" and "signal beam" are used herein, they refer to the same beam. Optical communications are described herein using the term "signal beam" in some cases.

[Outline of Phase Measurement Method of Embodiment of Present Invention]

Conventional phase-shifting interferometries (2-step method) are not designed for spatially dividing a hologram (parallel phase-shifting interferometry), or for using a plurality of imaging devices (holographic diversity interferometry), and are on the premise that only one reference beam can be measured in advance. In contrast, in the phase measurement method according to the embodiment of the present invention, the non-uniformity of intensity distributions of object beams and reference beams between two holograms, which is undesirably caused in phase shift in digital holography, is compensated to achieve highly accurate phase measurement.

In the phase measurement method according to the embodiment of the present invention, the difference of intensity distributions of object beams and reference beams between two holograms, which has not been taken into consideration, is taken into consideration, and thus measurement errors due to the difference can be eliminated. In the case where intensity distributions of an object beam (test object beam) and two reference beams can be recorded in advance before measuring phase information of the object beam, the phase measurement method according to the embodiment of the present invention can also be applied in various types of phase-shift digital holography such as phase-shift digital holography of the parallel scheme, as well as phase-shift digital holography of the diversity scheme. Moreover, the preprocessing for imaging the intensity distributions of an object beam (test object beam) and two reference beams is required to be performed only once before measuring phase information of the object beam. Thereafter, the measurement of phase information can be continuously performed unless the optical system is changed. That is, in the phase measurement method according to the embodiment of the present invention, it is only necessary to perform detection of the intensity distributions of an object beam (test object beam) and two reference beams only once before measuring the hologram. Thus, with the phase measurement method according to the embodiment of the present invention, measurement of phase information can be efficiently performed without reducing the frame rate of the imaging device in comparison with conventional phase-shifting interferometry (2-step method).

In the phase measurement method according to the embodiment of the present invention, differences of intensity distributions of object beams and reference beams between holograms are computed as coefficients for respective pixels, and thus non-uniformity of the intensity distributions between holograms can be compensated by performing the preprocessing only once. The matrix coefficient computed in this manner contains differences in intensity and in detection sensitivity among pixels which are caused depending on the difference of the light path of the devices in the interferometer and the like, and therefore, measurement errors can be eliminated by only multiplying the hologram required to be compensated by the matrix coefficient.

In the phase measurement method according to the embodiment of the present invention, the intensity distribution of the reference beam is acquired in advance, and the phase information of the object beam is measured in accordance with the distribution. Accordingly, in the phase measurement method according to the embodiment of the present invention, it is not necessary to prepare a reference beam having a uniform intensity distribution, and, by utilizing a reference beam having a high intensity relative to the object beam, phase information can be measured without causing errors even if the reference beam has a non-uniform intensity distribution.

[Difference between Phase Measurement Method of Embodiment of Present Invention and Conventional Phase-shifting Interferometry]

Figure 6:
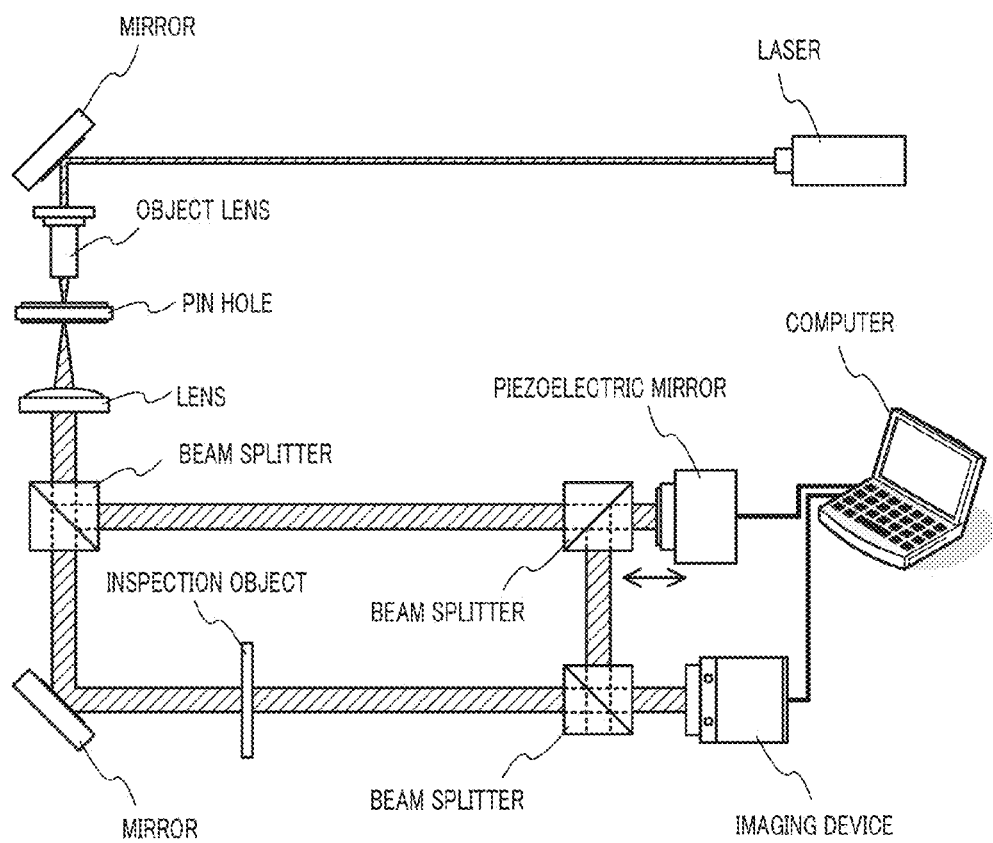
FIG. 6 illustrates a configuration of a sequential phase shift interferometer used in sequential phase-shifting interferometry.
Figure 7:
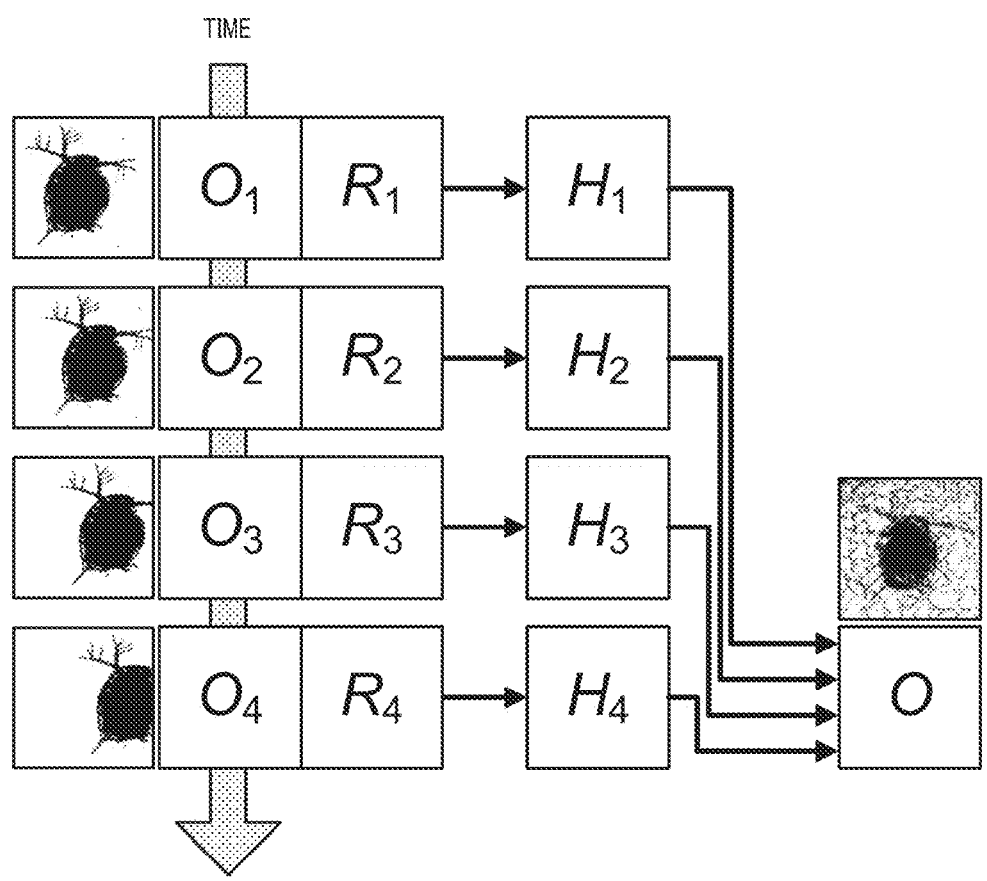
FIG. 7 illustrates procedures of sequential phase-shifting interferometry (4-step method)
Figure 8:
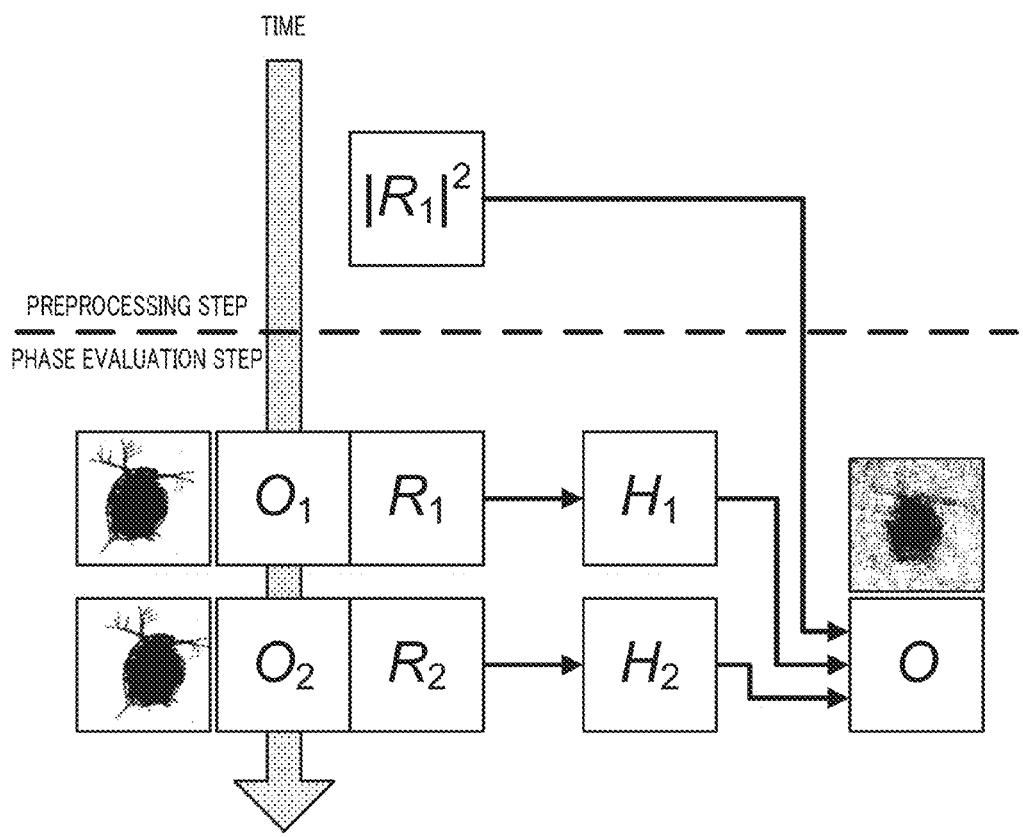
FIG. 8 illustrates procedures of sequential phase-shifting interferometry (2-step method)
Figure 18:
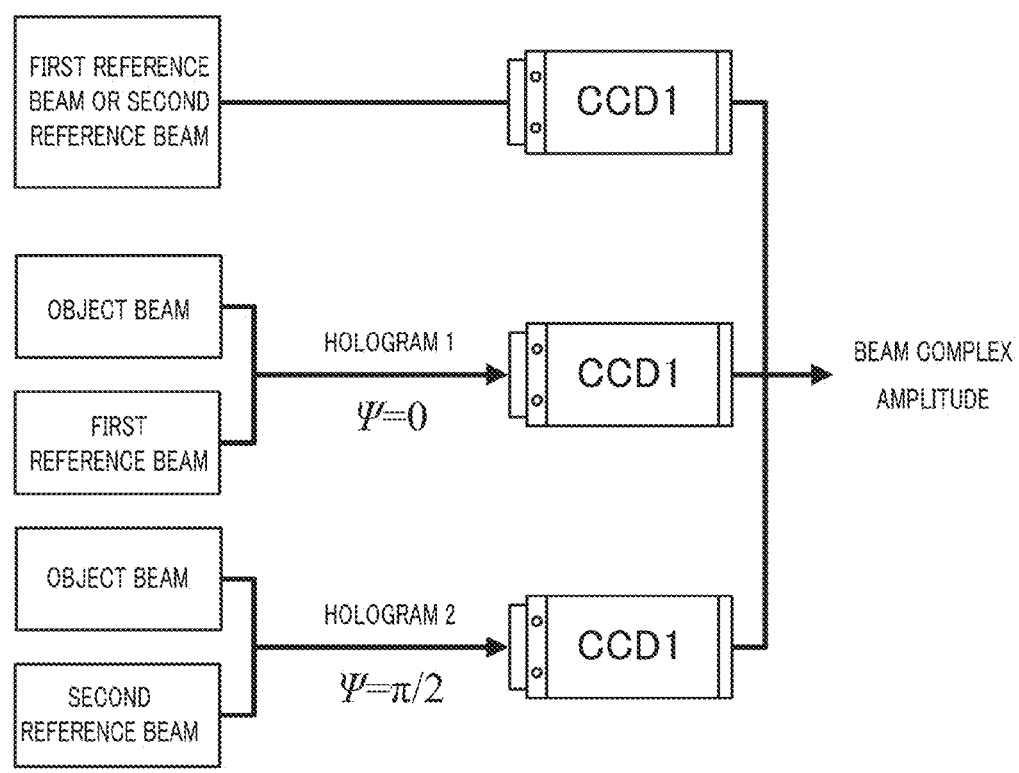
FIG. 18 illustrates an outline of a conventional sequential phase-shifting interferometry (2-step method)

FIG. 18 illustrates an outline of a conventional sequential phase-shifting interferometry (2-step method; Non-PTL 6). In this method, before acquiring the intensity distributions of two holograms (hologram 1 and hologram 2) which are each made from an object beam and a reference beam and have different phases, the intensity distribution of one reference beam is measured. From these three intensity distributions, the complex amplitude (phase and strength) of the object beam is measured. It should be noted that this method is on the premise that a sequential phase shift interferometer including an imaging device (denoted by "CCD1" in FIG. 18) illustrated in FIG. 6 is used, and therefore only the intensity distribution of a preliminary measured reference beam can be taken into consideration. Therefore, in holographic diversity interferometry (2-step method), distortion of the light path, the optical device and the imaging device cannot be handled. In addition, in parallel phase-shifting interferometry (2-step method), the hologram information of adjacent pixels is handled as a set of phase shift holograms. At this time, the value of one of the adjacent pixels is used as a reference beam value, and therefore measurement of phase information cannot be performed in consideration of variation in the reference beam between the adjacent pixels. Therefore, in parallel phase-shifting interferometry (2-step method), a large measurement error may possibly be caused.

Figure 19:
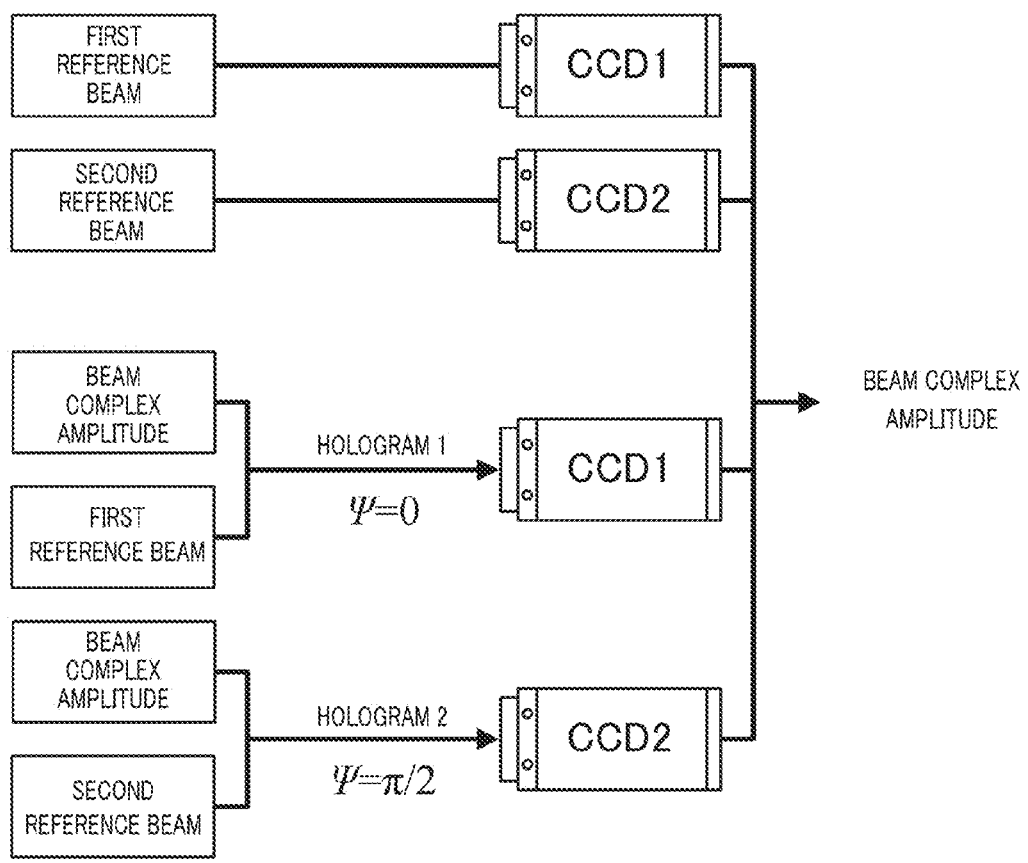
FIG. 19 illustrates an outline of a phase measurement method according to an embodiment of the present invention.

FIG. 19 illustrates an outline of the phase measurement method according to the embodiment of the present invention. As illustrated in FIG. 19, in the phase measurement method according to the embodiment of the present invention, the intensity distributions of reference beams in two imaging devices (CCD1 and CCD2) are measured in advance, and these intensity distributions and the intensity distributions of the two holograms (hologram 1 and hologram 2) having different phases are used to measure the complex amplitude of the object beam. In this manner, the phase measurement method according to the embodiment of the present invention is on the premise that a plurality of image regions (first light intensity detection section and second light intensity detection section) are used.

Figure 20:
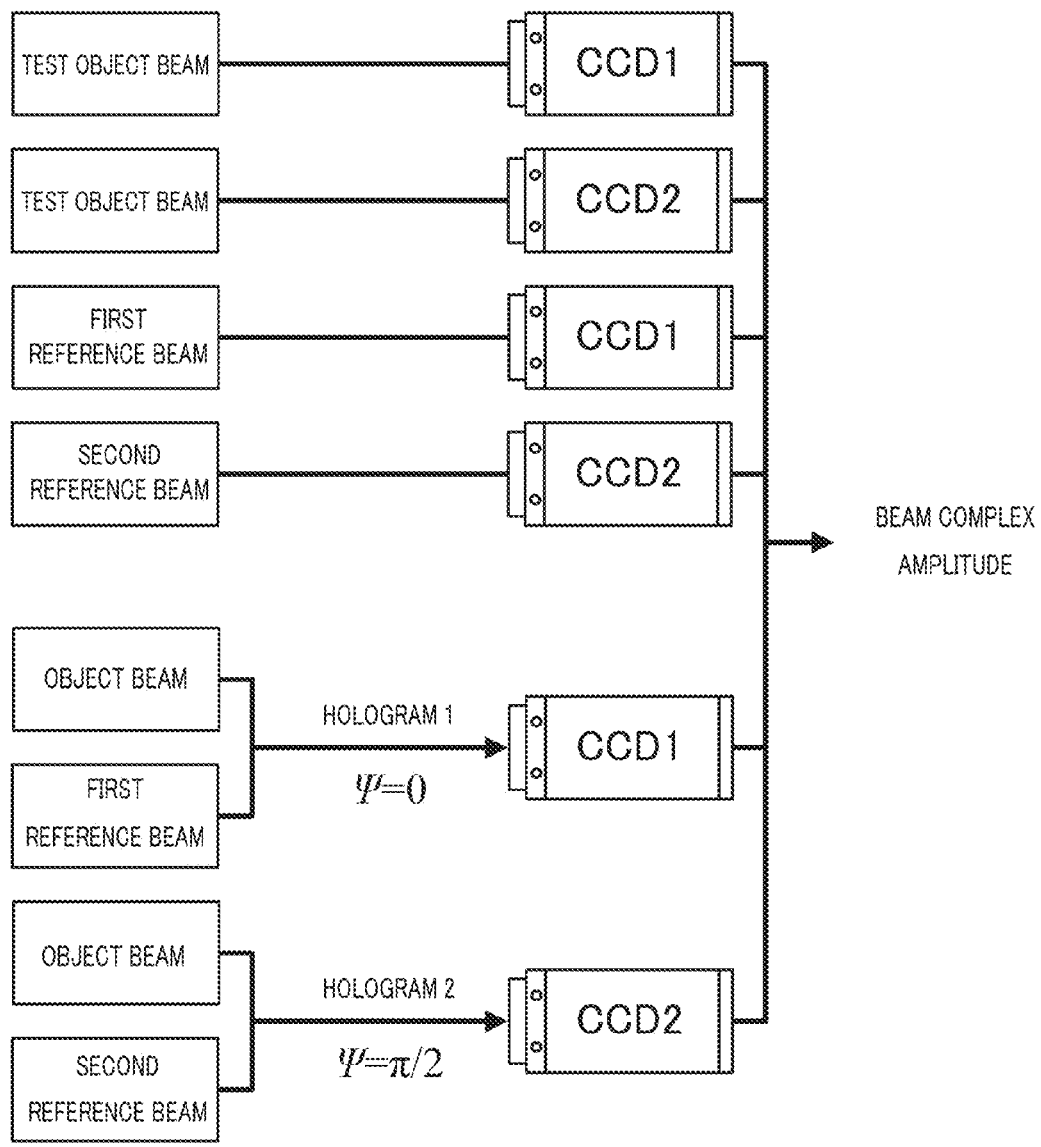
FIG. 20 illustrates an outline of the phase measurement method according to an embodiment of the present invention.

Further, as illustrated in FIG. 20, in the phase measurement method according to the embodiment of the present invention, two imaging devices are irradiated with test object beams to measure their intensity distributions before the intensity distributions of two holograms are measured, to thereby perform error correction of the optical device, the light path and the like on the object beam side. In the phase measurement method according to the embodiment of the present invention, first, only test object beams (for example, object beams obtained in the state where no inspection object is disposed on the light path) are emitted to measure the intensity distributions in two imaging devices (Step i)). Next, only reference beams (first reference beam or second reference beam) are emitted to measure the intensity distributions in two imaging devices (Step iii)). After these preprocessing steps, object beams and reference beams are simultaneously emitted in the state where an inspection object is disposed on the light path, and the intensity distributions of two holograms (hologram 1 and hologram 2) having different phases are measured with use of the two imaging devices (Step iv) and Step v)). With these six intensity distributions, the complex amplitude of the object beam is correctly computed (Step vi)). It is to be noted that, in the phase measurement method according to the embodiment of the present invention, it suffices to perform the preprocessing that is the measurement of the intensity distributions of the test object beam and the reference beam (Step i) and Step iii)) only once at the first stage even in the case where phase information is measured multiple times. In addition, in Step i), instead of the object beam obtained in the state where no inspection object is disposed on the light path, it is also possible to emit an object beam which is obtained in the state where an inspection object is disposed on the light path, as the test object beam. Accordingly, unless otherwise noted, the term "test object beam" used herein includes both of an object beam obtained in the state where no inspection object is disposed on the light path, and an object beam obtained in the state where an inspection object is disposed on the light path.

With the phase measurement method according to the embodiment of the present invention, in holographic diversity interferometry (2-step method), the distortion of an optical device, an imaging device, a light path and the like can be precisely corrected, and phase information can be measured with high accuracy. In addition, in parallel phase-shifting interferometry (2-step method), phase information containing variation of the reference beam between adjacent pixels can be measured, and therefore improvement in accuracy of the measurement can be expected. It is to be noted that, in parallel phase-shifting interferometry, one imaging device serves as the first light intensity detection section and the second light intensity detection section.

[Phase Measurement Method of Embodiment of Present Invention]

Figure 21:
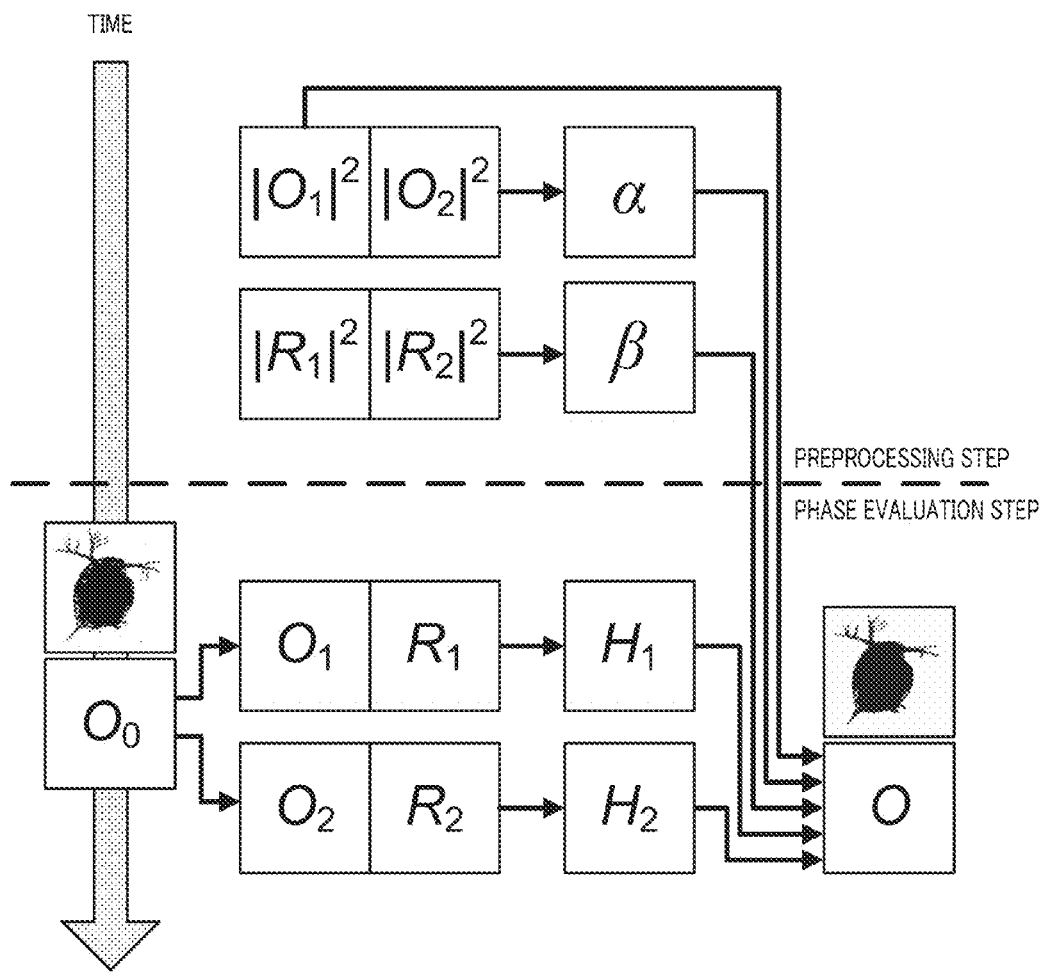
FIG. 21 is a schematic view illustrating procedures in the case where the phase measurement method according to the embodiment of the present invention is applied to holographic diversity interferometry (2-step method)

FIG. 21 is a schematic view illustrating procedures of the phase measurement method according to the embodiment of the present invention. As illustrated in FIG. 21, the phase measurement method according to the embodiment of the present invention is roughly categorized into a preprocessing step of preparing phase measurement, and a phase evaluation step of performing actual hologram measurement.

Figure 15:
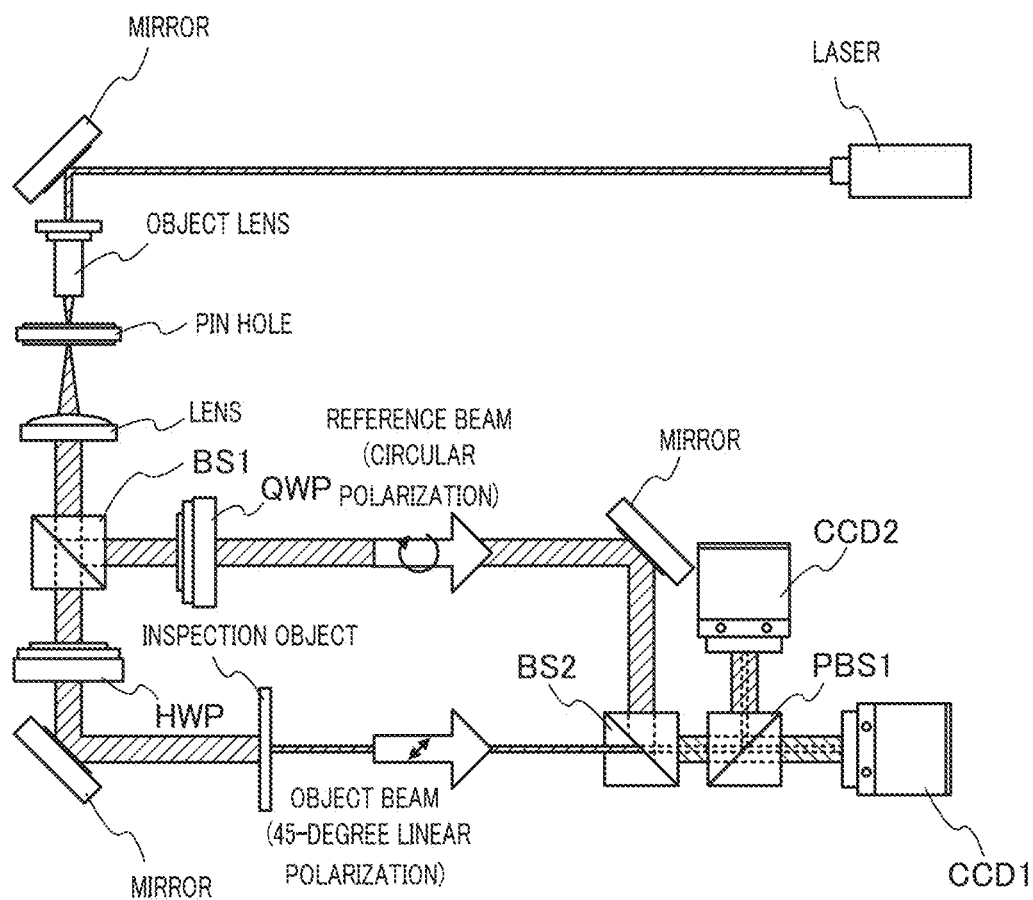
FIG. 15 illustrates a configuration of a two-channel holographic diversity interferometer.
Figure 16:
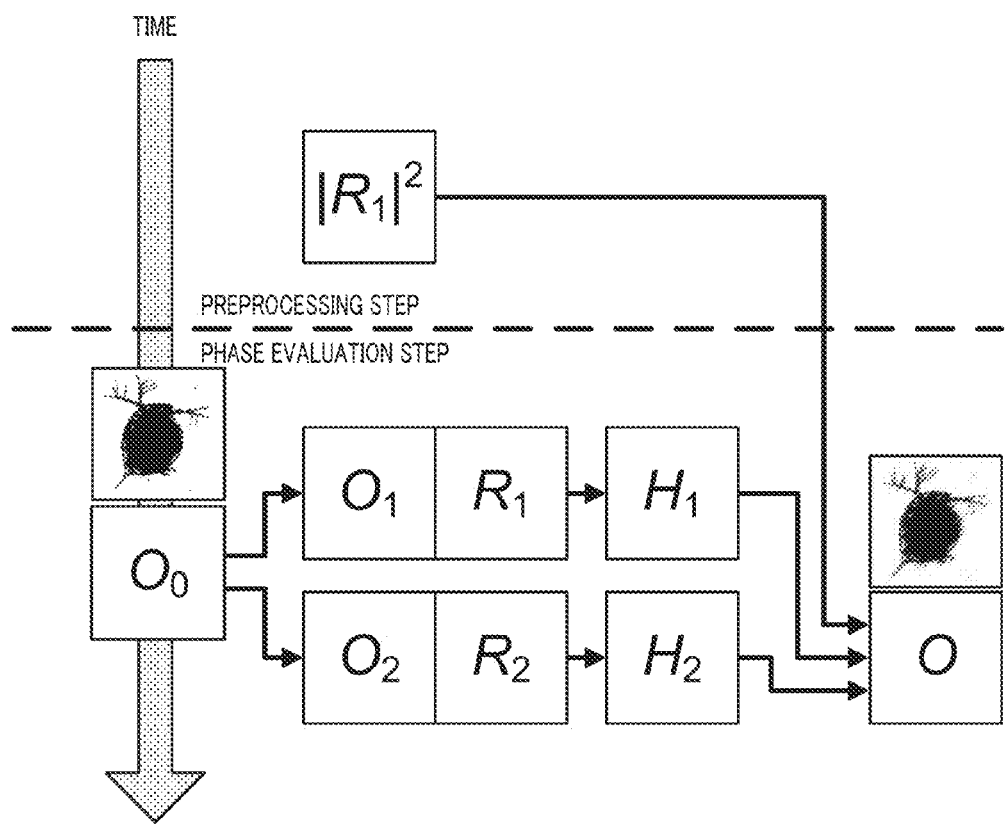
FIG. 16 illustrates procedures of holographic diversity interferometry (2-step method)
Figure 17A:
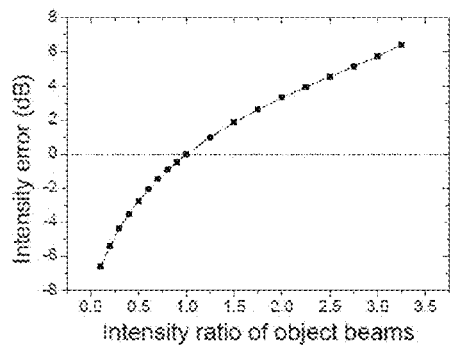
FIGS. 17A to 17F are graphs showing measurement errors which may be caused in the phase-shifting interferometries.
Figure 17B:
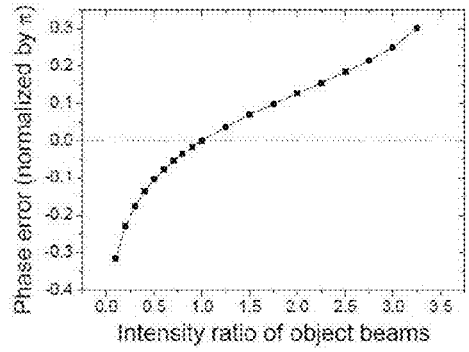
Figure 17C:
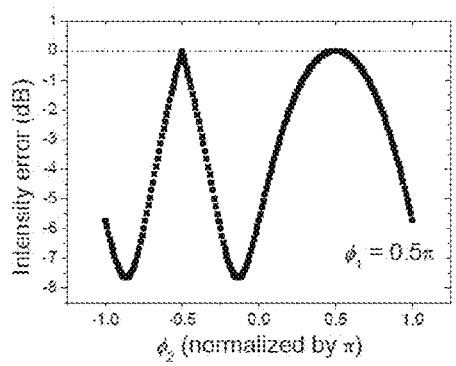
Figure 17D:
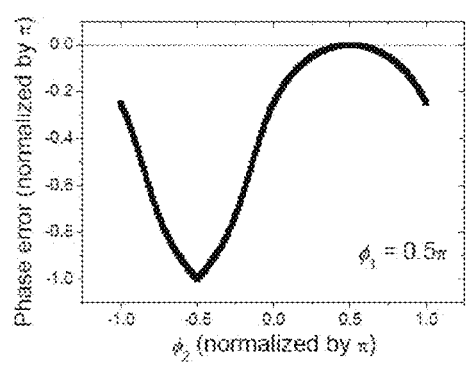
Figure 17E:
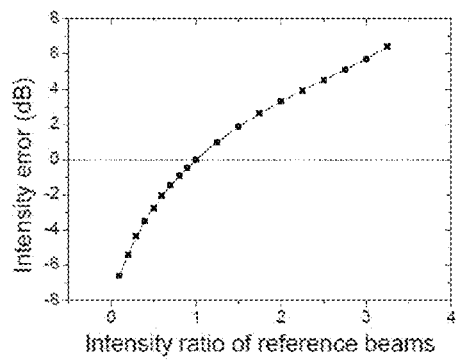
Figure 17F:
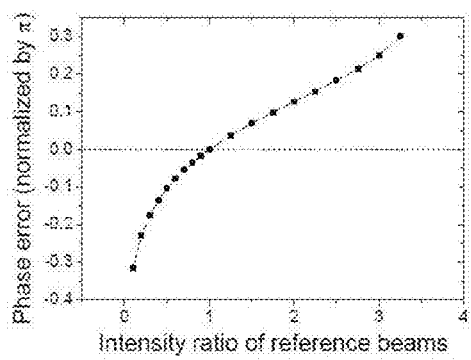
Figure 22:
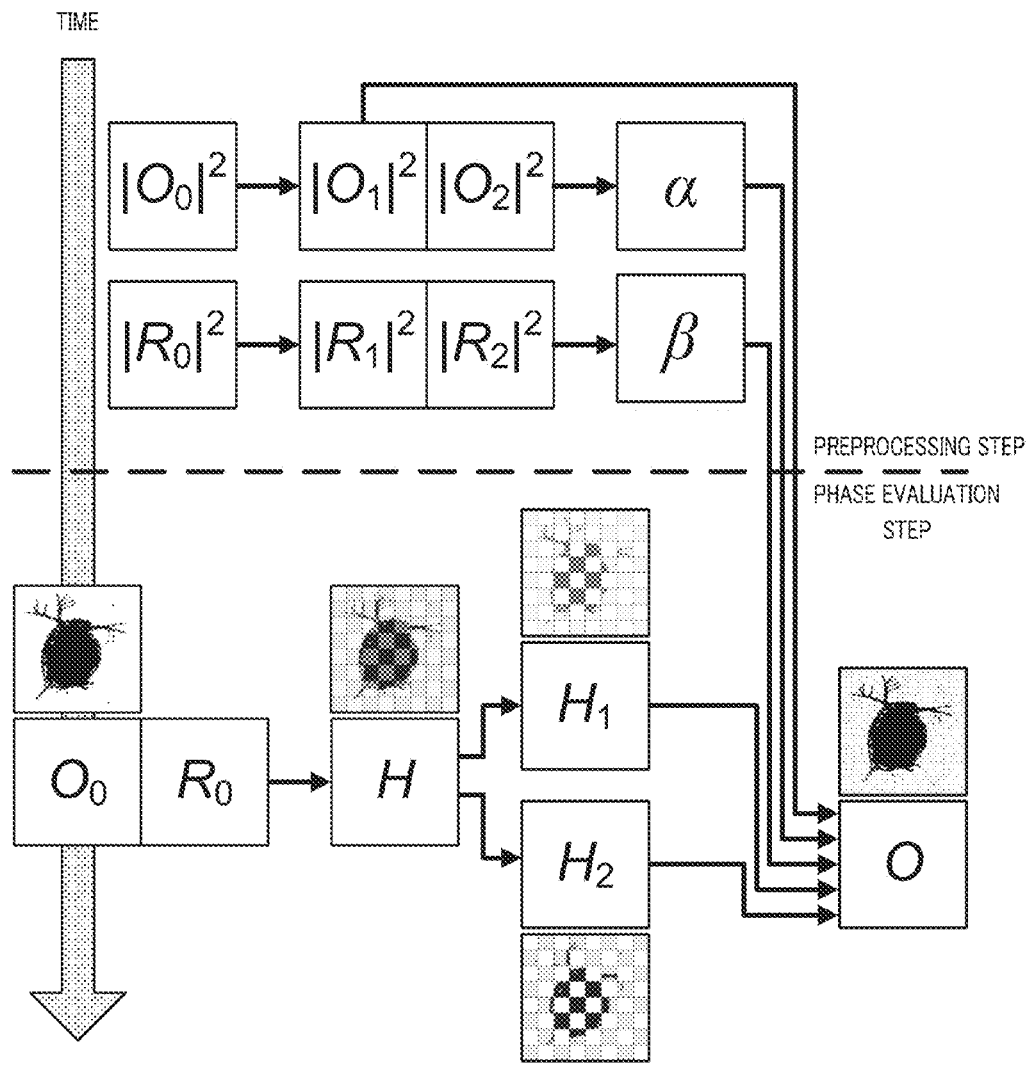
FIG. 22 is a schematic view illustrating procedures in the case where the phase measurement method according to the embodiment of the present invention is applied to parallel phase-shifting interferometry.

In FIG. 21, it is assumed that holograms are acquired by a diversity method using a two-channel holographic diversity interferometer (see FIG. 15). As such, FIG. 21 illustrates such a state that two holograms $H_1$ and $H_2$ having different phases are recorded at the same time. However, in the phase measurement method according to the embodiment of the present invention, the method of acquiring a hologram is not limited. For example, FIG. 22 illustrates procedures of applying the phase measurement method according to the embodiment of the present invention to parallel phase-shifting interferometry. In this case, variation of the reference beam between adjacent pixels can be corrected by the phase measurement method according to the embodiment of the present invention.

In the phase measurement method according to the embodiment of the present invention, both of the intensity distributions of two reference beams in use can be taken into consideration, and inconsistency and non-uniformity in light intensity can be compensated. Thus, the phase measurement method according to the embodiment of the present invention can considerably improve the accuracy of the measurement in comparison with the conventional 2-step method in which only the intensity distribution of one reference beam can be handled.

Unlike the conventional 2-step method, in the phase measurement method according to the embodiment of the present invention, the intensity distributions of object beams (test object beams) and reference beams are discriminated by respective imaging devices (imaging device 1 and imaging device 2). One reason for this is to take into consideration the fact that, in holographic diversity interferometry, the intensity distributions of light emitted from the same laser light source may differ from each other on two imaging devices because of the distortion of the light path and the device, difference in sensitivity between the imaging devices, and the like. Another reason is to handle the case where intensities of the reference beam are different from each other between adjacent pixels (in reality, it is difficult to generate a completely uniform reference beam).

Test object beams $O_1$ and $O_2$ (here, object beams obtained in the state where no inspection object is disposed on the light path) and reference beams $R_1$ and $R_2$ (first reference beam and second reference beam) in two imaging devices can be expressed by the following Expression (27) to Expression (30).

[Expression 10]

$$O_1 = A_{o1} \exp(i\phi_1) \tag{27}$$

$$O_2 = A_{o2} \exp(i\phi_2) \tag{28}$$

$$R_1 = A_{r1} \exp(i\psi_1) \tag{29}$$

$$R_2 = A_{r2} \exp(i\psi_2) \tag{30}$$

Where $O_1$ and $O_2$ are complex amplitudes of the test object beams in imaging device 1 and imaging device 2, respectively, and $\phi_1$ and $\phi_2$ are phases of the test object beams in imaging device 1 and imaging device 2, respectively. $R_1$ and $R_2$ are complex amplitudes of the reference beams (first reference beam and second reference beam) in imaging device 1 and imaging device 2, respectively, and $\psi_1$ and $\psi_2$ are phases of the reference beams (first reference beam and second reference beam) in imaging device 1 and imaging device 2, respectively. $A_{o1}$ and $A_{o2}$ are amplitudes of the test object beams in imaging device 1 and imaging device 2, respectively, and $A_{r1}$ and $A_{r2}$ are amplitudes of the reference beams (first reference beam and second reference beam) in imaging device 1 and imaging device 2, respectively.

In the preprocessing step, first, the intensity distributions of test object beams are separately recorded by two imaging devices. Next, emission of the test object beams is stopped, and the intensity distributions of two reference beams (first reference beam and second reference beam) are separately recorded by the two imaging devices. From the values thus obtained, intensity ratio $\alpha$ of the test object beams and intensity ratio $\beta$ of the reference beams are computed (Expression (31) and Expression (32)).

[Expression 11]

$$\alpha = \frac{|A_{o2}|^2}{|A_{o1}|^2} \tag{31}$$

$$\beta = \frac{|A_{r2}|^2}{|A_{r1}|^2} \tag{32}$$

Where $|A_{o1}|^2$ and $|A_{o2}|^2$ are the intensities of the test object beams in imaging device 1 and imaging device 2, respectively (intensities of test object beam respectively detected in imaging device 1 and imaging device 2 by the preprocessing), $|A_{r1}|^2$ is the intensity of the first reference beam in imaging devices 1 (the intensity of the first reference beam in imaging device 1 detected by the preprocessing), and $|A_{r2}|^2$ is the intensity of the second reference beam in imaging devices 2 (the intensity of the second reference beam in imaging device 2 detected by the preprocessing).

Expression (31) represents a difference in intensity distribution of the test object beams (object beams which is directly obtained in the state where no inspection object is disposed on the light path) between the imaging devices, and therefore is not dependent on the characteristics of the inspection object. Accordingly, when generating a test object beam, the inspection object in FIG. 15 may or may not be placed.

After the preprocessing step, an inspection object is placed, and a hologram is made and measured (phase evaluation step). In the phase evaluation step, object beams and reference beams are simultaneously emitted to compute the complex amplitude distribution of the object beam (Expression (33) and Expression (34)) from two holograms $H_1$ and $H_2$ made from the four optical waves represented by Expression (27) to Expression (30).

[Expression 12]

$$H_1 = |A_{o1}|^2 + |A_{r1}|^2 + 2A_{o1}A_{r1}\cos\phi_1 \quad (33)$$

$$H_2 = |A_{o2}|^2 + |A_{r2}|^2 + 2A_{o2}A_{r2}\sin\phi_2 \quad (34)$$

In holographic diversity interferometry, holograms $H_1$ and $H_2$ are made on imaging devices 1 and imaging device 2. In addition, in phase-shifting interferometry, holograms $H_1$ and $H_2$ are made on adjacent pixels on the imaging device. It is to be noted that, while phases $\psi 1$ and $\psi 2$ of the reference beams may have any values, widely used values, $\psi_1=0$ and $\psi_2=\pi/2$, are used here (which correspond to the phase difference of two holograms $H_1$ and $H_2$).

Here, when object beam O and reference beam R are assumed as Expression (35) and Expression (36), Expression (33) and Expression (34) can be written as Expression (37) and Expression (38) with use of intensity ratio $\alpha$ of the object beams and intensity ratio $\beta$ of the reference beams.

[Expression 13]

$$O \equiv O_1 = \alpha^{-1/2}O_2 \quad (35)$$

$$R \equiv R_1 = \beta^{-1/2}R_2 \quad (36)$$

$$H_1 = |A_o|^2 + |A_r|^2 + 2A_oA_r\cos\phi \quad (37)$$

$$H_2 = \alpha|A_o|^2 + \beta|A_r|^2 + 2\sqrt{\alpha\beta}A_oA_r\sin\phi \quad (38)$$

Then, when direct current components $I_1$ and $I_2$ of holograms $H_1$ and $H_2$ are defined by Expression (39) and Expression (40), Expression (35) can be written as Expression (41).

[Expression 14]

$$I_1 \equiv A_o^2 + A_r^2 \quad (39)$$

$$I_2 \equiv \alpha A_o^2 + \beta A_r^2 \quad (40)$$

$$\begin{aligned}O &= A_o\exp(i\phi) \\ &= A_o(\cos\phi + i\sin\phi) \\ &= \frac{H_1 - I_1}{2A_r} + i\frac{H_2 - I_2}{2\sqrt{\alpha\beta}\,A_r}\end{aligned} \quad (41)$$

Given the above, however, the intensity distribution of the object beam has to be repeatedly recorded to determine the values of $I_1$ and $I_2$ every time when two pairs of interference fringes are observed to compute the complex amplitude of object beam O from Expression (41). In that case, the frame rate of the imaging device is wasted, and the accuracy of the measurement is significantly lowered in the case where the phase of a moving object is measured. For this reason, Expression (39) and Expression (40) are required to be rewritten to a form not including $A_o$ with use of the above-mentioned Expression (35) to Expression (41). In the following, the processes of rewriting the expressions are described.

From $\sin^2\phi + \cos^2\phi = 1$, the square of Expression (41) (Expression (42)) can be written as Expression (43). When the both sides of Expression (43) are multiplied by $4\alpha\beta A_r^2$, Expression (44) is obtained.

[Expression 15]

$$A_o^2(\sin^2\phi + \cos^2\phi) = \left(\frac{H_2 - I_2}{2\sqrt{\alpha\beta}\,A_r}\right)^2 + \left(\frac{H_1 - I_1}{2A_r}\right)^2 \quad (42)$$

$$A_o^2 = \frac{H_2^2 - 2H_2I_2 + I_2^2}{4\alpha\beta A_r^2} + \frac{H_1^2 - 2H_1I_1 + I_1^2}{4A_r^2} \quad (43)$$

$$4\alpha\beta A_r^2 A_o^2 = H_2^2 - 2H_2I_2 + I_2^2 + \alpha\beta(H_1^2 - 2H_1I_1 + I_1^2) \quad (44)$$

First, Expression (44) is solved for $I_2$. For that purpose, when Expression (39) and Expression (40) are rewritten to Expression (45) and Expression (46), and Expression (45) and Expression (46) are used in Expression (44) for substitution, Expression (47) is obtained.

[Expression 16]

$$\begin{aligned}I_1 &= A_o^2 + A_r^2 \\ &= \frac{1}{\alpha}I_2 - \frac{\beta}{\alpha}A_r^2 + A_r^2 \\ &= \frac{\alpha - \beta}{\alpha}A_r^2 + \frac{1}{\alpha}I_2\end{aligned} \quad (45)$$

$$A_o^2 = \frac{1}{\alpha}I_2 - \frac{\beta}{\alpha}A_r^2 \quad (46)$$

$$4\alpha\beta A_r^2\left(\frac{1}{\alpha}I_2 - \frac{\beta}{\alpha}A_r^2\right) = H_2^2 - 2H_2I_2 + I_2^2 + \alpha\beta\left[H_1^2 - 2H_1\left(\frac{\alpha-\beta}{\alpha}A_r^2 + \frac{1}{\alpha}I_2\right) + \left(\frac{\alpha-\beta}{\alpha}A_r^2 + \frac{1}{\alpha}I_2\right)^2\right] \quad (47)$$

Expression (48) is obtained by simplifying Expression (47), and the solution of Expression (48) is Expression (49). Here, a, b and c are defined by Expression (50).

[Expression 17]

$$aI_2^2 - 2bI_2 + c = 0 \quad (48)$$

$$I_2 = \frac{b}{a} \pm \frac{\sqrt{b^2 - ac}}{a} \quad (49)$$

$$\begin{aligned}a &\equiv \alpha^2 + \alpha\beta \\ b &\equiv \alpha\beta(\alpha + \beta)A_r^2 + \alpha^2\beta H_1 + \alpha^2 H_2 \\ c &\equiv \alpha^3\beta H_1^2 - 2\alpha^2\beta(\alpha - \beta)H_1A_r^2 + \alpha\beta(\alpha+\beta)^2 A_r^4 + \alpha^2 H_2^2\end{aligned} \quad (50)$$

When $I_2$ thus obtained is used in Expression (45) for substitution, $I_1$ is obtained as Expression (51).

[Expression 18]

$$I_1 = \frac{\alpha - \beta}{\alpha}A_r^2 + \frac{1}{\alpha}I_2 \qquad (51)$$

$$= \frac{\alpha - \beta}{\alpha}A_r^2 + \frac{1}{\alpha}\left(\frac{b}{a} \pm \frac{\sqrt{b^2 - ac}}{a}\right)$$

However, Expression (49) and Expression (51) each contain ±, and therefore the solution is underspecified. In addition, when the content in √ is negative, the solution of the expression is a complex number and thus an incorrect solution is obtained, and therefore, the content in √ is required to be positive. Given the above, first, it is determined whether the content in √ is positive or negative. When the content in √ is specifically written, Expression (52) is obtained. When Expression (37) and Expression (38) are used in Expression (52) for substitution and the resultant expression is simplified, Expression (53) is obtained. Thus, the content in √ is always positive.

[Expression 19]

$$b^2 - ac = \alpha^5\beta H_1^2 + 2\alpha^4\beta H_1 H_2 - \alpha^3\beta H_2^2 + 2\alpha^4\beta(\alpha-\beta)H_1A_r^2 + 4\alpha^4\beta^2 H_1A_r^2 + 2\alpha^3\beta(\alpha+\beta)H_2A_r^2 - \alpha^3\beta(\alpha+\beta)^2A_r^4 \qquad (52)$$

$$b^2 - ac = 4\alpha^4\beta A_r^2\{(\alpha^{1/2}\sin\phi + \beta^{1/2}\cos\phi)A_o + \beta^{1/2}A_r\}^2 > 0 \qquad (53)$$

Next, positive or negative of ± which provides the correct solution is determined. This determination can be made according to whether Expression (39) and Expression (40) are obtained when Expression (51) and Expression (49) are specifically written for each of positive and negative cases. Here, the process of determining ± for $I_2$ is described.

When ± is replaced by +, Expression (49) can be written as Expression (54) by using Expression (37), Expression (38) and Expression (50) for substitution. Accordingly, in order that the Expression (40) holds, the third term on the right side of Expression (54) is required to be zero (Expression (55)).

[Expression 20]

$$I_2 = \alpha A_o^2 + \beta A_r^2 + \frac{4\alpha^2\beta A_r^2 + 4\alpha^2\beta^2 A_o A_r\cos\phi + 4\alpha^{5/2}\beta^{1/2}A_o A_r\sin\phi}{(\alpha^2 + \alpha\beta)} \qquad (54)$$

$$\frac{4\alpha^2\beta A_r^2 + 4\alpha^2\beta^2 A_o A_r\cos\phi + 4\alpha^{5/2}\beta^{1/2}A_o A_r\sin\phi}{(\alpha^2 + \alpha\beta)} = 0 \qquad (55)$$

When Expression (55) is simplified, Expression (56) is obtained. Here, when the composite function of the trigonometric function is applied in Expression (56), Expression (57) and Expression (58) are obtained.

[Expression 21]

$$-\beta^{1/2}\frac{A_r}{A_o} = \alpha^{1/2}\sin\phi + \beta^{1/2}\cos\phi \qquad (56)$$

$$-\beta^{1/2}\frac{A_r}{A_o} = \alpha^{1/2}\sin\phi + \beta^{1/2}\cos\phi \qquad (57)$$

$$= \sqrt{\alpha + \beta}\sin(\phi + \gamma)$$

$$\gamma = \begin{cases} \arcsin\left(\frac{\beta^{1/2}}{\sqrt{\alpha+\beta}}\right), & \alpha \geq 0 \\ \pi - \arcsin\left(\frac{\beta^{1/2}}{\sqrt{\alpha+\beta}}\right), & \alpha < 0 \end{cases} \qquad (58)$$

α represents the intensity ratio of object beams between holograms $H_1$ and $H_2$, and is always a positive value, and therefore α≥0 always holds in Expression (58). Accordingly, by raising the both sides of Expression (57) to the second power, Expression (59) is obtained. Accordingly, in order that the solution holds when ± is replaced by +, Expression (60) has to be satisfied.

[Expression 22]

$$\frac{|A_r|^2}{|A_o|^2} = \frac{\alpha + \beta}{\beta}\sin^2(\phi + \gamma) \qquad (59)$$

$$\frac{|A_r|^2}{|A_o|^2} \leq \frac{\alpha + \beta}{\beta} \qquad (60)$$

When ± is replaced by −, Expression (49) is written as Expression (61), and Expression (40) always holds. Accordingly, it can be said that, in the case where Expression (60) does not hold, the solution is uniquely specified by replacing ± with −.

[Expression 23]

$$I_2 = \frac{\alpha(\alpha + \beta)A_r^2 + \alpha^2\beta H_1 + \alpha^2 H_2}{(\alpha^2 + \alpha\beta)} - \qquad (61)$$

$$\frac{2\alpha^{\frac{5}{2}}\beta^{\frac{1}{2}}A_o A_r\sin\phi + 2\alpha^2\beta A_o A_r\cos\phi + 2\alpha^2\beta A_r^2}{(\alpha^2 + \alpha\beta)}$$

$$= \frac{\alpha(\alpha^2 + \alpha\beta)A_o^2 + \beta(\alpha^2 + \alpha\beta)A_r^2}{(\alpha^2 + \alpha\beta)}$$

$$= \alpha A_o^2 + \beta A_r^2$$

Combining the above, when Expression (62) is satisfied, the complex amplitude of the object beam is obtained by Expression (63) to Expression (66).

[Expression 24]

$$\frac{|A_r|^2}{|A_o|^2} > \frac{\alpha + \beta}{\beta} \qquad (62)$$

$$O = \frac{H_1 - I_1}{2A_r} + i\frac{H_2 - I_2}{2\sqrt{\alpha\beta}\,A_r} \qquad (63)$$

$$I_1 = \frac{\alpha - \beta}{\alpha}A_r^2 + \frac{1}{\alpha}\left(\frac{b}{a} - \frac{\sqrt{b^2 - ac}}{a}\right) \qquad (64)$$

$$I_2 = \frac{b}{a} - \frac{\sqrt{b^2 - ac}}{a} \qquad (65)$$

$$a = \alpha^2 + \alpha\beta \qquad (66)$$
$$b = \alpha\beta(\alpha + \beta)A_r^2 + \alpha^2\beta H_1 + \alpha^2 H_2$$
$$c = \alpha^3\beta H_1^2 - 2\alpha^2\beta(\alpha - \beta)H_1 A_r^2 + \alpha\beta(\alpha + \beta)^2 A_r^4 + \alpha^2 H_2^2$$

In Expression (63), other than holograms $H_1$ and $H_2$, the intensity $|R|^2$ of a reference beam and intensity ratios α and β can be used for calculation. The intensity of a reference beam and the intensity ratios do not vary with time, and therefore the phase information of the object beam can be measured while continuously compensating for the intensity without wasting the frame rate after the process.

[Reference-Beam Unnecessary Type Phase Measuring Device]

Figure 9:
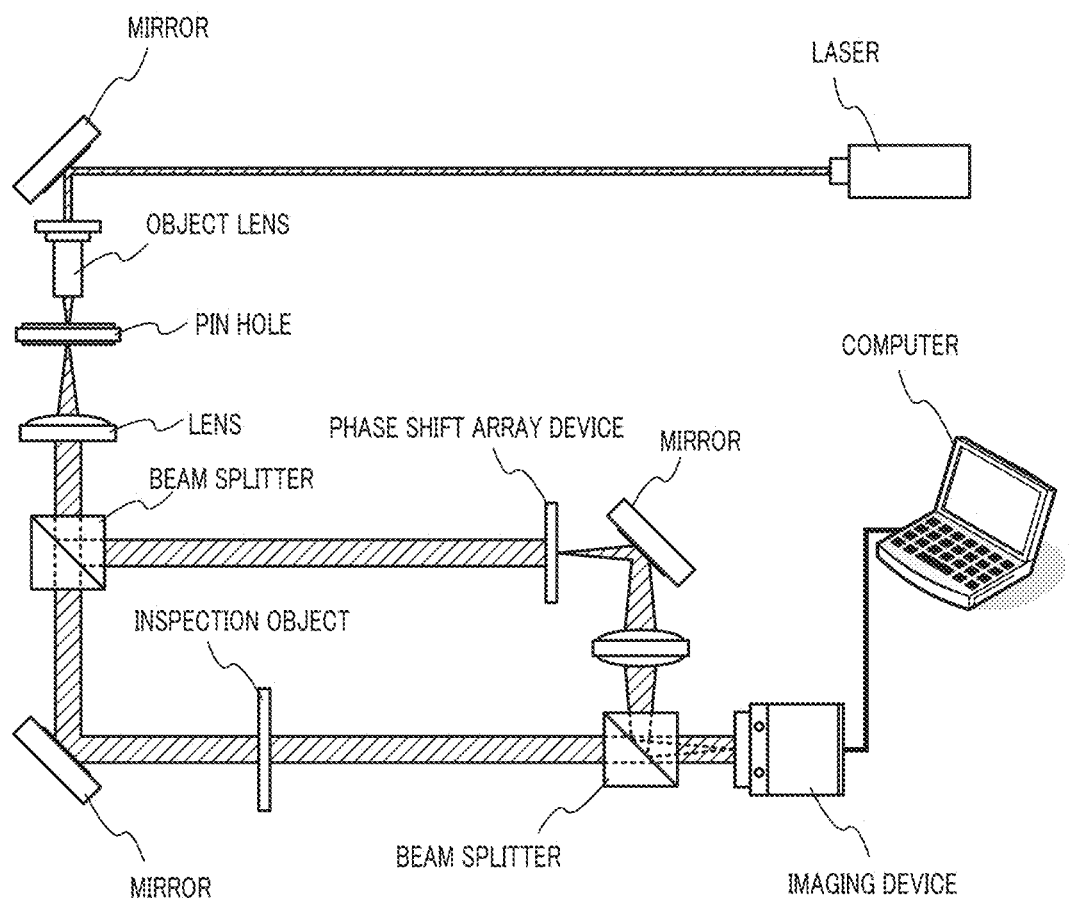
FIG. 9 illustrates a configuration of a phase-shifting interferometer used in parallel phase-shifting interferometry.
Figure 10:
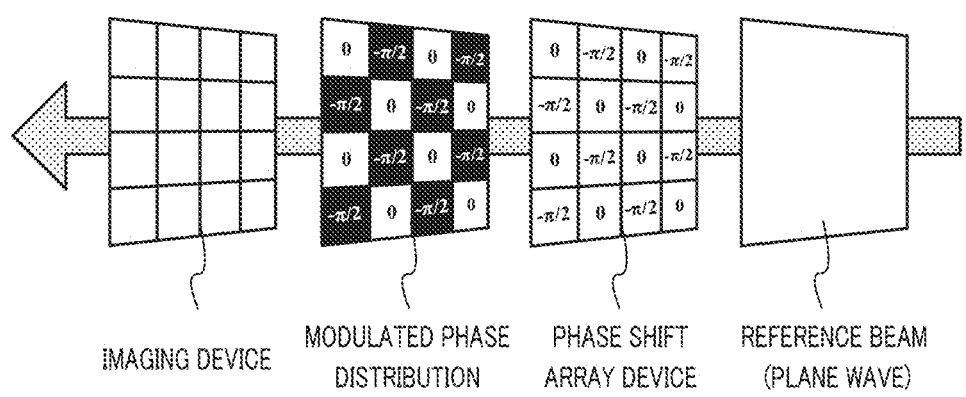
FIG. 10 illustrates an operation of a phase shift array device in the phase-shifting interferometer.
Figure 11:
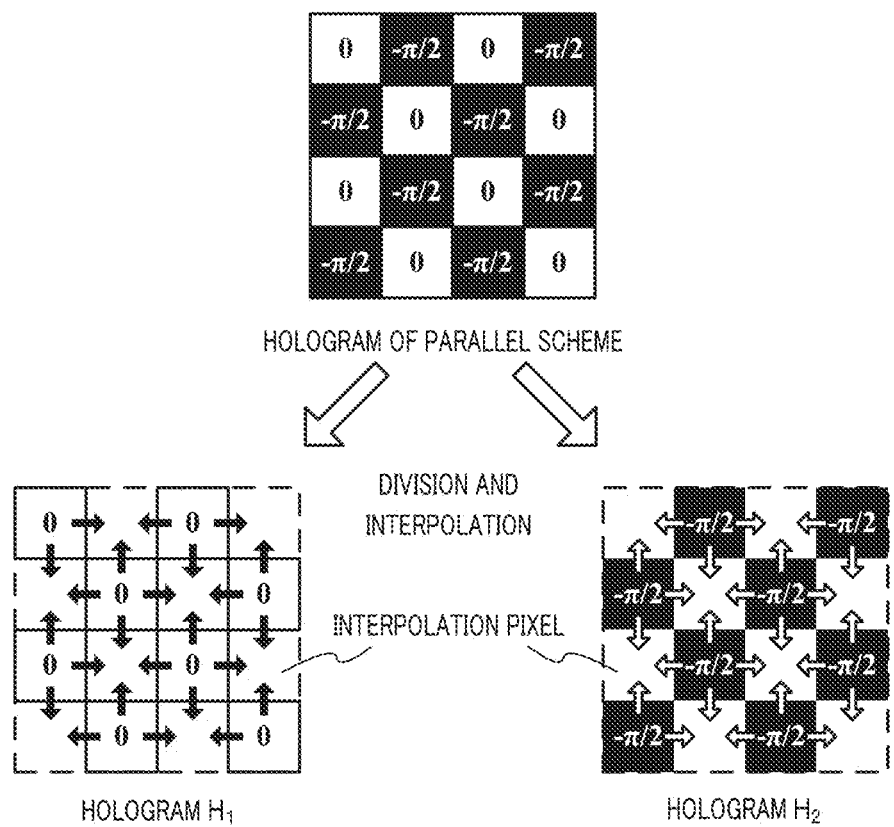
FIG. 11 illustrates division of a hologram and interpolation of pixels in parallel phase-shifting interferometry.
Figure 12:
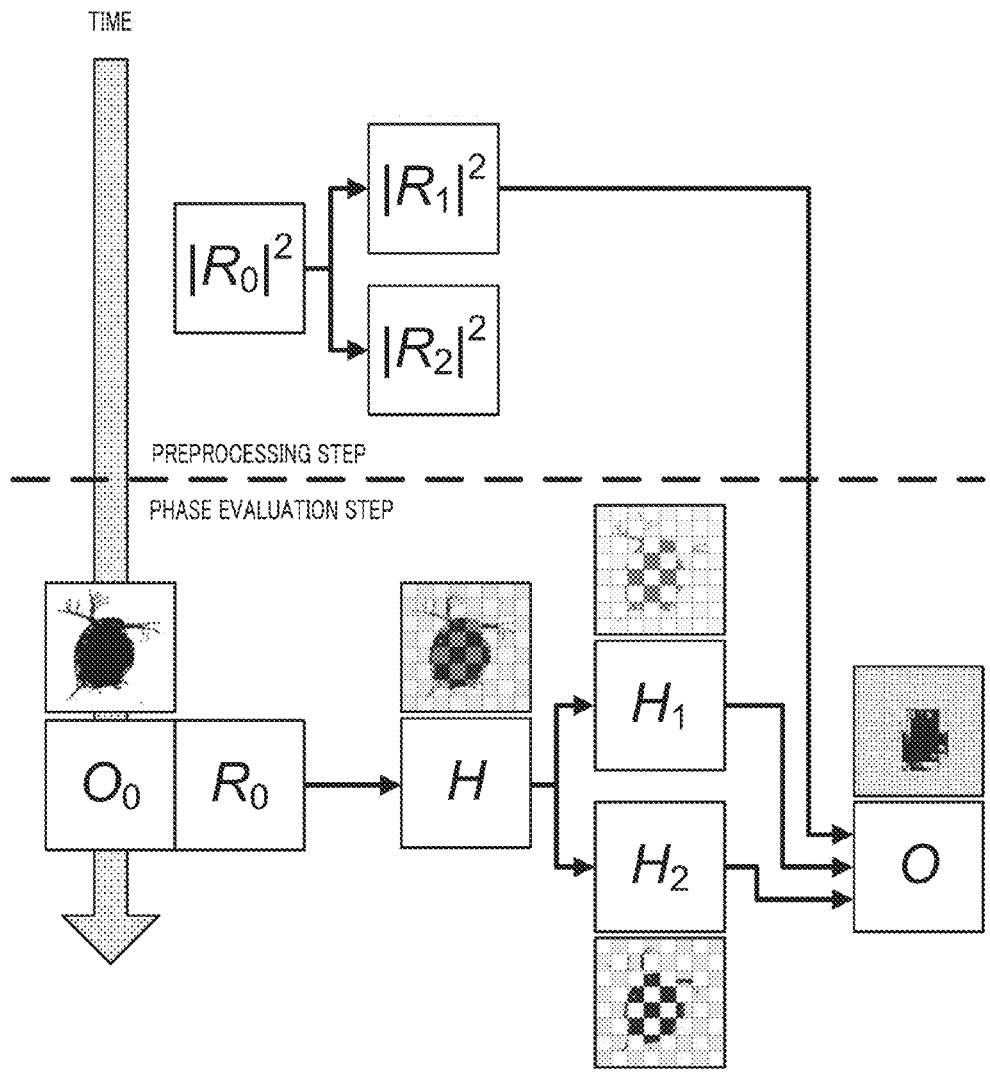
FIG. 12 illustrates procedures of parallel phase-shifting interferometry (2-step method)
Figure 13:
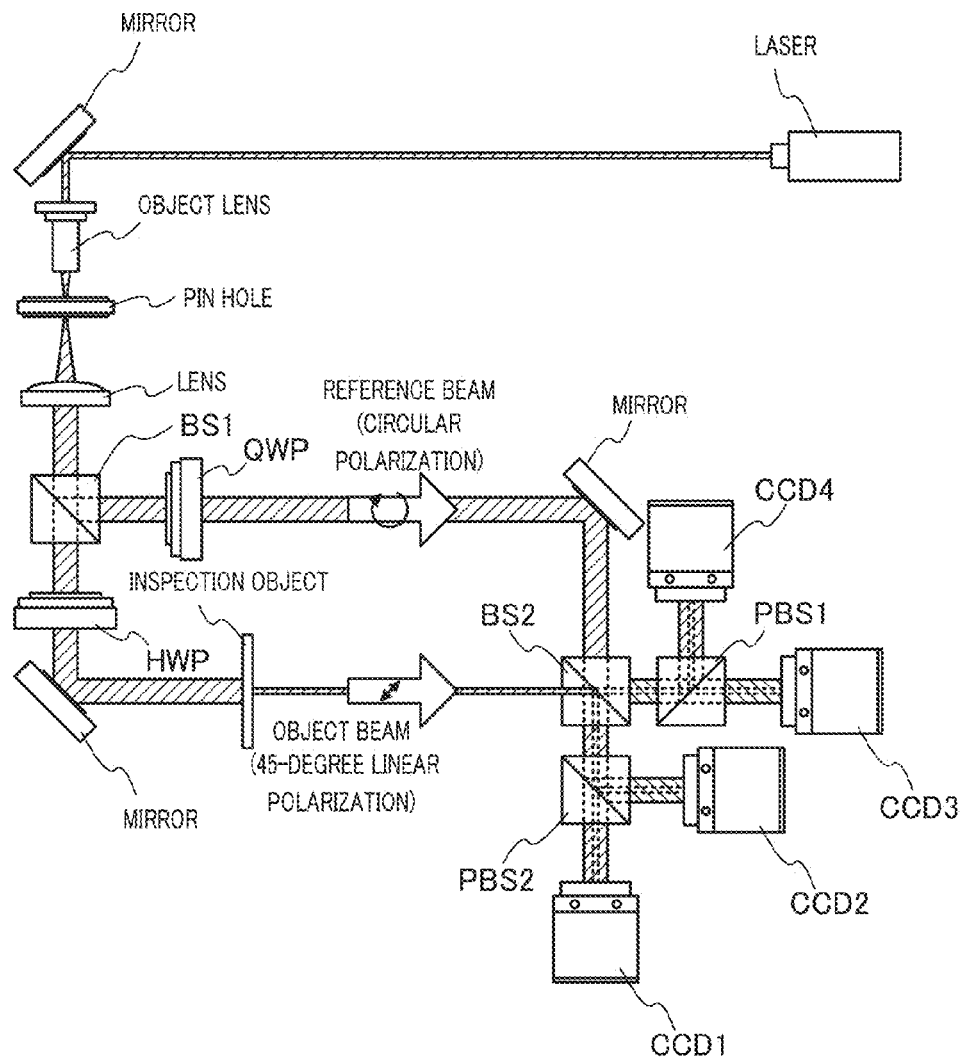
FIG. 13 illustrates a configuration of a 4-channel holographic diversity interferometer.
Figure 14:
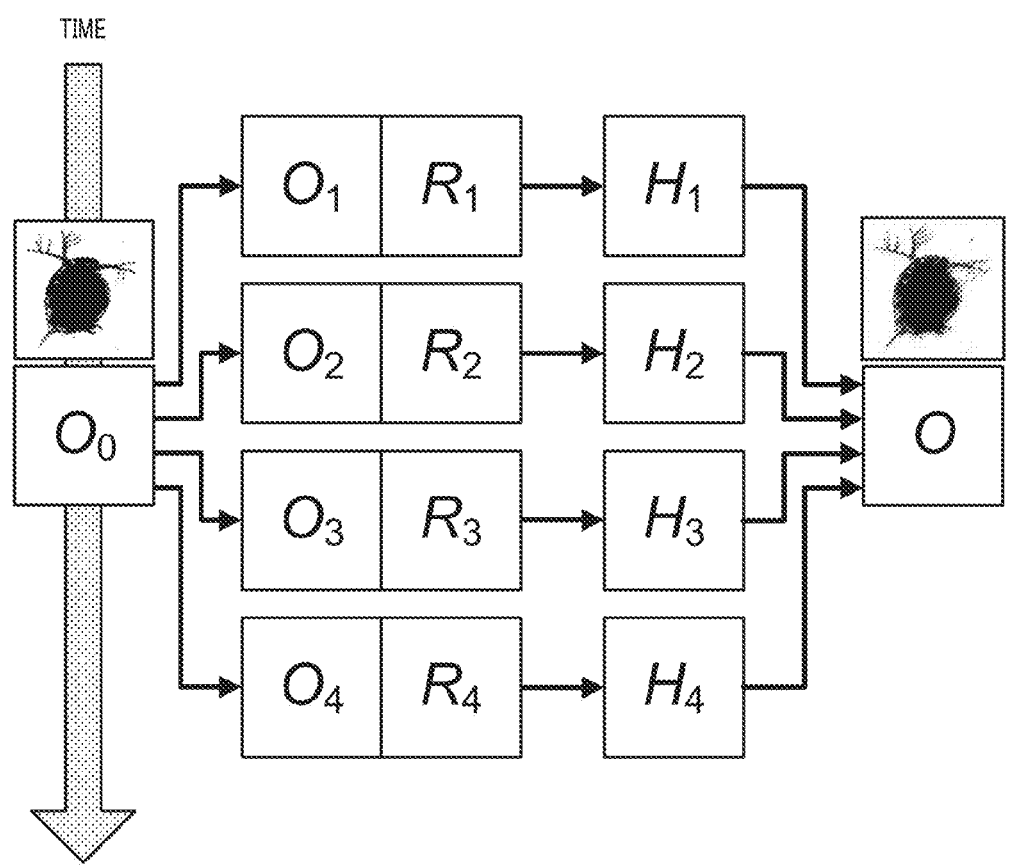
FIG. 14 illustrates procedures of holographic diversity interferometry (4-step method)

As described above, the phase measurement method according to the embodiment of the present invention can be implemented with the two-channel holographic diversity meter illustrated in FIG. 15, the phase-shifting interferometer illustrated in FIG. 9 and the like. In such interferometers, a reference beam which can interfere with an object beam is prepared at the time of measurement, and a first reference beam and a second reference beam are generated from the reference beam in the reference beam generation section. Conventionally, preparation of a reference beam separately from an object beam in this manner has complicated the apparatus, and has made it difficult to perform the measurement of phase information contained in the object beam (signal beam) from remote places. Therefore, the following describes a reference-beam unnecessary type phase measuring device (two-channel holographic diversity meter) suitable for implementing the phase measurement method according to the embodiment of the present invention. The reference-beam unnecessary type phase measuring device according to the embodiment of the present invention further includes a second reference beam generation section that generates a reference beam by extracting a low spatial frequency component from part of an object beam by spatial filtering.

The reference-beam unnecessary type phase measuring device according to the embodiment of the present invention includes a first beam splitter configured to split an object beam into two beams; a ½ wavelength plate configured to convert into 45-degree linear polarization a polarization state of one of the beams of the object beam split by the first beam splitter; a ¼ wavelength plate configured to convert into circular polarization a polarization state of the other part of the object beam split by the first beam splitter; and a space filter configured to extract a low spatial frequency component from one of the object beam of the 45-degree linear polarization and the object beam of the circular polarization to generate the reference beam, a second beam splitter configured to couple the reference beam the other of the object beam of the 45-degree linear polarization and the object beam of the circular polarization; a polarization beam splitter on which the object beam and the reference beam coupled at the second beam splitter are incident, the polarization beam splitter being configured to allow one of a horizontal polarization component and a perpendicular polarization component of the incident beams to pass therethrough, and reflects the other of the horizontal polarization component and the perpendicular polarization component of the incident beams to pass therethrough; a first light intensity detection section configured to detect an intensity distribution of a beam reflected by the polarization beam splitter; a second light intensity detection section configured to detect an intensity distribution of a beam which has passed through the polarization beam splitter; and a processing section configured to compute phase information contained in the object beam on the basis of intensity distributions of beams detected by the first light intensity detection section and the second light intensity detection section. The first beam splitter, the ½ wavelength plate, the ¼ wavelength plate and the space filter function as the second reference beam generation section. The second beam splitter and the polarization beam splitter function as a first hologram making section configured to make a first hologram and a second hologram making section configured to make a second hologram. In the following, with reference to FIG. 23, the reference-beam unnecessary type phase measuring device according to the embodiment of the present invention will be described.

Figure 23:
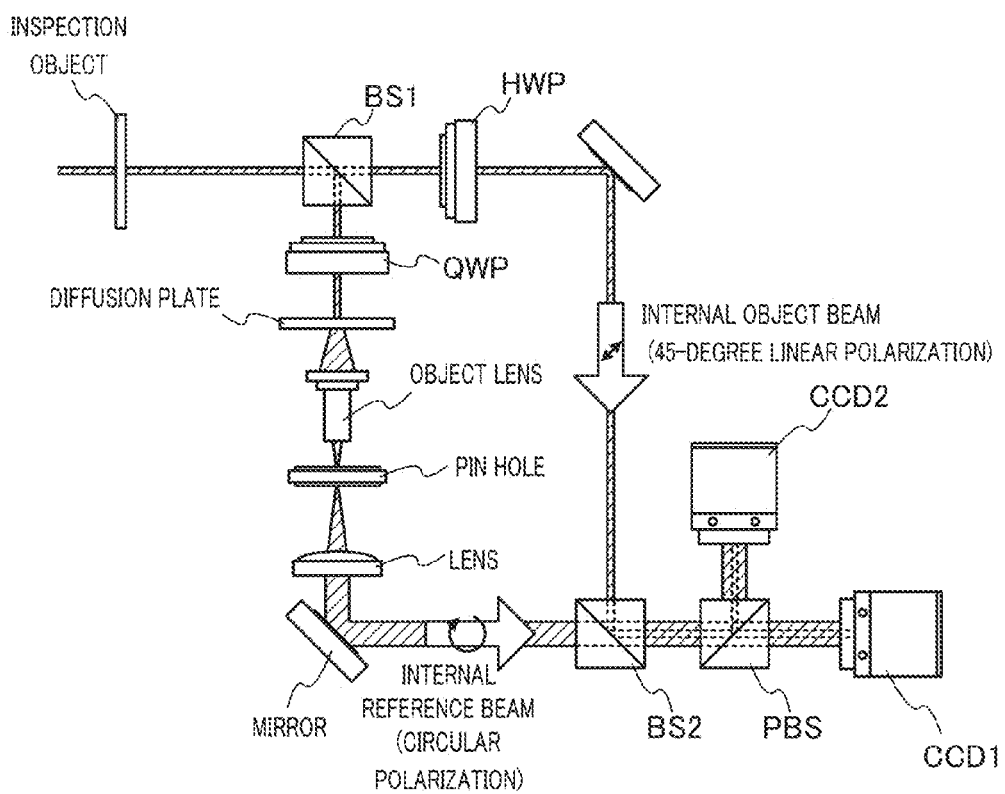
FIG. 23 illustrates a configuration of a reference-beam unnecessary type phase measuring device according to the embodiment of the present invention.

FIG. 23 illustrates a configuration of the reference-beam unnecessary type phase measuring device according to the embodiment of the present invention (2-channel holographic diversity interferometer). In FIG. 23, a processing section that computes phase information contained in an object beam on the basis of the intensity distribution of light detected by two imaging devices (CCD1 and CCD2) is omitted. As illustrated in FIG. 23, the phase measuring device according to the embodiment of the present invention generates a reference beam by extracting a low spatial frequency component from part of an object beam by spatial filtering, and makes two holograms from the object beam and the reference beam generated from the object beam. At this time, the holograms are simultaneously made on the two imaging devices (CCD1 and CCD2). That is, the two imaging devices (CCD1 and CCD2) function as the first light intensity detection section and the second light intensity detection section, respectively.

In FIG. 23, the object beam having passed through the inspection object is horizontal or vertical linear polarization. This object beam is split into two light beams by beam splitter 1 (BS1). The light travelling toward the right side in FIG. 23 is changed to 45-degree linear polarization at a ½ wavelength plate (HWP), and is incident on beam splitter 2 (BS2) as an internal object beam. On the other hand, the light split at BS1 and travelling toward the lower side in FIG. 23 is changed to circular polarization at a ¼ wavelength plate (QWP), and then passes through a diffusion plate, an object lens and a pin hole. Thus, only low spatial frequency components are extracted from the object beam. The light wave of the low spatial frequency component is ideally a DC-component, that is, a plane wave in which the amplitude is constant and the wavefront is perpendicular to the light travelling direction. Here, when a sufficiently low spatial frequency component is extracted by optimizing the lens (object lens) and the pin hole making up the space filter, the internal reference beam can be stably generated regardless of the intensity distribution of the object beam. In particular, when the diffusion plate is placed on the near side of the space filter, internal reference beams can be stably and equally generated even in the case where the object beam relatively speedily varies with time. Thus, highly accurate phase measurement can be continuously performed. The internal reference beam and the internal object beam generated in the above-mentioned manner are mixed at BS2, and then polarized and separated at polarization beam splitter (PBS), whereby two holograms having different phases are simultaneously made on the two imaging devices (CCD1 and CCD2). The detailed procedures of the phase measurement are the same as the procedures of the phase measurement method according to the embodiment of the present invention described so far.

In the preprocessing step of the phase measurement method according to the embodiment of the present invention, the intensity distributions of an object beam (test object beam) and a reference beam are required to be separately measured. In the phase measuring device illustrated in FIG. 23, by blocking one of an internal object beam and an internal reference beam, the intensity distribution of the other can be measured. Procedures of the phase measurement subsequent to the preprocessing are basically the same except that the object beam and the reference beam are replaced by the internal object beam and the internal reference beam in Expression (27) to Expression (67).

Accordingly, also in the case where the phase measuring device according to the embodiment of the present invention is used, phase information can be continuously measured after the preprocessing is once performed, as with the case where the above-described two-channel holographic diversity interferometer (see FIG. 15) is used. When the phase measuring device illustrated in FIG. 23 is used, phase information can be measured with high accuracy and high speed even when it is difficult to prepare a reference beam. It is to be noted that the phase measuring device according to the embodiment of the present invention can be used not only for the phase measurement method according to the embodiment of the present invention, but also for the conventional holographic diversity interferometries.

It is to be noted that, in the phase measuring device illustrated in FIG. 23, the ½ wavelength plate (HWP) and the ¼ wavelength plate (QWP) may be switched. That is, the internal signal beam may be circular polarization light, and the internal reference beam may be 45-degree linear polarization light. In addition, the combination of the polarization states of the internal signal beam and the internal reference beam is not limited to the combination of the linear polarization and the circular polarization, and other combinations of the polarization states (for example, linear polarizations of not 45 degrees and elliptical polarizations) may also be adopted (except for combinations in which the phase difference of the two holograms is 0, ±π, ±2π, . . . ).

[Compensation for Phase Distortion]

Figure 24:
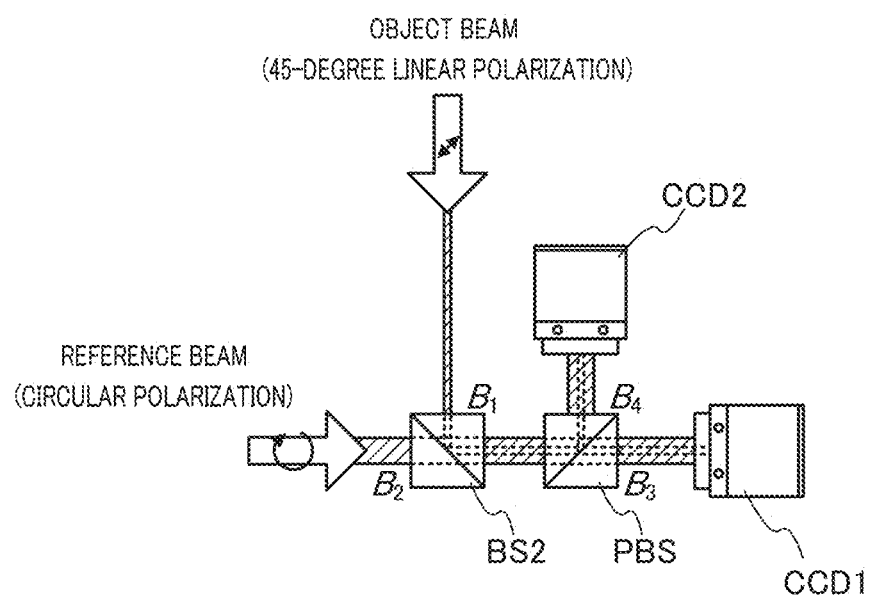
FIG. 24 illustrates background noise in the two-channel holographic diversity interferometer.

FIG. 24 illustrates background noise in a two-channel holographic diversity interferometer. In FIG. 24, $B_1$ represents the background noise applied to an object beam before the object beam is multiplexed by beam splitter 2 (BS2) with a reference beam in the propagation process. $B_2$ represents the background noise applied to the reference beam before the reference beam is multiplexed by BS2 with the object beam in the propagation process. $B_3$ represents the background noise applied to the object beam and the reference beam having passed through polarization beam splitter (PBS). $B_4$ represents the background noise applied to the object beam and the reference beam reflected by PBS.

In the following, with reference to FIG. 24, removal of background noise in phase measurement using a two-channel holographic diversity interferometer will be described. The following description can be applied also to a reference-beam unnecessary type holographic diversity interferometer (see FIG. 23).

Background noises $B_1$ to $B_4$ can be expressed by Expression (67) to Expression (70) using complex amplitude.

[Expression 25]

$$B_1 = A_{b1}\exp(i\xi_1) \tag{67}$$

$$B_2 = A_{b2}\exp(i\xi_2) \tag{68}$$

$$B_3 = A_{b3}\exp(i\xi_3) \tag{69}$$

$$B_4 = A_{b4}\exp(i\xi_4) \tag{70}$$

When these background noises are taken into consideration, the object beam and the reference beam incident on the two imaging devices (CCD1 and CCD2) are expressed by Expression (71) to Expression (74). It is to be noted that $A_o\exp(i\phi)$ and $A_o\exp(i\psi)$ are clean object beam and reference beam in which the background noise is not yet applied.

[Expression 26]

$$O_1 = A_{o1}\exp(i\phi_1) = A_o\exp(i\phi) \times A_{b1}\exp(i\xi_1) \times A_{b3}\exp(i\xi_3) \tag{71}$$

$$O_2 = A_{o2}\exp(i\phi_2) = A_o\exp(i\phi) \times A_{b1}\exp(i\xi_1) \times A_{b4}\exp(i\xi_4) \tag{72}$$

$$R_1 = A_{r1}\exp(i\psi_1) = A_r\exp(i\psi) \times A_{b2}\exp(i\xi_2) \times A_{b3}\exp(i\xi_3) \tag{73}$$

$$R_2 = A_{r2}\exp(i\psi_2) = A_r\exp[i(\psi+\pi/2)] \times A_{b2}\exp(i\xi_2) \times A_{b4}\exp(i\xi_4) \tag{74}$$

In this case, two holograms $H_1$ and $H_2$ are expressed by Expression (75) and Expression (76) as with Expression (8) and Expression (9). When ± primary beam (third term and fourth term on the right side) in Expression (75) and Expression (76) are specifically written, Expression (77) and Expression (78) are obtained. Here, for simplification, it is assumed that $\psi=0$.

[Expression 27]

$$H_1 = |O_1|^2 + |R_1|^2 + O_1^*R_1 + O_1R_1^* \tag{75}$$

$$H_2 = |O_2|^2 + |R_2|^2 + O_2^*R_2 + O_2R_2^* \tag{76}$$

$$\begin{aligned}O_1^*R_1 + O_1R_1^* &= A_{o1}^*\exp(-i\phi_1) \times A_{r1}\exp(i\psi_1) + \\ &\quad A_{o1}\exp(i\phi_1) \times A_{r1}^*\exp(-i\psi_1) \\ &= A_{o1}^*A_{r1}\exp[-i(\phi_1-\psi_1)] + A_{o1}A_{r1}^*\exp[i(\phi_1-\psi_1)] \\ &= 2A_{o1}A_{r1}\cos(\phi_1-\psi_1) \\ &= 2A_{o1}A_{r1}\cos[(\xi_1+\zeta_3+\phi)-(\xi_2+\zeta_3+\psi)] \\ &= 2A_{o1}A_{r1}\cos(\xi_1+\zeta_2+\phi) \end{aligned} \tag{77}$$

$$\begin{aligned}O_2^*R_2 + O_2R_2^* &= A_{o2}^*\exp(-i\phi_2) \times A_{r2}\exp(i\psi_2) + \\ &\quad A_{o2}\exp(i\phi_2) \times A_{r2}^*\exp(-i\psi_2) \\ &= A_{o2}^*A_{r2}\exp[-i(\phi_2-\psi_2)] + A_{o2}A_{r2}^*\exp[i(\phi_2-\psi_2)] \\ &= 2A_{o2}A_{r2}\cos(\phi_2-\psi_2) \\ &= 2A_{o2}A_{r2}\cos[(\xi_1+\zeta_4+\phi)-(\xi_2+\zeta_4+\psi+\pi/2)] \\ &= 2A_{o2}A_{r2}\cos(\xi_1-\xi_2+\phi-\pi/2) \\ &= 2A_{o2}A_{r2}\sin(\xi_1-\xi_2+\phi) \end{aligned} \tag{78}$$

In addition, when the intensity ratios of the object beams and the reference beams are determined as with Expression (31) and Expression (32), Expression (79) and Expression (80) are obtained, and it is found that $\alpha=\beta$. Here, when it is assumed that $\gamma \equiv \alpha = \beta$ and $\delta \equiv \xi_1 - \xi_2$, and Expression (77) to Expression (80) are used, Expression (75) and Expression (76) can be rewritten as Expression (81) and Expression (82).

[Expression 28]

$$\alpha = \frac{|A_{o2}|^2}{|A_{o1}|^2} = \frac{|A_oA_{b1}A_{b4}|^2}{|A_oA_{b1}A_{b3}|^2} = \frac{|A_{b4}|^2}{|A_{b3}|^2} \tag{79}$$

$$\beta = \frac{|A_{r2}|^2}{|A_{r1}|^2} = \frac{|A_rA_{b2}A_{b4}|^2}{|A_rA_{b2}A_{b3}|^2} = \frac{|A_{b4}|^2}{|A_{b3}|^2} \tag{80}$$

$$H_1 = |A_{o1}|^2 + |A_{r1}|^2 + 2A_{o1}A_{r1}\cos(\delta+\phi) \tag{81}$$

$$H_2 = \gamma|A_{o1}|^2 + \gamma|A_{r1}|^2 + 2\gamma A_{o1}A_{r1}\sin(\delta+\phi) \tag{82}$$

In Expression (81) and Expression (82), phase distortion due to background noise remains. This is the background noise of the object beam and the reference beam before they are multiplexed at BS1, and is equivalent between holograms $H_1$ and $H_2$. Regarding the intensity, since the difference between holograms $H_1$ and $H_2$ are compensated by the intensity ratio, $A_{o1}\exp[i(\delta+\phi)]$ can be accurately determined by using Expression (63) to Expression (66). Phase distortion can be reduced by using highly accurate devices for example, but cannot be completely eliminated. To remove the phase distortion, first, the complex amplitude is measured in the state where no inspection object is placed ($A_o=1.0$, $\phi=0$) to measure only noise component $A_{b1}A_{b3}\exp(i\delta)$. Next, an inspection object is placed, and the complex amplitude is measured. At this time, object beam O having no background noise can be computed by dividing by a preliminary computed noise component (Expression (83)).

[Expression 29]

$$O = \frac{A_o A_{b1} A_{b3} \exp[i(\delta + \phi)]}{A_{b1} A_{b3} \exp(i\delta)} = A_o \exp(i\phi) \qquad (83)$$

As described, by applying the phase measurement method according to the embodiment of the present invention to a two-channel holographic diversity interferometer or a reference-beam unnecessary type holographic diversity interferometer (the phase measuring device according to the embodiment of the present invention), distortion of intensity and phase can be compensated and eliminated while maintaining high-speed performance. From this point of view, it is expected that the phase measurement method according to the embodiment of the present invention considerably contributes to the development of the phase measurement field in the future, and plays a very important role.

[Effect]

The phase measurement method according to the embodiment of the present invention can minimize the number of imaging of the hologram required for obtaining the phase information contained in an object beam, and can compensate for the intensity distortion applied from an optical system, and therefore, can increase the measurement speed and the measurement accuracy at the same time. The phase measurement method according to the embodiment of the present invention can be applied in the fields where digital holography is used.

Digital holography can reproduce the three-dimensional information of an object, and therefore is utilized for various purposes in the industrial field, medical field and information field. In the industrial field, digital holography is used to inspect the surface shape of a work by three-dimensional shape measurement. In the medical field, three-dimensional shape measurement is utilized for biological observation. In particular, when a minute work, cell, and the like are inspected in the industrial field and the medical field, digital holography is utilized in the form of a digital holographic microscope by combining the optical system of a microscope and digital holography. By using a digital holographic microscope, three-dimensional information can be acquired with high speed and high definition in a non-contact manner. In addition, when digital holography is combined with a light wave propagation analysis method, a tomogram can be readily acquired.

In the information field, digital holography is utilized as encoding technology by being combined with phase mask, and also is utilized as technology for producing three-dimensional images. On the other hand, since phase is an element for determining the state of light, optical signals can be generated by controlling phase. Actually, phase-modulated optical signals are used in communication technology. In recent years, multi-coding of optical signals has been succeeded by combining digital holography with conventional intensity modulation technology, and, in the field of optical memories and optical communications, increase in speed and capacity in association with improvement in data density, and effective use of information resources such as light recording media and optical fibers are now expected. As described, phase measurement technique is increasingly demanded not only as shape measurement technology but also as signal detection technology.

2. Optical Communication Apparatus

An optical communication using a multi-mode fiber has been widely accepted because of its convenience for connection, inexpensive laying cost and the like. In an optical communication using a multi-mode fiber, however, an optical signal is dispersed into multi-modes when it is propagated, and thus the transmission speed is significantly reduced when the communication distance is long. For this reason, the use of an optical communication using a multi-mode fiber is limited to the communication distance of about 300 m at maximum. If the mode dispersion can be efficiently compensated, the communication distance can be increased.

Mode dispersion is caused by conversion and coupling of modes which occur in the propagation process. It is known that the dispersed mode distribution is changed to the mode distribution which is obtained at the time of the fiber excitation by the inverse conversion (phase conjugation) (I. McMichael, P. Yeh, and P. Beckwith, "Correction of polarization and modal scrambling in multimode fibers by phase conjugation", Optics Letters, Vol. 12, No. 7, pp. 507-509). Accordingly, by emitting a single-mode optical wave to the fiber to generate a phase-conjugate optical wave of the emission beam, and by giving a signal to the generated wave, it is possible to achieve communication which does not cause decrease in transmission speed due to the mode dispersion even when the communication distance is long. When used with a spatial light modulator (SLM), a phase measuring device can efficiently generate a phase conjugate beam. Thus, phase measuring devices play a very important role also in mode dispersion compensation technology.

In addition, as a technique for solving insufficient transmission capacity, a mode division multiplex communication has attracted much attention in which different signals are provided to respective modes in signal multiplex transmission. The mode division multiplex communication has a problem of unstable signal detection accuracy due to conversion or rotation of modes. For this reason, a technique of compensating for the instability of modes in the mode division multiplex communication has been desired. Also in this case, since measurement of the phase of a fiber emission beam can be used to analyze the change of modes and the amount of rotation of the mode distribution, the demand for the measurement is expected to be increased.

Figure 25:
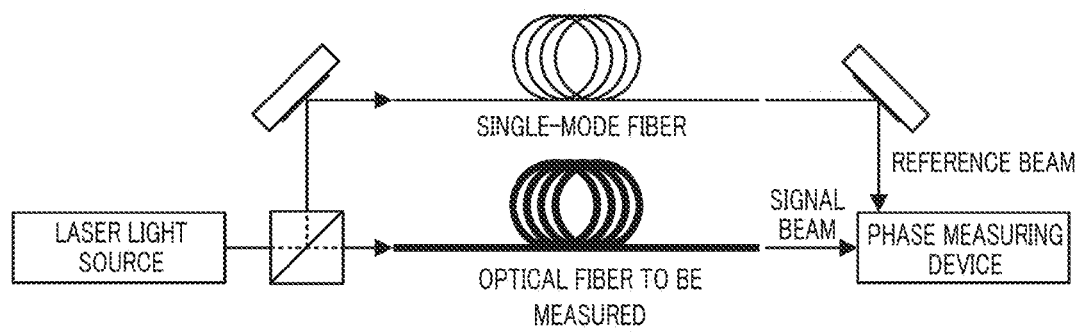
FIG. 25 illustrates a phase measurement system for a beam emitted from an optical fiber which requires a transmission path for a reference beam.

As described, highly accurate phase measurement techniques can be used to analyze the emission mode from the optical fiber or the laser light source, to compensate for the mode dispersion with use of a spatial light modulator, to convert the mode distribution, and to extract a certain mode distribution. Therefore, highly accurate phase measurement techniques are extremely valuable. However, in the above-mentioned uses, the phase distribution of an optical signal as the measurement target changes with time, and therefore a phase measurement technique which has a high time resolution and can detect the phase with high accuracy is required. In addition, in an optical communication system, in general, a transmitter and a receiver are distanced from each other. Accordingly, to measure the phase distribution of a signal output from the receiver side, it is necessary that a reference beam be transmitted from the transmitter side. At this time, it is required that the intensity distribution and phase distribution of the reference beam be known, and that the reference beam can interfere with the signal beam. For this reason, as illustrated in FIG. 25, it is necessary to use a single-mode fiber which can stably transmit optical waves to a distant place to transmit a reference beam using a path different from that of the signal beam. In this case, however, the distance of the transmission path has to be doubled, which is inefficient and not useful.

Figure 26:
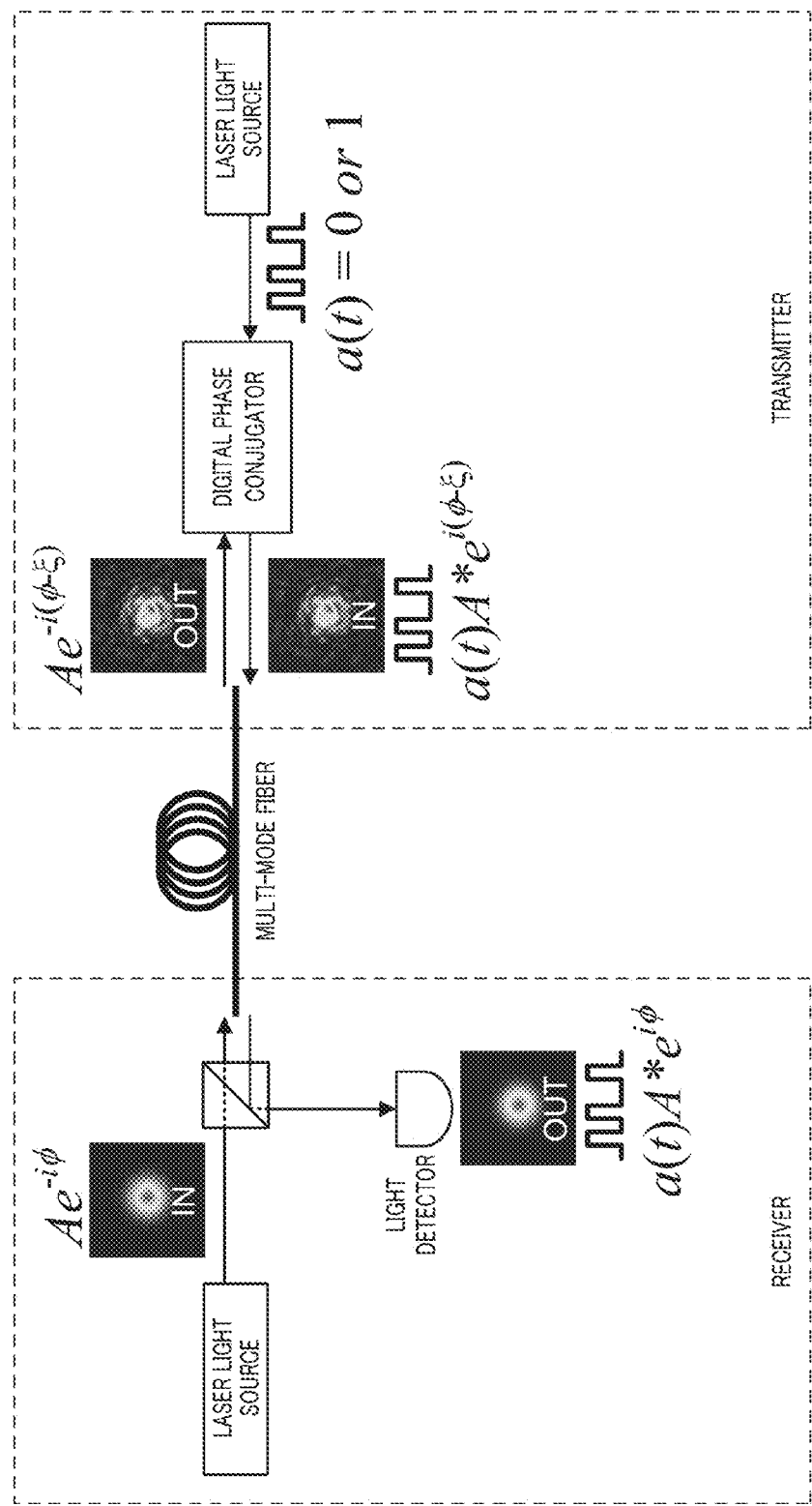
FIG. 26 illustrates a mode dispersion compensation system of a digital phase conjugator.
Figure 27:
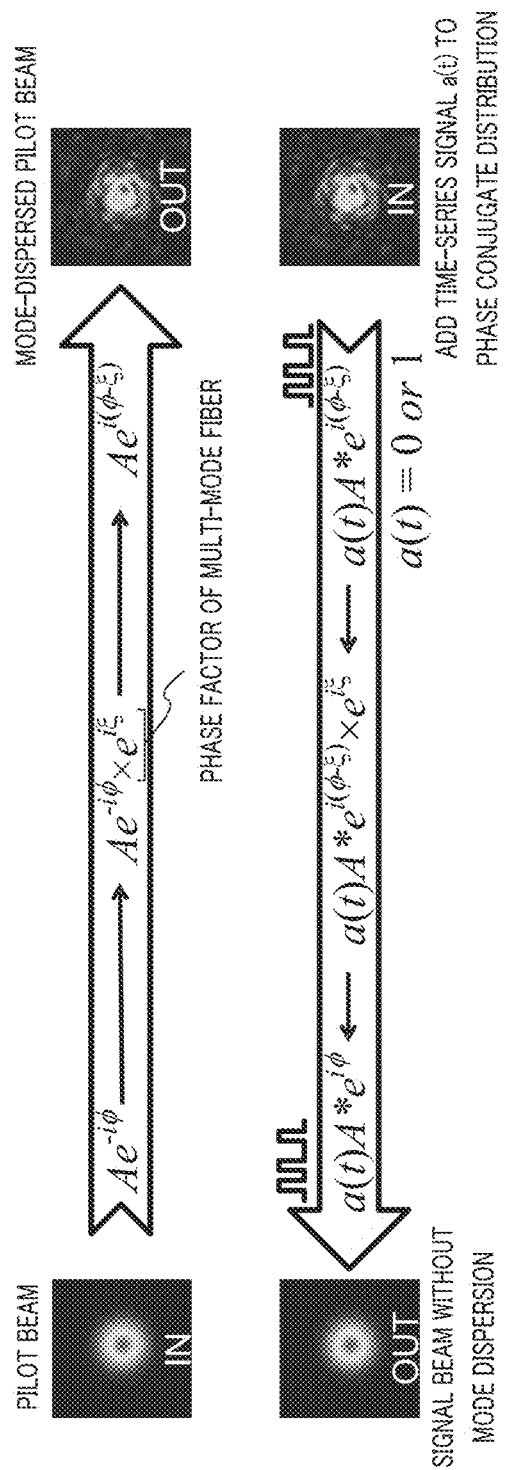
FIG. 27 illustrates a mode dispersion compensation system of a digital phase conjugator.
Figure 28:
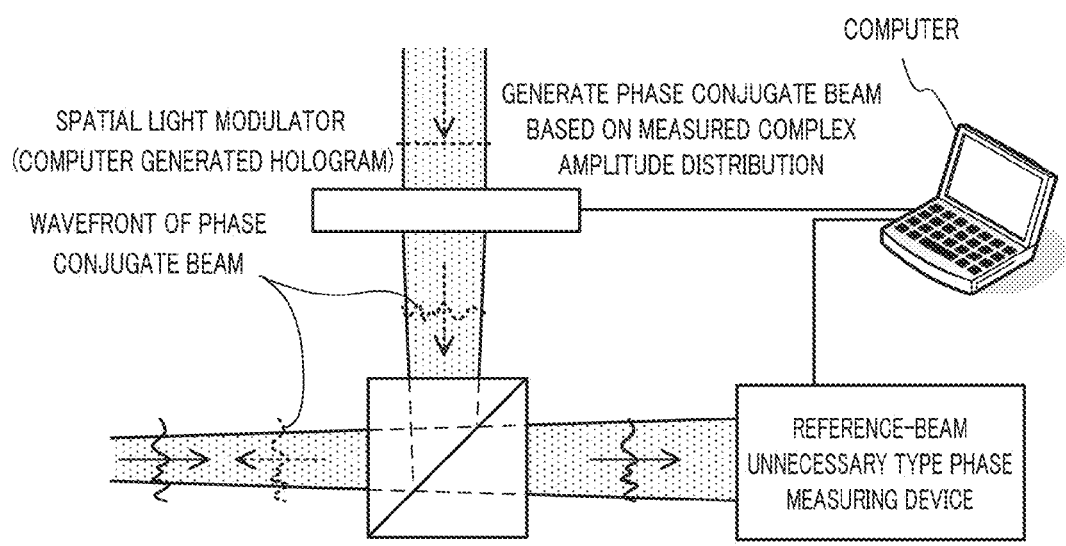
FIG. 28 illustrates a configuration of a digital phase conjugator including a reference-beam unnecessary type phase measuring device according to the embodiment of the present invention.

Under such circumstances, a reference-beam unnecessary type phase measuring device in which a reference beam is prepared in the phase measuring device is desired. The reference-beam unnecessary type phase measuring device according to the embodiment of the present invention (two-channel holographic diversity interferometer) can function as a reference-beam unnecessary type phase measuring device for the above-mentioned need. As illustrated in FIG. 26 and FIG. 27, when a reference-beam unnecessary type phase measuring device is used, it is not necessary to prepare a transmission path of an expensive single-mode fiber for a reference beam, and it is only necessary to prepare an optical fiber of a measurement target. As illustrated in FIG. 28, the reference-beam unnecessary type phase measuring device according to the embodiment of the present invention can operate as a digital phase conjugator when it is used with a spatial light modulator (SLM). In a digital phase conjugator illustrated in FIG. 28, complex amplitude distribution A (x, y) is measured with a phase measuring device, and the data thus obtained is taken in a computer to compute a phase conjugation, and further, the results of the computation is displayed on a spatial light modulator, whereby A*(x, y), which is the phase conjugate component of A (x, y), can be obtained.

While a phase conjugator can be totally optically configured using a nonlinear crystal or the like, it is difficult to practically use a totally optically configured phase conjugator since in such a phase conjugator, wavelength is limited and the fidelity of phase conjugation is low. In contrast, a digital phase conjugator having the phase measuring device according to the embodiment of the present invention can handle various wavelengths with use of a computer generated hologram, and its fidelity is high. Moreover, by using a spatial light modulator as a device for making a computer generated hologram, a phase conjugate beam can be speedily generated also for optical waves that vary with time by dynamically generating a computer generated hologram.

When such a phase conjugator is utilized, mode dispersion in a multi-mode fiber can be compensated, and the optical communication system illustrated in FIG. 27 can be constructed. The optical communication system illustrated in FIG. 27 includes an optical communication apparatus serving as a receiver and an optical communication apparatus serving as a transmitter. In this optical communication system, first, the receiver (the optical communication apparatus on the left side in the drawing) outputs a pilot beam to the transmitter (the optical communication apparatus on the right side in the drawing) through an optical fiber serving as a transmission path. The transmitter uses the reference-beam unnecessary type phase measuring device according to the embodiment of the present invention to measure optical fiber spatial mode propagation information (complex amplitude distribution) contained in the pilot beam. The transmitter digitally performs phase-conjugation computation with use of a computer for a light complex amplitude for cancelling the distortion of an optical fiber transmission path on the basis of the measured complex amplitude information. Further, the transmitter generates a beam containing the calculated light complex amplitude with use of a spatial light modulator and the like, and adds time-series signal a(t) to the generated beam, and then sends the resulting signal beam to the receiver. Since a signal beam in which the mode dispersion of the optical fiber transmission path is canceled arrives at the receiver, no mode dispersion occurs while signal a(t) is diffused into multiple spatial modes when it is transmitted. By further developing this technique, the "spatial mode diffusion communication" described below which is a novel super-high-speed communication technique can be achieved.

[Description of Mode Diffusion Multiplex Communication]

(1) Problems in Optical Communication Using Multi-mode Fibers

A multi-mode fiber has a large core and can moderate the manufacturing accuracy of a communication apparatus, and therefore can be employed at a low cost. For this reason, the demand for multi-mode fibers is high in local networks. In addition, in multi-mode fibers, the effective core cross-sectional area can be 50 to 100 times greater than that of single-mode fibers, and therefore multi-mode fibers have a potential to multiplex multiple signals without causing problems such as nonlinearity and fiber fuse. However, in an optical communication using multi-mode fibers, because of its core size, multi-modes are simultaneously transmitted, thus causing mode dispersion, and as a result, the pulse signal emitted from the fiber is significantly distorted. As such, the optical communication using multi-mode fibers has a problem that high speed and long distance communications cannot be performed.

As described, while the potential of the communication capacity of an optical communication using multi-mode fibers is much larger than that of an optical communication using single-mode fibers, the occurrence of mode dispersion is a technical barrier against the optical communication using multi-mode fibers.

(2) Mode Diffusion Multiplex Communication

Figure 29:
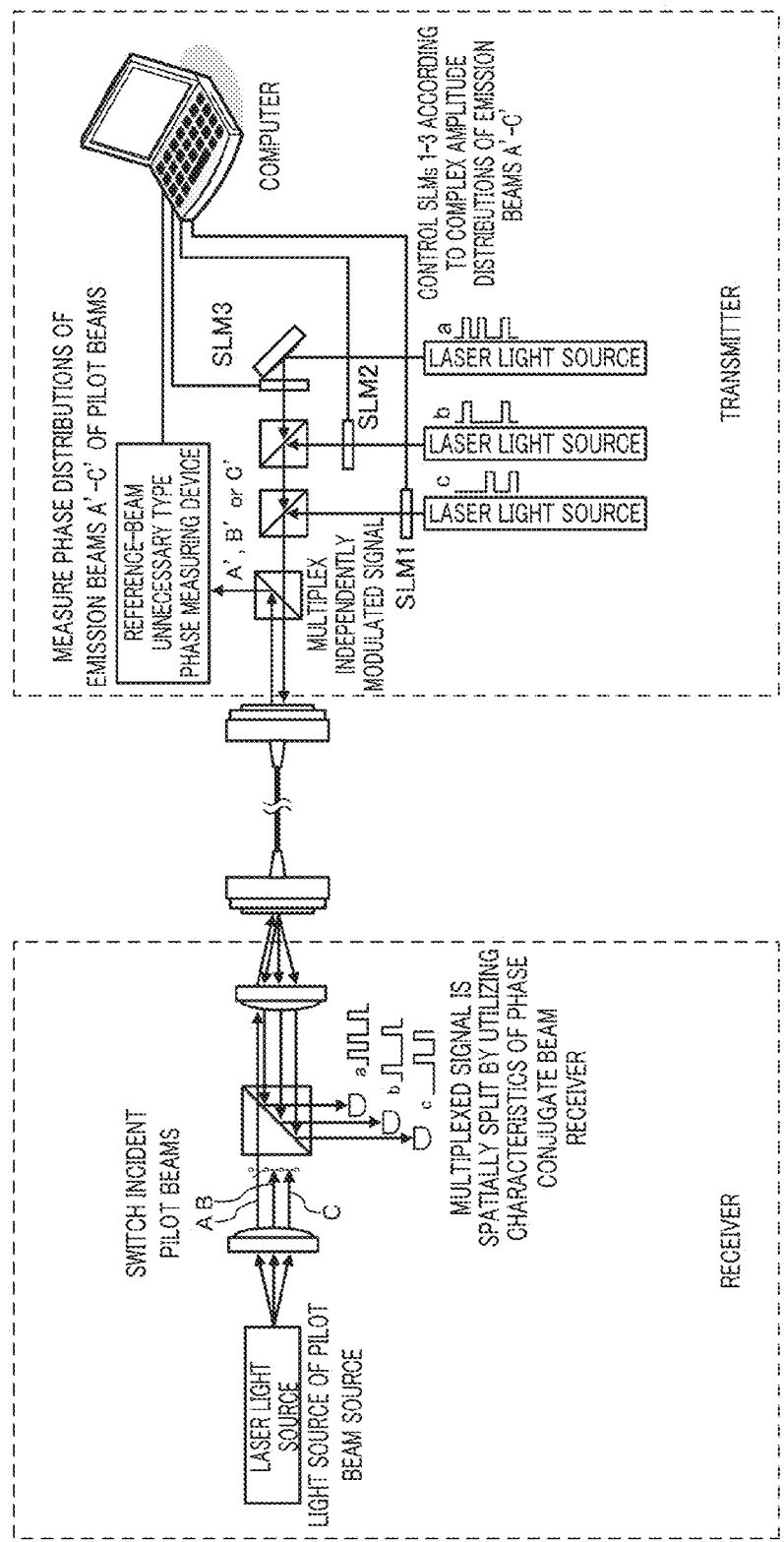
FIG. 29 illustrates an outline of a mode diffusion multiplex communication.

The mode diffusion multiplex communication illustrated in FIG. 29 is a totally new multiplex communication technique which is not influenced by mode dispersion. An example of a communication technique using modes is a mode division multiplex communication (WO2011/052405) in which independent signals are provided to multiple eigenmodes for multiplexing. However, this technique requires a precision apparatus for mode excitation and mode separation, and may cause crosstalk due to mode conversion or mode coupling.

In contrast, in the mode diffusion multiplex communication according to the embodiment of the present invention, with use of a multi-mode fiber, multiple communication channels which are not influenced by mode dispersion (WDM signal transmitted by a conventional single-mode fiber and the like) can be multiplexed and transmitted. In addition, a precision apparatus (multiplexed hologram or the like) for mode excitation and mode separation which is required in a mode division multiplex communication is unnecessary. Further, since the characteristics of a phase conjugate beam is utilized, influences of mode conversion and mode coupling can be compensated even if mode conversion and mode coupling are caused during transmission, and thus, the mode diffusion multiplex communication according to the embodiment of the present invention is not influenced by mode dispersion. In addition, by intermittently sending pilot beams to sequentially measure distortion information in the fiber, time-related variation in the parameter in fiber transmission (for example, variation in the mode in association with temperature variation) can also be handled.

In a spatial mode diffusion multiplex communication, spatial phase distortion information $\Phi(x, y)$ of a transmission path which causes mode dispersion is preliminary measured. In the measurement of phase distortion information, a receiver sends a pilot beam toward a transmitter, and a transmitter measures phase information contained in the pilot beam with use of the reference-beam unnecessary type phase measuring device according to the embodiment of the present invention. When the transmitter sends a signal to the receiver, the transmitter sends to the receiver light obtained by adding a phase of $-\Phi$ (x, y) that cancels phase distortion $\Phi$ (x, y) of the transmission path to a signal beam.

In FIG. 29, the receiver emits a pilot beam into the fiber from position A. The transmitter measures phase distortion information ($\Phi A$) in the fiber with use of the reference-beam unnecessary type phase detection apparatus. Next, the transmitter applies, to transmission signal a(t) having a time-series pulse, phase ($-\Phi A$) that cancels the phase distortion of the signal by spatial light modulator 1, and emits the resulting signal into the fiber. Transmission signal a(t) receives spatial phase distortion ($\Phi A$) in the fiber; however, since spatial phase ($-\Phi A$) is added to transmission signal a(t) when transmission signal a(t) is sent out, the phase distortion is canceled on the receiver side and the signal is output to the incidence position of pilot beam A. At this time, since the mode dispersion of the fiber is also a type of phase distortion, optical signal a(t) which is not influenced by mode dispersion is detected.

Next, the receiver emits a pilot beam into the fiber from position B different from position A. The transmitter measures phase distortion information ($\Phi B$) in the fiber with use of the reference-beam unnecessary type phase detection apparatus. At this time, pilot beam A is not yet incident on the fiber. The transmitter applies, to transmission signal b(t) having a time-series pulse, a phase ($-\Phi B$) that cancels the phase distortion of the signal by spatial light modulator 2, and emits the resulting signal into the fiber. Transmission signal b(t) receives spatial phase distortion ($\Phi B$) in the fiber; however, since spatial phase ($-\Phi B$) is added to transmission signal b(t) when transmission signal b(t) is sent out, the phase distortion is canceled on the receiver side and the signal is output to the incidence position of pilot beam B.

Through similar procedures, by emitting pilot beam C into the fiber to measure phase distortion information ($\Phi C$) in the fiber without emitting pilot beam A and pilot beam B into the fiber, signal c(t) can be transmitted without being influenced by mode dispersion. Here, since the incidence positions of pilot beam A, B and C are different from each other, signals a, b and c can be readily separated by the beam splitter in the receiver or the like as illustrated in FIG. 29. In addition, it is one of great advantages that signals a, b and c can be simultaneously multiplexed and transmitted after the spatial phase distortion is once measured for each mode with use of the pilot beam. Further, it is also possible to again generate the pilot beam to measure the communication path in view of change in ambient temperature and the like, and, even during such an operation, signals are not blocked.

As described, in the spatial mode diffusion multiplex communication,

A) distortion information in the fiber (including mode dispersion) is preliminary detected with use of a pilot beam, and a signal that cancels the distortion is transmitted, whereby a communication which is not influenced by mode dispersion in the multi-mode fiber is achieved;

B) a super-high speed multiplex communication using multi-mode fibers is achieved without the necessity to control combinations of spatial modes to be excited and without using a complicated mode separator as in a spatial mode division communication; and C) after phase distortions of modes are once measured with use of a pilot beam, multiple signals can be simultaneously multiplexed and transmitted, and in addition, by again measuring spatial phase distortions of the modes with a certain time interval, time-related variations in a parameter (distortion) of the transmission path can be dynamically handled.

Since the core cross-sectional area of a multi-mode fiber is far larger than that of a single-mode fiber, a problem of signal degradation due to fiber fuse, nonlinearity and the like, which is a serious problem of today's optical communication technology, can be considerably moderated. As a result, the optical communication using multi-mode fibers can be expected to achieve a significantly large communication capacity in comparison with an optical communication using a single-mode fiber.

(3) Operation Procedure of Mode Diffusion Multiplex Communication

In a mode diffusion multiplex communication, a phase conjugate beam is electronically generated to compensate for phase (wavefront) distortion which is applied on an optical signal while the signal propagates in a fiber. The procedure of the operation is roughly categorized into two processes, a phase distortion observation process (FIGS. 30A and 30B) and a multiplex transmission process (FIG. 31). It should be noted that the phase distortion observation process and the multiplex transmission process can be independently executed. Thus, even in the case where an external pressure is applied to the fiber and a temperature change is caused in the fiber, variation in mode distribution can be dynamically handled without interrupting the communication. Accordingly, in the case of a laying condition where the mode distribution variation frequently occurs, the multiplex communication can be efficiently performed by repeating the following observation processes i) to iii).

Figure 30A:
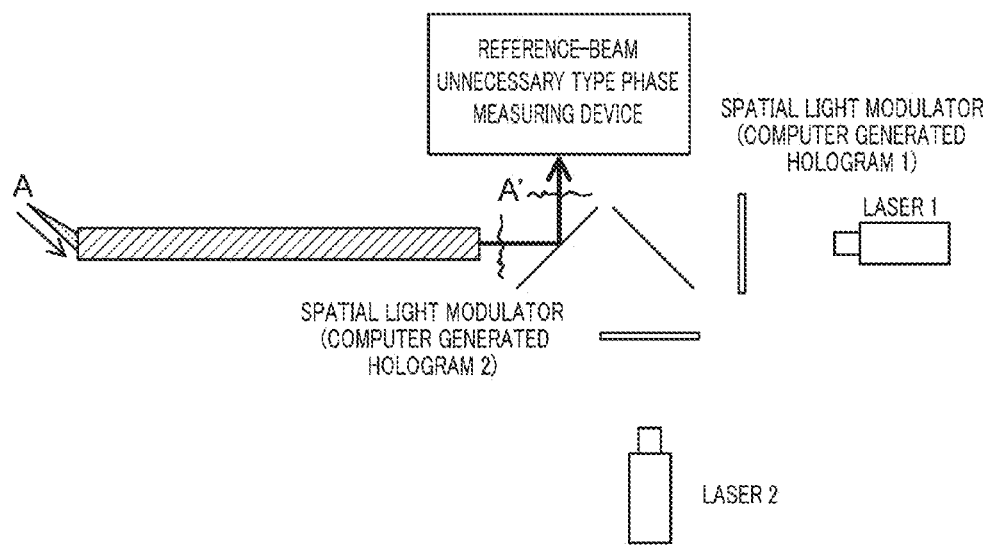
FIGS. 30A and 30B illustrate observation processes for phase distortion in the mode diffusion multiplex communication.
Figure 30B:
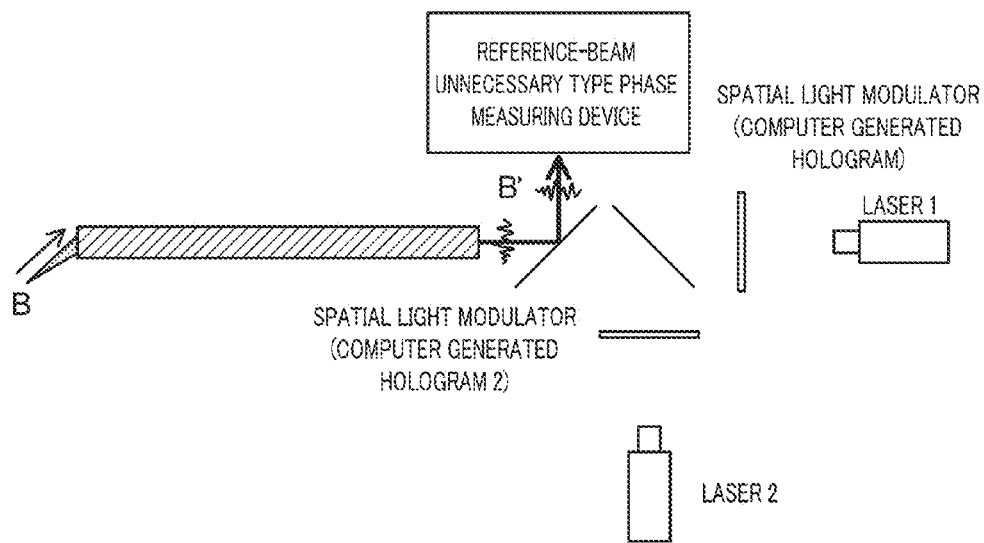
Figure 31:
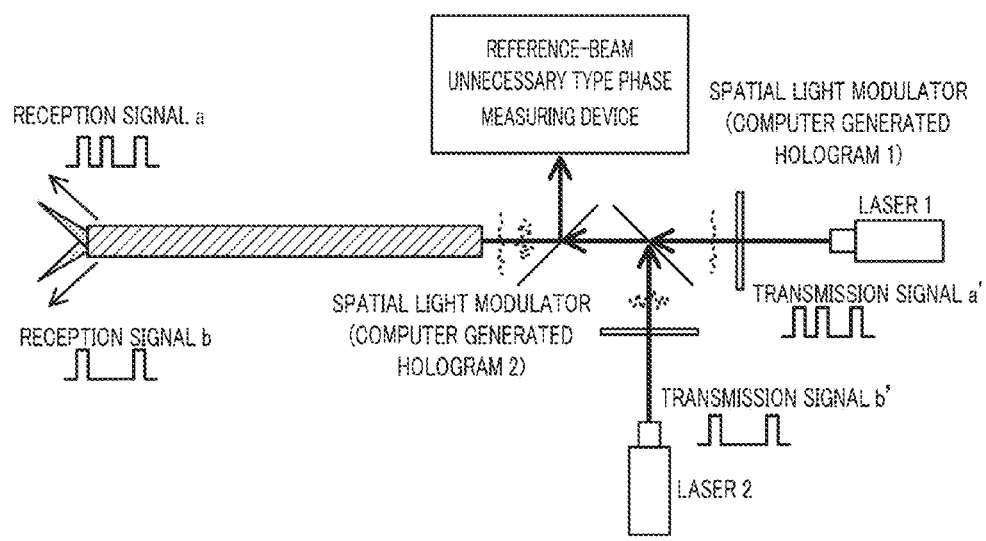
FIG. 31 illustrates a multiplex transmission process of multiple optical signals in the mode diffusion multiplex communication.

(Phase Distortion Observation Process) (FIGS. 30A and 30B)

i) Pilot beam A and pilot beam B are emitted to a fiber while being switched at constant timings. At this time, pilot beam A and pilot beam B are not simultaneously incident on the fiber. In addition, it is not necessary to always emit the pilot beams.

ii) Along with process i), phase information (phase distribution) contained in emission beam A' and emission beam B' are observed in order by the reference-beam unnecessary type phase measuring device.

iii) On the basis of the phase information acquired in process ii), computer generated holograms 1 and 2 are made (or displayed on the spatial light modulator). Complex conjugate distribution F* of acquired complex amplitude F is displayed on the computer generated hologram or the spatial light modulator.

(Multiplex Transmission Process of Multiple Optical Signals) (FIG. 31)

iv) Time-series signals a' and b' are applied to computer generated holograms 1 and 2. The signals generate independently modulated two phase conjugate beams.

v) The two phase conjugate beams are emitted as phase conjugate beams of A and B on the receiver side (left side in the drawing), and detected as signals a and b.

While 2-multiplexing has been described, the number of multiplexing is not limited.

[Outline of Digital Phase Conjugator]

(1) Phase Conjugate Beam

Figure 32A:
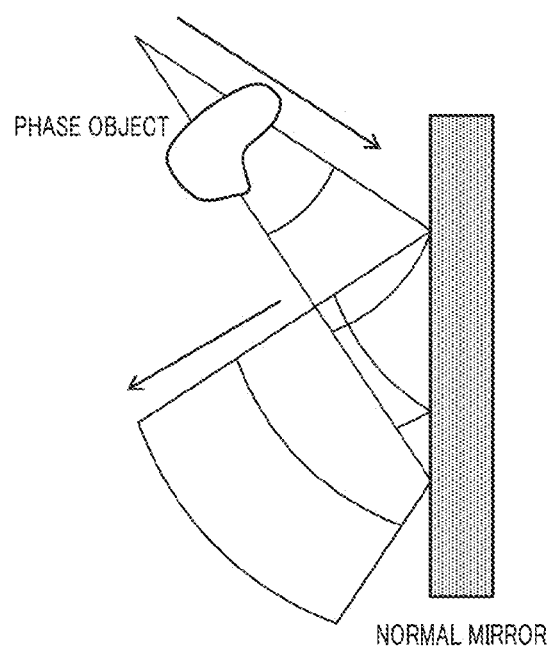
FIGS. 32A and 32B illustrate a difference between a normal mirror and a phase conjugate mirror.
Figure 32B:
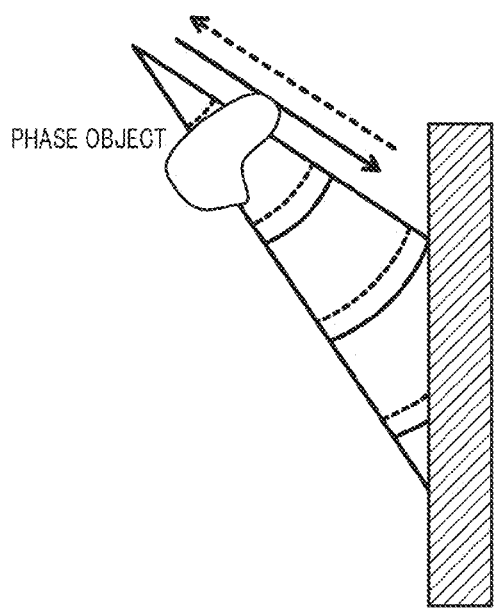
Figure 33A:
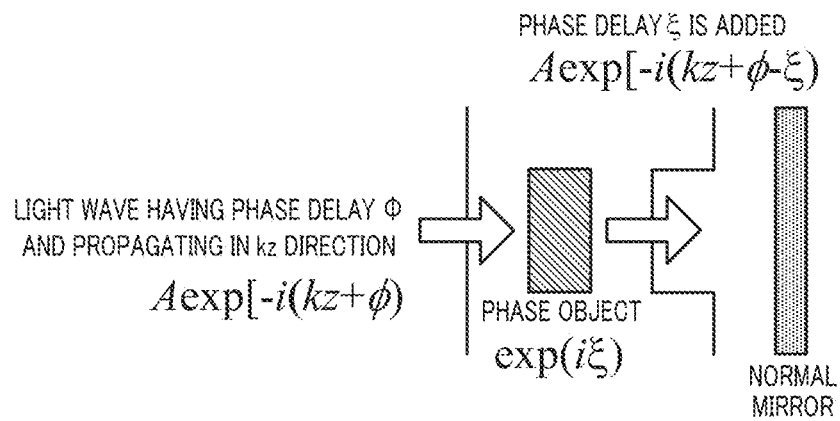
FIGS. 33A and 33B illustrate a relationship between a normal mirror and a phase delay.
Figure 33B:
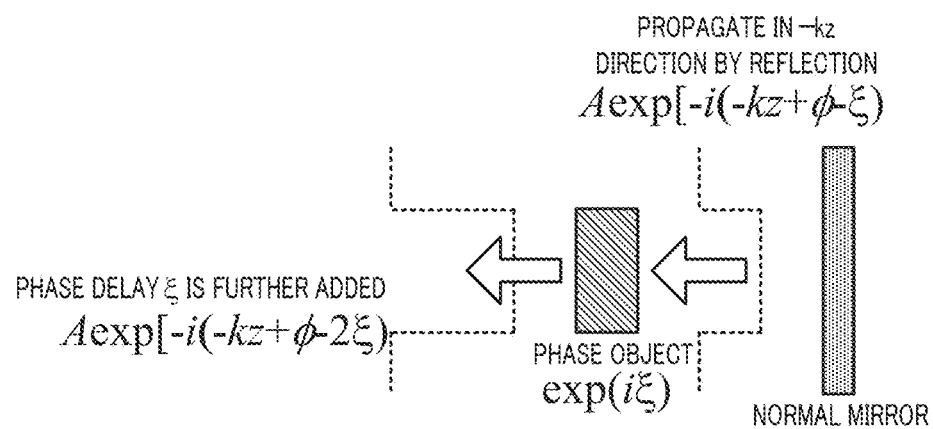
Figure 34A:
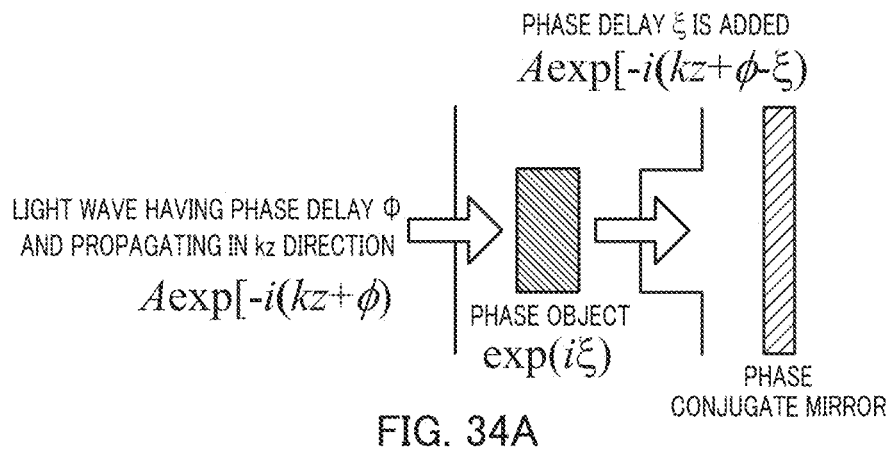
FIGS. 34A and 34B illustrate a wavefront compensation effect of a phase conjugate mirror.
Figure 34B:
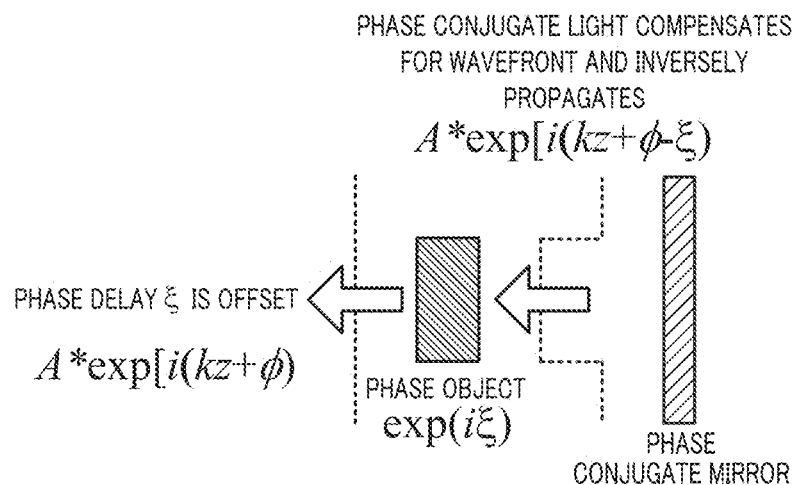

As illustrated in FIG. 32A, a light wave incident on a normal mirror reflects in accordance with the incident angle. In contrast, as illustrated in FIG. 32B, a light wave incident on a phase conjugate mirror reflects as a phase conjugate beam which propagates as it goes back to the light path along which it has been propagated (phase conjugate reflection). At this time, the light correctly returns to the light source through any phase objects on the path as long as the phase objects are linear. This character means a phase conjugate beam has a wavefront compensation effect. This can be easily understood from FIGS. 33A to 34B. Specifically, as illustrated in FIG. 33A and FIG. 33B, in the case of a normal mirror, distortion ξ due to a phase object cannot be removed. In contrast, as illustrated in FIG. 34A and FIG. 34B, in the light from the phase conjugate mirror, distortion ξ is offset, and the original complex amplitude is reproduced. That is, it can be said that, in a mathematical sense, the phase conjugate mirror is a device that inverts the sign of the phase part (imaginary part) of the input optical wave. Such a phase conjugate mirror can be optically configured with use of a nonlinear optical medium. Conventionally, many methods for such purpose have been reported (Jack Feinberg and R. W. Hellwarth, "Phase-conjugating mirror with continuous-wave gain", Optics Letters, Vol. 5, Issue 12, pp. 519-521; Jack Feinberg, "Self-pumped, continuous-wave phase conjugator using internal reflection", Optics Letters, Vol. 7, Issue 10, pp. 486-488).

Figure 35:
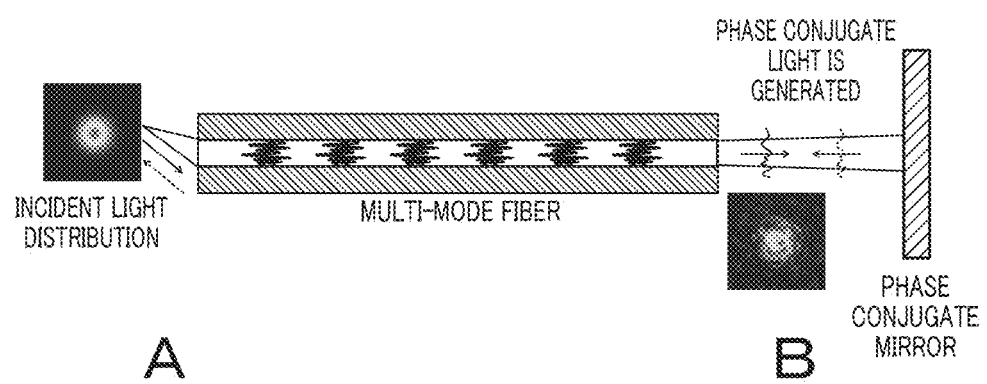
FIG. 35 illustrates mode dispersion compensation with use of the phase conjugate mirror.

When the phase objects illustrated in FIG. 32A to FIG. 34B are replaced with optical fibers, the wavefront of an optical wave can be compensated in any mode conversions or couplings as illustrated in FIG. 35, and optical signal transmission which causes no mode dispersion (mode dispersion compensation) can be performed. A multi-mode fiber has a large core and a significantly low nonlinearity, and thus always operates as a linear device. Accordingly, a multi-mode fiber is suitable for the operation illustrated in FIG. 35.

However, in the mode dispersion compensation operation illustrated in FIG. 35, when a signal output from A side in the drawing arrives at the B side where a phase conjugate mirror is provided, and the signal is returned to the A side from the B side, the mode dispersion compensation is performed. Therefore, it is necessary to transmit the signal two times to the same optical fiber. That is, the operation cannot be used in typical signal transmissions in which signals are transmitted from A to B, or B to A. In addition, it is also extremely difficult to multiplex and transmit multiple signals with use of conventional phase conjugate mirrors.

(2) Mode Dispersion Compensation Using Digital Phase Conjugator

Figure 36:
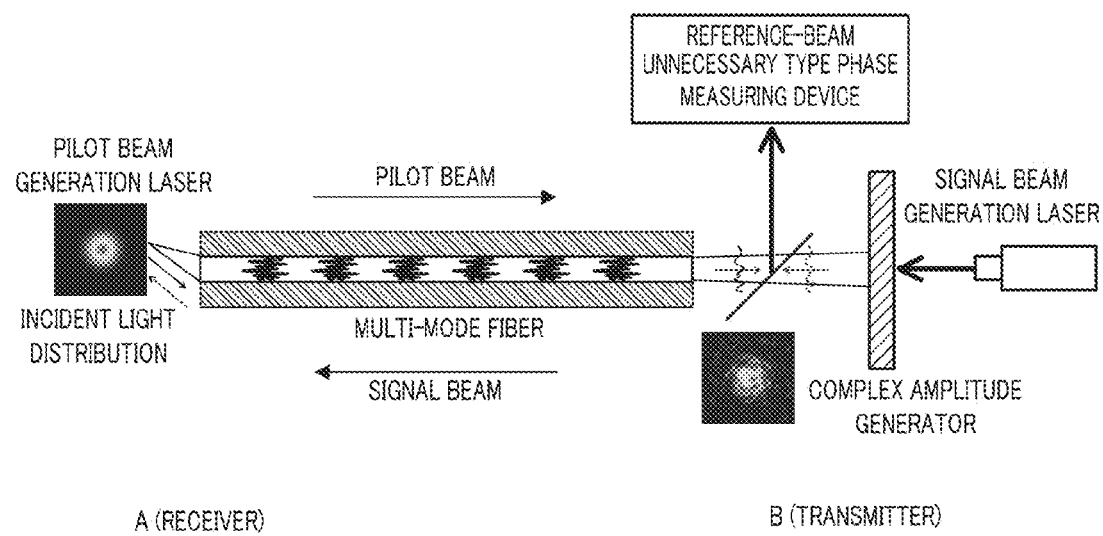
FIG. 36 is mode dispersion compensation with use of the digital phase conjugator.

A concept of mode dispersion compensation of the embodiment of the present invention is illustrated in FIG. 36. A pilot beam (which is different from the signal beam used for the communication, but is light used for reading out fiber distortion) is emitted into a fiber from A (receiver), and is transmitted to B (transmitter). Similarly to the case of FIG. 35, at B (transmitter), a mode component which has received distortion by the fiber is emitted from the fiber. In the present method, the spatial phase information (more correctly, complex amplitude distribution) of the mode component which has received distortion is measured by a reference-beam unnecessary type phase measuring device. Phase distribution −Φ (x, y) which is obtained by inverting the sign of measured phase distribution Φ (x, y) is displayed on a complex amplitude generator placed in the transmitter. The complex amplitude generator is irradiated with a time-series signal (optical signal to be transmitted) generated with use of a signal-generating laser, to thereby obtain phase conjugate waves. Phase conjugate waves generated in B (transmitter) have a wavefront identical to that of the pilot beam emitted from the fiber, and are automatically coupled to the fiber by the property of phase conjugate waves, and then, transmitted to A (receiver). The signal beam reversely propagated to A (receiver), at a position where the pilot beam is initially generated. Accordingly, by disposing the light detector at that position, a signal beam which is not influenced by mode dispersion can be received.

In the above description, phase distribution −Φ (x, y) obtained by inverting the sign of phase distribution −Φ (x, y) is displayed on the complex amplitude generator. To be more correct, phase conjugate distribution F* (x, y) of detected complex amplitude distribution F (x, y) (note that "*" denotes mathematical phase conjugation) is displayed on the complex amplitude generator. This is referred to as "digital phase conjugation." In addition, examples of the configuration of the complex amplitude generator include a configuration using two spatial light modulators of a spatial light modulator for phase and a spatial light modulator for amplitude, and a configuration in which a hologram pattern is displayed on one spatial light modulator and a required complex amplitude distribution is obtained with use of a primal diffraction beam.

(3) Operation of Spatial Light Modulator (SLM) in Digital Phase Conjugator

Figure 37:
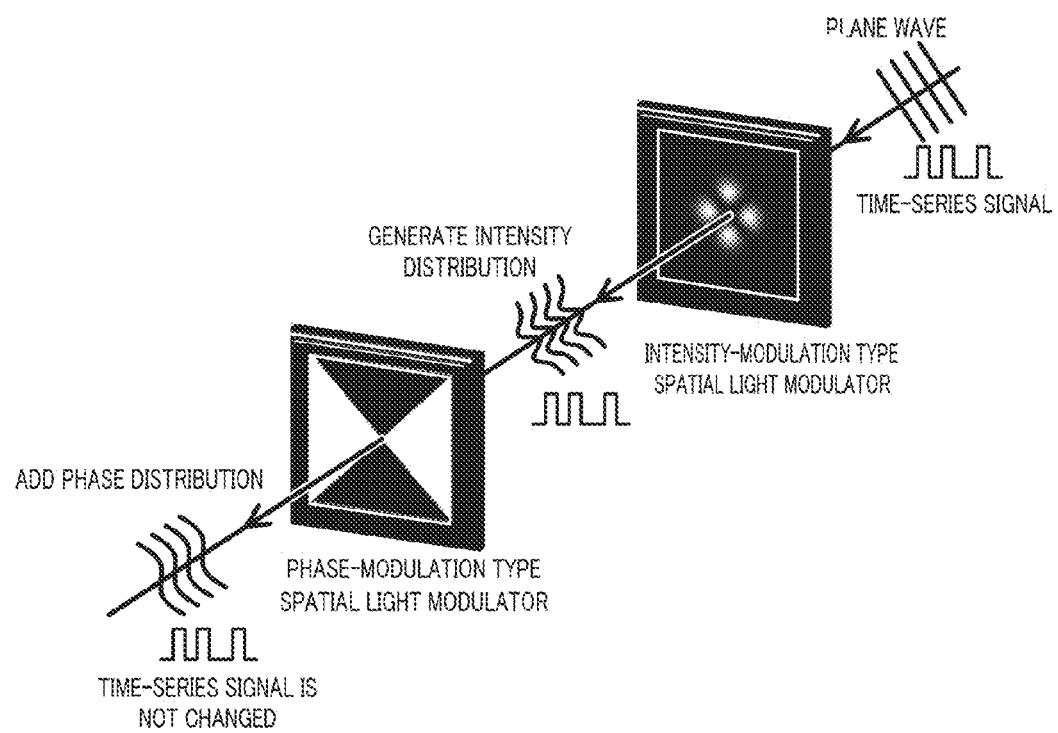
FIG. 37 illustrates generation of a complex amplitude distribution with use of two spatial light modulators.
Figure 38:
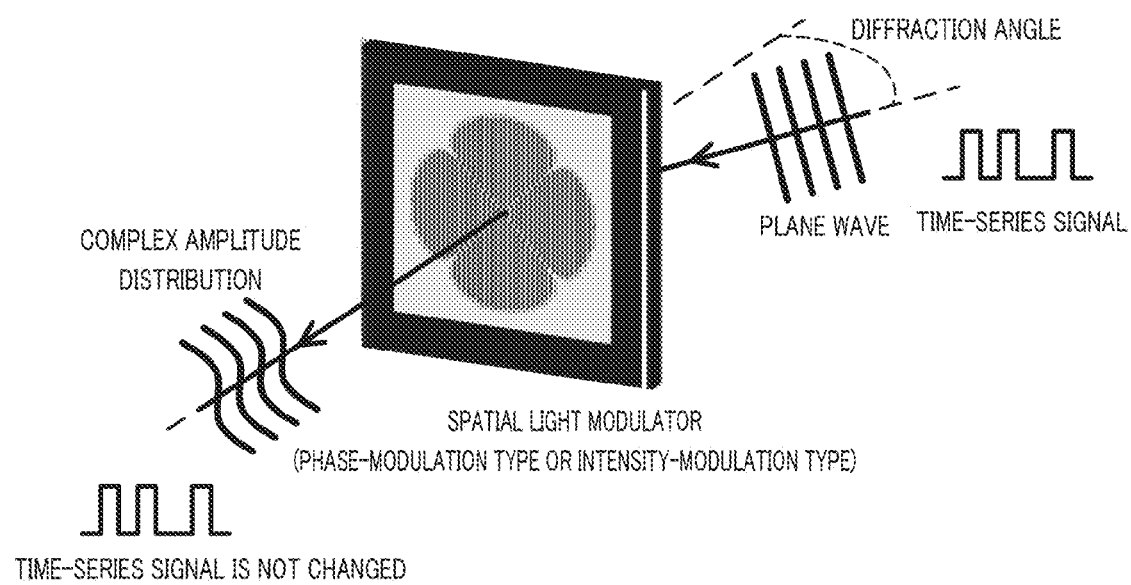
FIG. 38 illustrates generation of a complex amplitude distribution with use of one spatial light modulator.

In the digital phase conjugator illustrated in FIG. 28, the wavefront is detected by a reference-beam unnecessary type phase measuring device, and a phase conjugate complex amplitude distribution is generated with use of a spatial light modulator (SLM). Here, the SLM is a device that can spatially modulate the intensity of optical waves or the phase distribution. Various mechanisms of SLMs have been proposed, and SLMs are typically configured with use of a liquid crystal panel, and can be modulated pixel by pixel by a computer. However, since SLMs can control only one of strength and phase, two SLMs are used as illustrated in FIG. 37, or a computer generated hologram (CGH) is utilized as illustrated in FIG. 38 in the case of generation of a complex amplitude distribution where both of strength and phase have to be controlled. The CGH is a hologram computed by a computer, and a complex amplitude distribution (signal beam) simulated in a calculator can be generated by emitting optical waves (reference beam) into the CGH.

In the example illustrated in FIG. 37, first, an intensity distribution is given to plane waves at an intensity-modulation type SLM, and then a phase distribution is given at a phase-modulation type SLM. In this manner, a complex amplitude distribution (wavefront) can be freely generated to a certain degree. In general, in a SLM, when one of strength and phase is controlled, the other is also undesirably modulated, and therefore such a feature of a SLM has to be taken into consideration to give a correct modulation. In addition, the panel of a SLM has a structure in which pixels are laid out in a matrix, and therefore, when optical waves pass through the panel, diffraction phenomenon corresponding to the matrix layout is caused, thus generating noise. Further, since two SLMs are utilized, there are many disadvantages such as increase in size of the system and huge loss.

In contrast, in the example illustrated in FIG. 38 in which a CGH is utilized, a complex amplitude distribution can be generated with one SLM, and moreover the angle at which a signal beam is generated and diffracted can be freely set to a certain degree. Thus, the diffraction component that results in noise can be removed. Moreover, it is possible to accurately generate a complex amplitude distribution with use of either of the phase-modulation type SLM or the intensity-modulation type SLM. It should be noted that, while the diffraction efficiency is 6% or lower in the intensity-modulation type SLM, the diffraction efficiency of 33% or lower can be achieved in the phase-modulation type SLM.

In both of the examples of FIG. 37 and FIG. 38, a time-series signal can be given to input plane waves. At this time, the time-series signal is transmitted without being influenced by the spatial light modulator, and thus a communication with use of a phase conjugate beam is achieved.

To generate a phase conjugate beam, other than the method using a SLM, a method using a deformable mirror (with minute mirror arrangement, each is mechanically controlled to control wavefront) may also be employed. While the means for generating a complex amplitude distribution is not limited in the optical communication apparatus according to the embodiment of the present invention, it is preferable to adopt a method of generating a phase conjugate beam with use of a CGH (FIG. 38) in which no movable part is provided and both of the phase and strength can be freely set.

Figure 39:
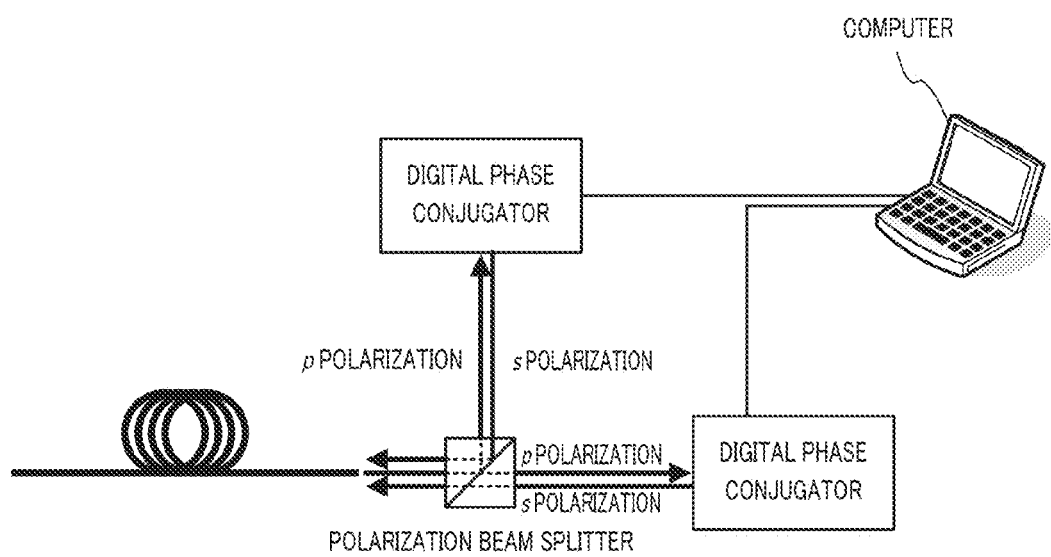
FIG. 39 illustrates polarization diversity measurement and polarization mode compensation by a polarization plane-holding digital phase conjugator.
Figure 40:
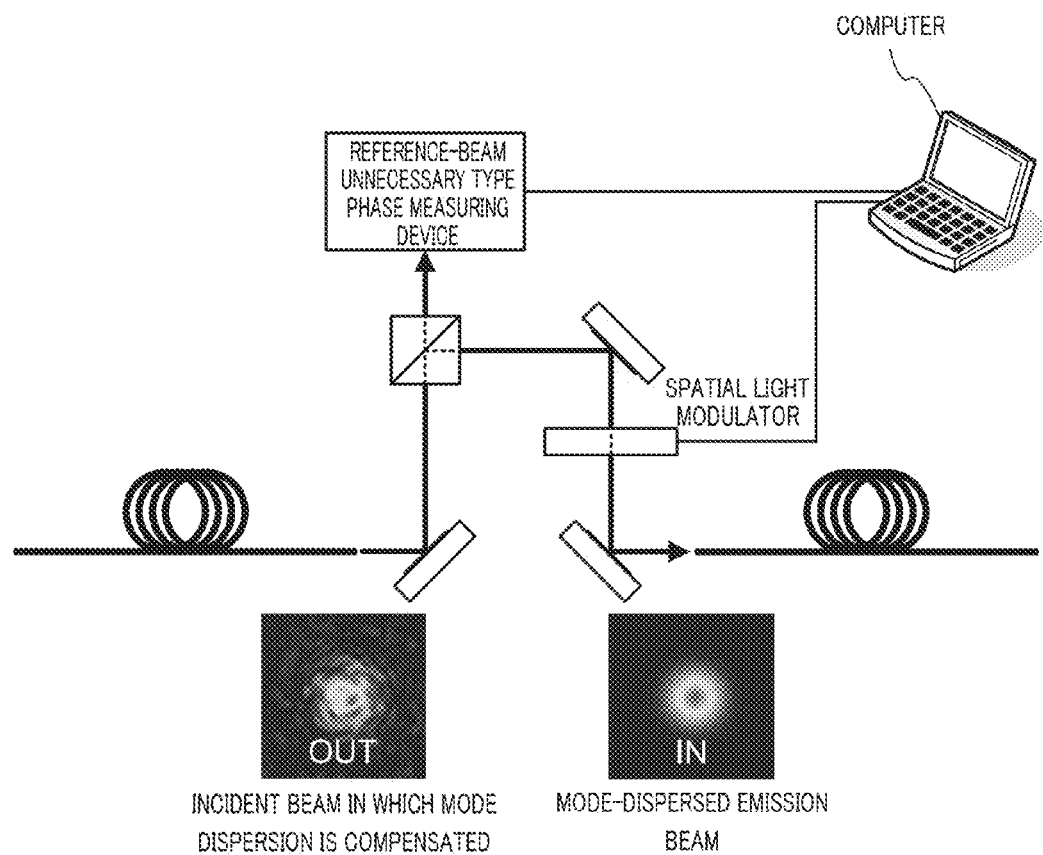
FIG. 40 illustrates a mode dispersion compensation system of the reference-beam unnecessary type phase measuring device and the spatial light modulator.
Figure 41:
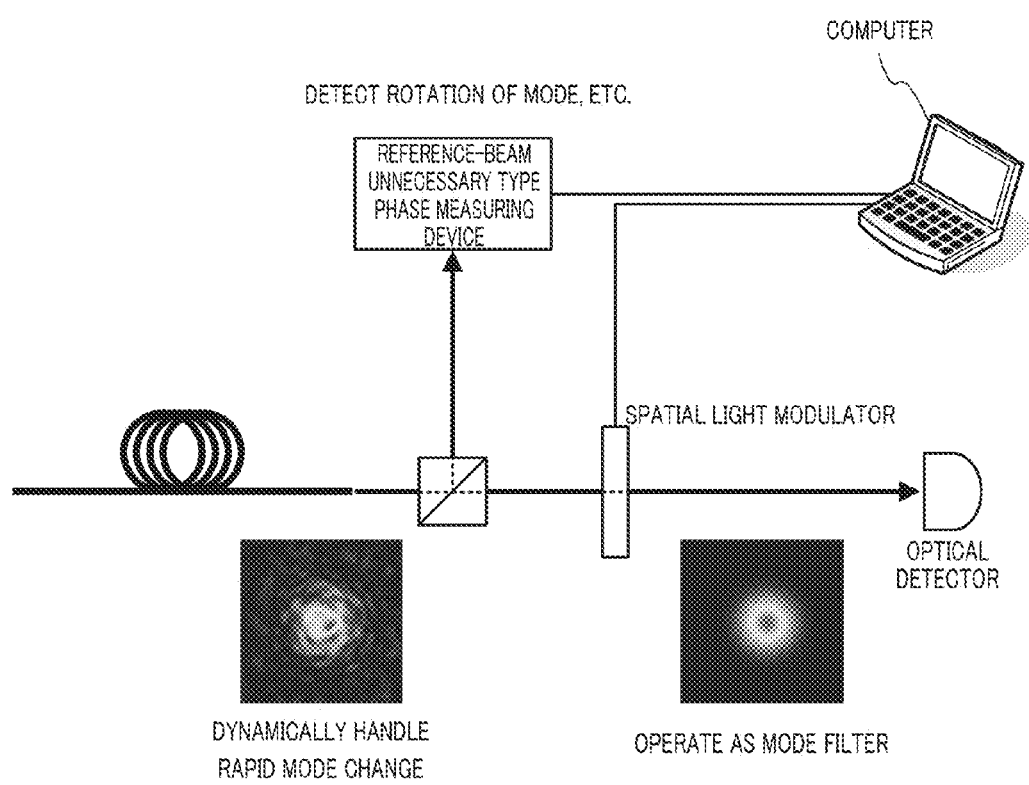
FIG. 41 illustrates an adaptive mode filter using the reference-beam unnecessary type phase measuring device and the spatial light modulator.
Figure 42:
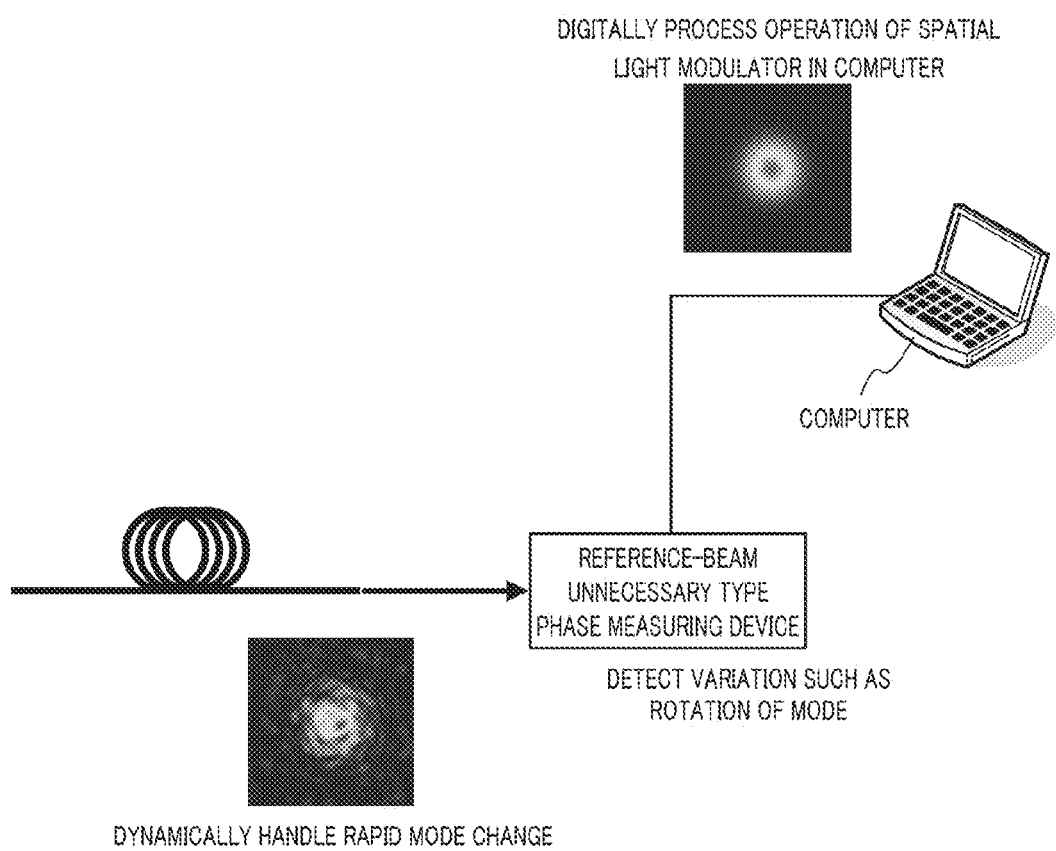
FIG. 42 illustrates a digital mode filter using the reference-beam unnecessary type phase measuring device.

(4) Applications of Reference-Beam Unnecessary Type Phase Measuring Device and Digital Phase Conjugator When digital phase conjugators are operated for each polarization as illustrated in FIG. 39, not only dispersion of a spatial mode but also dispersion of a polarization mode can be compensated, and therefore high usability can be achieved. In addition, as illustrated in FIG. 40, in a phase conjugator having the reference-beam unnecessary type phase measuring device according to the embodiment of the present invention a signal beam distorted in a propagation process in an optical fiber can be converted by a spatial light modulator so as to compensate for the mode dispersion. Further, in addition to the compensation of mode dispersion, this phase conjugator can also be operated as a mode filter that extracts only a certain mode component. Accordingly, as illustrated in FIG. 41, it is possible to configure a mode filter that can appropriately and dynamically handle varying mode distribution. While use of a spatial light modulator is assumed in the examples illustrated in FIG. 40 and FIG. 41, dispersion compensation and filtering of mode can be performed with a more simplified system by simulating the operation of the spatial light modulator in a calculator as illustrated in FIG. 42.

Figure 43:
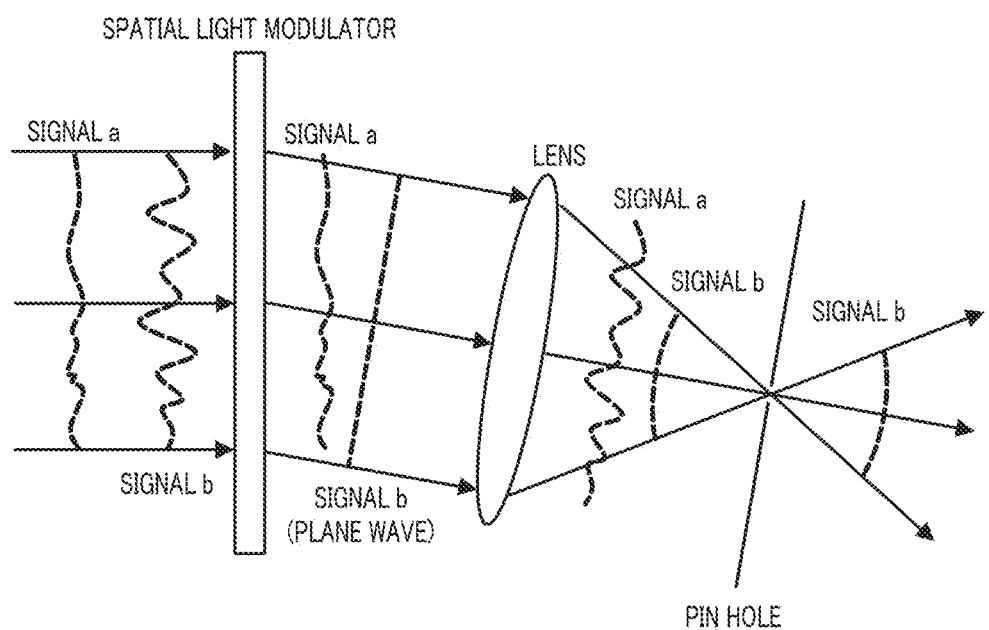
FIG. 43 illustrates a separator for a mode diffusion multiplex signal.

By utilizing the functions of the mode dispersion compensation and the mode filtering, a separator of mode multiplex signals can be manufactured as illustrated in FIG. 43. In the example illustrated in FIG. 43, the spatial light modulator is configured to convert the wavefront of signal b into a plane wave when signal a and signal b have different wavefronts (modes). When signal a and signal b are simultaneously incident on the spatial light modulator, the wavefront of signal a is converted into a wavefront different from the original wavefront, but is not converted into a plane wave. On the other hand, the wavefront of signal b is converted into a plane wave. Thereafter, only signal b converted into a plane wave is allowed to be transmitted by a space filter composed of a lens and a pin hole. Most of signal a is blocked by the pin hole and is not allowed to be transmitted. Thus, the separator illustrated in FIG. 43 can isolate a certain spatial mode.

Figure 44A:
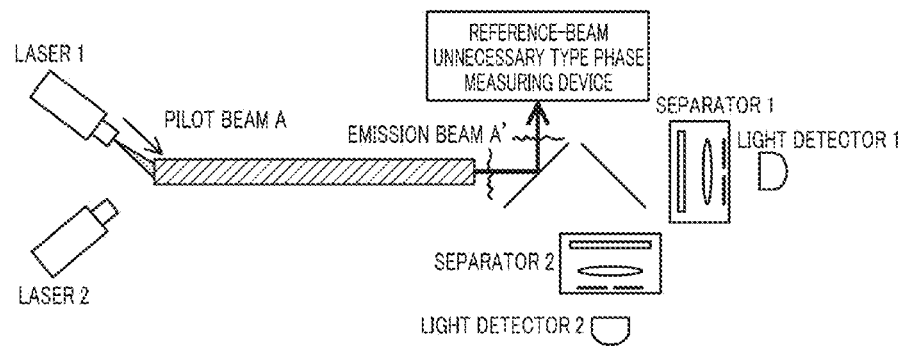
FIGS. 44A to 44C illustrate a multiplex communication system using a separator for a mode signal.
Figure 44B:
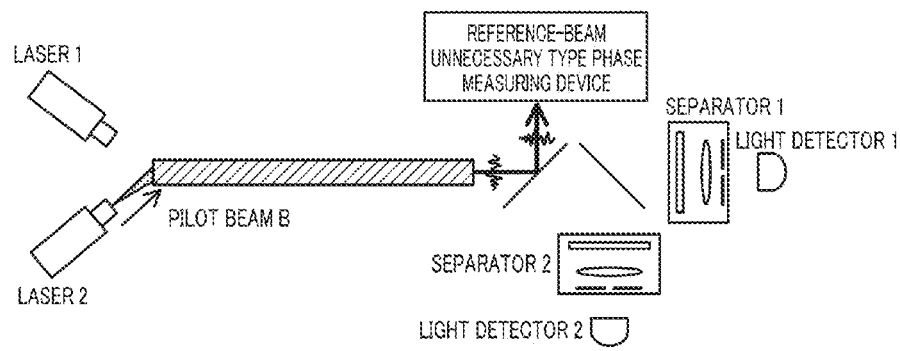
Figure 44C:
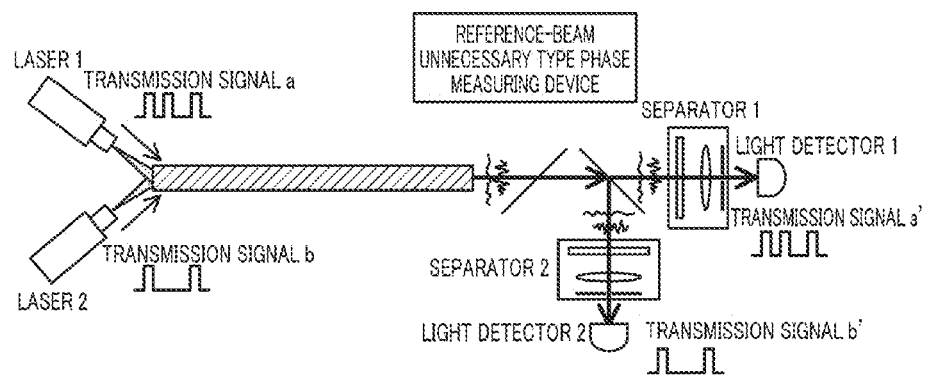

FIGS. 44A to 44C illustrate an example where a mode diffusion multiplex communication system is configured without generating a phase conjugate beam as illustrated in FIG. 29 to FIG. 31. In this system, the light source of a pilot beam can be used (shared) also as the light source of a signal beam, and thus the number of components can be reduced. First, as illustrated in FIG. 44A, pilot beam A is incident on a fiber, and the complex amplitude of a resulting emission beam is observed with use of a reference-beam unnecessary type phase measuring device. In the same manner, the complex amplitude of pilot beam B is observed. Next, as illustrated in FIG. 44B, phase conjugate distributions of observed complex amplitude distributions are displayed on a spatial light modulator of a separator. At this time, by performing the filtering operation illustrated in FIG. 43 in separator 1 and separator 2, a signal beam can be independently detected as illustrated in FIG. 44C. For example, when a computer generated hologram of emission beam B' of pilot beam B is displayed on the spatial light modulator in separator 2, only the component of signal b of mode diffusion multiplex signals a and b incident thereon is diffracted as a plane wave. Since a plane wave can be collected at a point with use of a lens, the component of signal a is effectively removed by the pin hole, and thus only the component of signal b can be extracted. Likewise, only the component of signal a can be extracted in separator 1.

Figure 45:
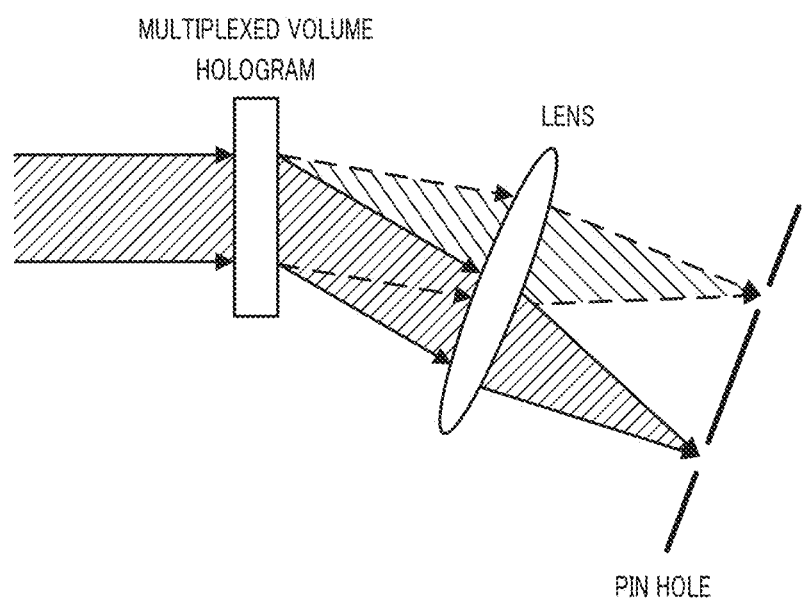
FIG. 45 illustrates simultaneous separation of multiple signals with use of a multiplexed hologram.

In the configuration illustrated in FIGS. 44A to 44C, the number of the spatial light modulators has to match the number of signals to be multiplexed. However, with use of a volume hologram as illustrated in FIG. 45, holograms can be recorded in one place in a multiplexed manner, and multiple signals can be simultaneously separated, whereby the system can be considerably simplified.

It should be noted that, unlike the system illustrated in FIG. 29 to FIG. 31, the system illustrated in FIGS. 44A to 44C does not generate a phase conjugate beam, and therefore cannot compensate for the coupling and conversion of modes. For this reason, when mode diffusion signals a and b contain a common mode component, the component may cause crosstalk. However, since this crosstalk component can be removed by performing a MIMO process, the communication quality is not considerably degraded.

It is to be noted that the above-mentioned separator may be achieved by the digital process illustrated in FIG. 42. In this case, the spatial light modulator, the volume hologram and the like are not required to be prepared, and the number of the phase measuring device required to be prepared is one. To be more specific, first, the emission beam distribution of each pilot beam is observed by a phase measuring device, and the complex amplitude distribution is stored. Next, a multiplex signal beam is transmitted, and observed. For the complex amplitude distribution of an observed multiplex signal beam, the above-mentioned filtering principle is simulated and each signal is detected. Simulation of a filtering operation following the signal transmission rate requires extremely high arithmetic speed, but the process speed can be improved to a practical level by development of a dedicated arithmetic circuit and a high speed operation utilizing a parallel operation.

The above-mentioned application techniques are applicable to not only a mode diffusion multiplex communication, but also to a mode division multiplex communication. In particular, the phase measurement technique and the filtering technique are extremely useful for achieving a mode separator and for solving the problem of increase in crosstalk due to a conversion and coupling of modes in the mode division multiplex communication.

In the following, the present invention will be described in detail referring Examples, but the present invention is not limited to the examples.

EXAMPLES

Example 1

In Example 1, in the phase measurement method according to the embodiment of the present invention and a conventional phase measurement method, the measurement accuracy and the effect of compensating for non-uniformity of the intensity distributions of two holograms were quantitatively evaluated.

When the phase measurement method according to the embodiment of the present invention is applied in holographic diversity interferometry, since two holograms are simultaneously acquired by generating copies of an object beam, no difference in intensity distribution of the object beam is ideally caused between holograms even when the measurement target dynamically varies. However, in practice, depending on the roughness of the surface shape of the optical device and the difference of the light path, the two holograms may have slightly different information. As described above, the phase measurement method according to the embodiment of the present invention can compensate for non-uniformity of intensity distributions of object beams and reference beams between holograms, which could not be compensated and have been undesirably caused in an actual system in the past.

In Example 1, in order to quantitatively evaluate the compensation effect of the phase measurement method according to the embodiment of the present invention, the accuracy of measurement of phase information of an object beam was determined in the state where the intensity distributions of an object beam and a reference beam in one of two holograms are changed, to thereby evaluate the compensation effect for the variation in light intensity between holograms.

Figure 46A:
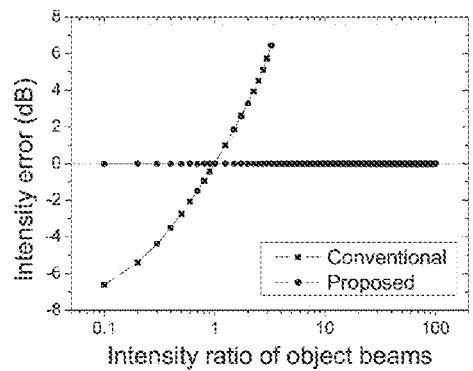
FIGS. 46A to 46D are graphs of measurement errors expressed by Expression (41) in the phase measurement method according to the embodiment of the present invention, versus measurement errors in a conventional phase measurement method given by Expression (25)
Figure 46B:
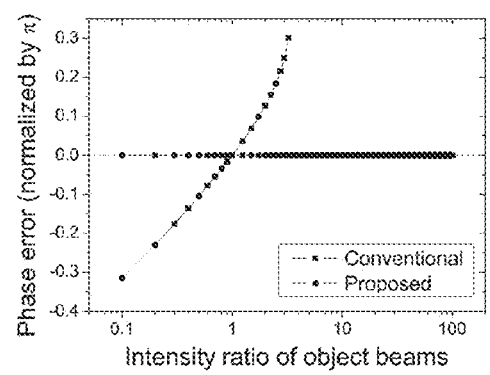
Figure 46C:
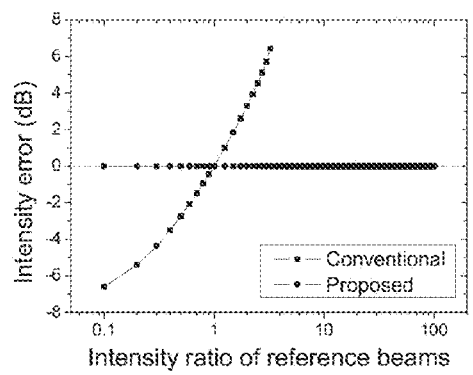
Figure 46D:
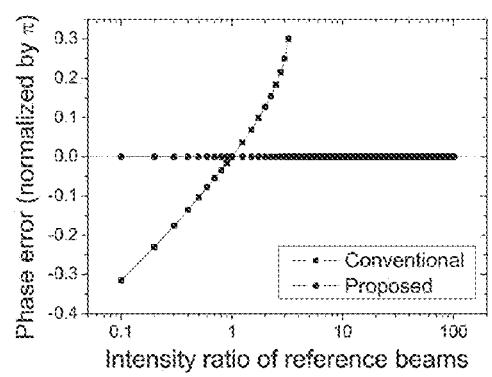

FIGS. 46A to 46D are graphs of measurement errors (black circle; Proposed) in the phase measurement method according to the embodiment of the present invention expressed by Expression (41) versus measurement errors (black square; Conventional) in a conventional phase measurement method. FIG. 46A and FIG. 46B show measurement errors in the case where the intensity of the object beam is changed, and FIG. 46C and FIG. 46D show measurement errors in the case where intensity of the reference beam is changed. The intensity ratio of object beams between two holograms is defined as $|O_2|^2/|O_1|^2$, which is the ratio of Expression (27) and Expression (28). The intensity ratio of the reference beams (first reference beam and second reference beam) between the two holograms is defined as $|R_2|^2/|R_1|^2$, which is the ratio of Expression (29) and Expression (30). It is to be noted that the measurement error was computed on the basis of the object beam used for making hologram $H_1$. Accordingly, the intensity measurement error is defined as Expression (84), and the phase measurement error is defined as Expression (85).

[Expression 30]

$$E_i \equiv 10\log\left(\frac{|O|^2}{|O_1|^2}\right) \quad (84)$$

$$E_p \equiv \frac{\phi - \phi_1}{\pi} \quad (85)$$

Where O and $\phi$ are an object beam and its phase computed by the conventional phase measurement method of Expression (25) or the phase measurement method according to the embodiment of the present invention Expression (41). In addition, $O_1$ and $\phi_1$ are an object beam and its phase used for making hologram $H_1$. Intensity $|O_1|^2$ of object beam $O_1$ is 1.0, and phase $\phi_1$ of object beam $O_1$ is $\pi/2$.

In the conventional phase measurement method, the measurement error was significantly caused in response to a change in the intensity of the object beam and a change in the intensity of the reference beam (black square; Conventional). In contrast, in the phase measurement method according to the embodiment of the present invention, no measurement error was caused without being influenced by a change of the intensity of object beam and a change in the intensity of the reference beam (black circle; Proposed). From the above, it is found that the phase measurement method according to the embodiment of the present invention achieves an extremely excellent compensation effect for the light intensity ratio between holograms. It can be said from the above results that, when the intensity ratio of the object beams $|O_2|^2/|O_1|^2$ is 0.5 for example, $E_i$=−2.740 dB, and $E_p$=−0.104π in the conventional phase measurement method, thus causing a large measurement error. In contrast, in the phase measurement method according to the embodiment of the present invention, no measurement error in intensity and phase is caused, and $E_i$=0 dB and $E_p$=0π. It is to be noted that FIG. 46A and FIG. 46C, and, FIG. 46B and FIG. 46D, are respectively different from each other in that the abscissa represents the intensity ratio of the object beams or the intensity ratio of the reference beams, but the numerical values used therein are not different from each other.

Example 2

In Example 1, the measurement error with respect to the light intensity ratio between holograms was determined to quantitatively show the effect of intensity compensation of the phase measurement method according to the embodiment of the present invention. Example 2 assumes an actual system in which a large intensity difference exists between holograms, and the phase measurement operation was confirmed by a computer simulation.

Figure 47A:
FIGS. 47A to 47H are images showing results of a simulation of the phase measurement method according to the embodiment of the present invention and a conventional phase measurement method.
Figure 47B:
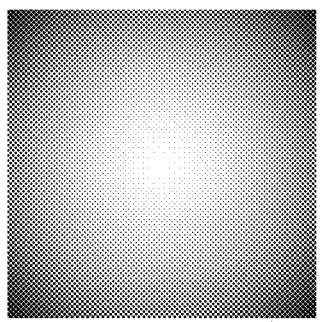
Figure 47C:
Figure 47D:
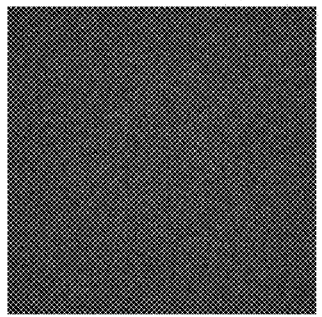

FIGS. 47A to 47H show results of numerical calculation acquired by a computer simulation in processes of the phase measurement. FIG. 47A and FIG. 47B are the intensity distribution and the phase distribution of the object beam assumed as the measurement target. In Example 2, as with Example 1, non-uniformity in intensity distribution is given to one of two holograms, to thereby provide a difference in intensity distribution between the holograms. FIG. 47C shows reference hologram $H_1$. This hologram is made from the object beam illustrated in FIG. 47A and FIG. 47B, and the reference beam in which the intensity distribution and the phase distribution are uniform. FIG. 47D shows hologram $H_2$ whose phase is shifted by π/2 from hologram $H_1$. Hologram $H_2$ was made by shifting the phase of the reference beam of hologram $H_1$ by π/2, and by applying a spatially random intensity modulation to the intensity distribution of the object beam and the intensity distribution of the reference beam. This application of intensity modulation was achieved by multiplying the object beam and the reference beam by random coefficients in a range of 0.100 to 1.000 pixel by pixel. By making two holograms in this manner, non-uniformity of the intensity distribution between holograms due to the difference of the light path and the difference in sensitivity of the imaging device was re-created.

Figure 47E:
Figure 47F:
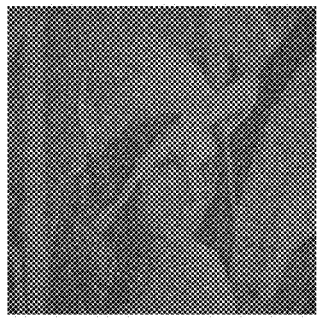
Figure 47G:
Figure 47H:
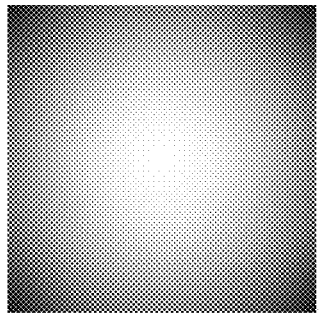

From these two holograms, by the conventional phase measurement method and the phase measurement method according to the embodiment of the present invention, the original intensity distribution and the phase distribution of the object beam were computed. FIG. 47E and FIG. 47F are the intensity distribution and the phase distribution of the object beam computed by the conventional phase measurement method. FIG. 47G and FIG. 47H are the intensity distribution and the phase distribution of the object beam computed by the phase measurement method according to the embodiment of the present invention. From FIG. 47G and FIG. 47H, it is found that the phase measurement method according to the embodiment of the present invention can perfectly reproduce the original object beam illustrated in FIG. 47A and FIG. 47B. It is found from the above results that the phase measurement method according to the embodiment of the present invention can significantly compensate for the measurement error which has been undesirably caused in the conventional phase measurement method.

Example 3

In Example 3, results of a case where the phase measurement method according to the embodiment of the present invention was performed with use of a two-channel holographic diversity interferometer are shown.

Figure 48A:
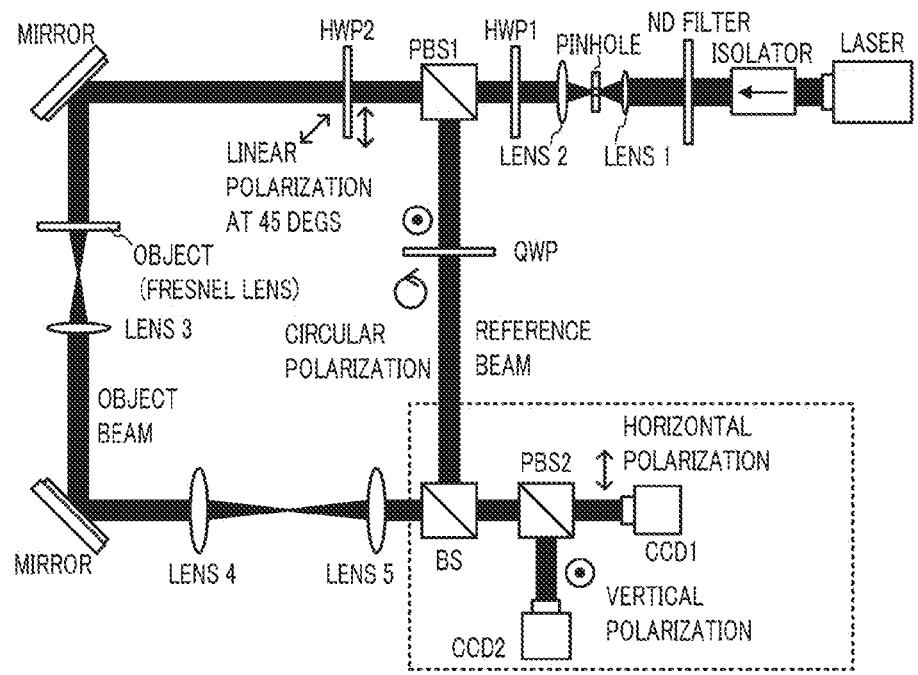
FIGS. 48A and 48B illustrate a configuration of an experiment system in Example 3.
Figure 48B:
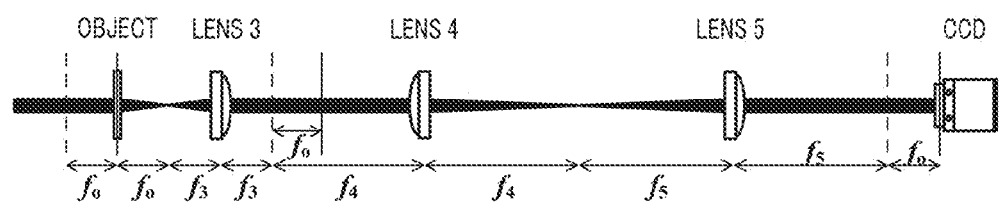

FIGS. 48A and 48B illustrate a configuration of an experiment system. FIG. 48A illustrates a general configuration of the experiment system, and FIG. 48B illustrates a positional relationship between an inspection object (Object) and an imaging device (CCD). In FIG. 48B, the reference symbol f represents the focus distance of each optical device. $f_o$ and $f_3$ are 100 mm, and $f_4$ and $f_5$ are 300 mm. In this experiment, in order to show the high accuracy of the measurement, as an object that allows for estimation of the intensity distribution and the phase distribution of the object beam, Fresnel lens (3259232592-L; EDMUND OPTICS, INC; focus distance 100 mm) was used as an inspection object. Since the inspection object is a condenser lens, to collimate the object beam lens 3 (Lens 3) was placed at a position of 100 mm from the rearward focus of the Fresnel lens. Since lens 3 used here has a focus distance same as that of the Fresnel lens of the inspection object, the complex amplitude distribution intended to be observed is recorded at a position of 100 mm from the rearward focus of lens 3. The object beam thus collimated is observed by a two-channel holographic diversity interferometer shown by the broken line, to thereby acquire two holograms required for computing the complex amplitude of the object beam. It is to be noted that lens 4 (Lens 4) and lens 5 (Lens 5) are 4f optical systems, and were used to transmit the object beam imaged by lens 3 to the imaging surface of two CCDs.

Figure 49A:
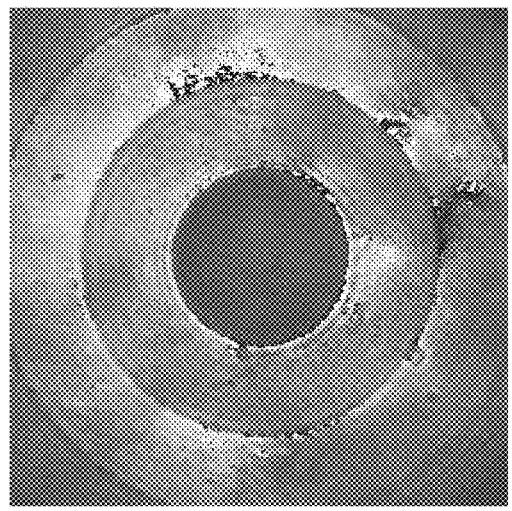
FIGS. 49A and 49B are images showing results of measurement in Example 3.
Figure 49B:
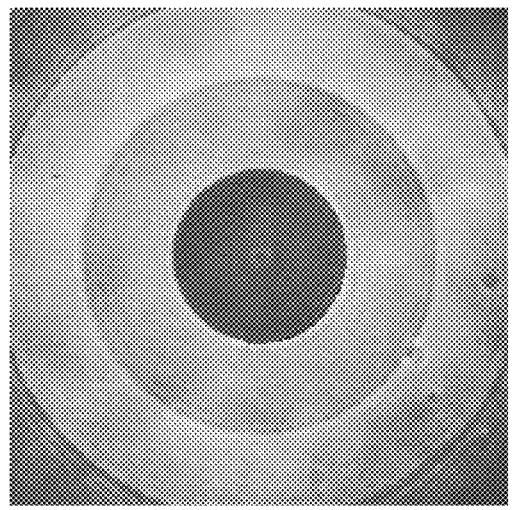

FIG. 49A is an image illustrating a phase distribution measured by the conventional phase measurement method, and FIG. 49B is an image illustrating a phase distribution measured by the phase measurement method according to the embodiment of the present invention. A Fresnel lens is manufactured such that a phase changes in a ring-band shape, and the surface of a Fresnel lens is very precisely worked with an accuracy of wavelengths. The images which can be seen in both of FIG. 49A and of FIG. 49B and do not match the regularity of the ring band are dust and the like on the image inspection object or the imaging device. On the other hand, irregular black regions which can be seen only in FIG. 49A are portions where calculation could not be performed and therefore no value could be obtained. The black regions show that a large measurement error was caused. The portions where the values have not computed are not found in the phase distribution measured by the phase measurement method according to the embodiment of the present invention (FIG. 49B). The results thus obtained show that the phase measurement method according to the embodiment of the present invention achieves a highly accurate measurement.

Example 4

In Example 4, an exemplary case where the distance between the imaging device and the inspection object was measured with use of the experiment system of Example 3.

The phase of the object beam measured by digital holography is wrapped in a range of 0 to $2\pi$ when it is computed. Thus, a measured phase distribution contains information of the three-dimensional shape of the object (the depression and projection of the recorded object). To extract the information, an unwrapping process has to be performed on the phase distribution. In the case where the inspection object has vertically large and sharp irregularities, it is difficult to correctly perform the unwrapping process (process of restoring a phase value greater than $2\pi$), and therefore it is difficult to acquire a correct three-dimensional shape.

Under such circumstances, the following shows that the three-dimensional shape of an object having a large vertical differences can be acquired with high accuracy with use of the digital holography with the contrast detection system and the optical wave propagation analysis method which is widely accepted as an auto-focusing function of digital cameras. In the distance measurement shown in the present example, optical wave propagation is analyzed by a computer simulation, and therefore a driving section for scanning a lens and the like are not required, and propagation calculation can be performed forwardly and rearwardly of an imaging device by only inverting the sign of the phase factor in propagation calculation. Therefore, it is not necessary to change the optical system such as the interferometer. In addition, the accuracy at the time of computing the distance depends on the methods of the optical wave propagation analysis, and a resolution commensurate with wavelengths can be achieved.

The three-dimensional shape of an object having large vertical differences can be acquired by determining the distances from the imaging device to the farthest portion and the nearest portion of the inspection object. In the distance measurement of this example, the complex amplitude distribution of the object beam is determined from the two holograms acquired by the imaging device, the complex amplitude distribution in the inverse propagation process is computed by the optical wave propagation analysis on the basis of thus determined complex amplitude distribution, and the distance where a high contrast can be obtained is determined, whereby the distance from the imaging device to the inspection object is measured. For example, in Example 3, since the image of the object is imaged on the imaging surface as illustrated in FIG. 48B, a high contrast image can be obtained as illustrated in FIGS. 49A and 49B. In this case, the distance from the imaging device to the inspection object is 1600 mm, and the distance from the imaging surface to the image surface is 0 mm. At this time, when the imaging device or the inspection object is moved forward or rearward in the propagation direction of the optical waves, the imaging surface is shifted from the image surface, and the contrast of phase and intensity to be obtained is lowered. However, by performing propagation analysis of the optical waves, the position where high contrast is obtained over a wide range can be searched for, and the distance between the inspection object and the imaging device can be measured. When such technique is applied, it also is possible to measure the three-dimensional shape of an inspection object having vertically large irregularities which is difficult to apply the unwrapping process.

Figure 50:
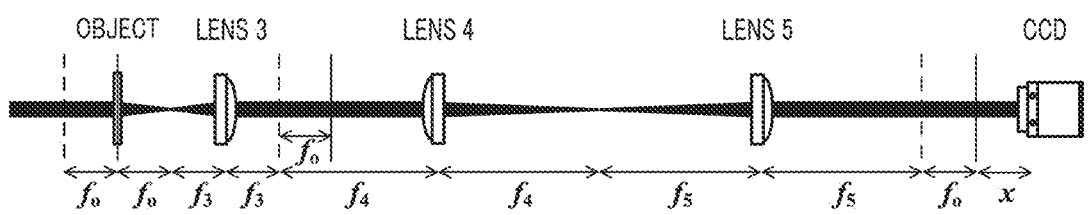
FIG. 50 illustrates a positional relationship between an inspection object and an imaging device in Example 4.
Figure 51A:
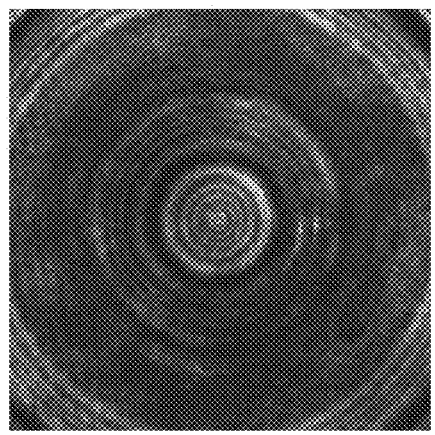
FIGS. 51A to 51D are images showing results of measurement in Example 4.
Figure 51B:
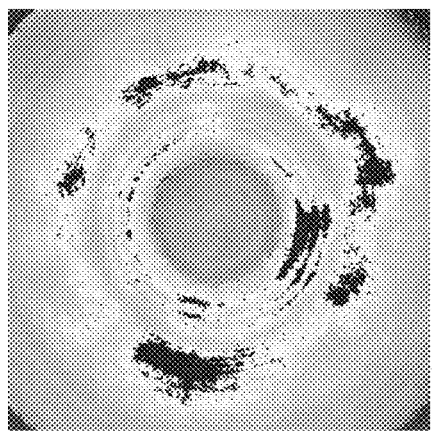
Figure 51C:
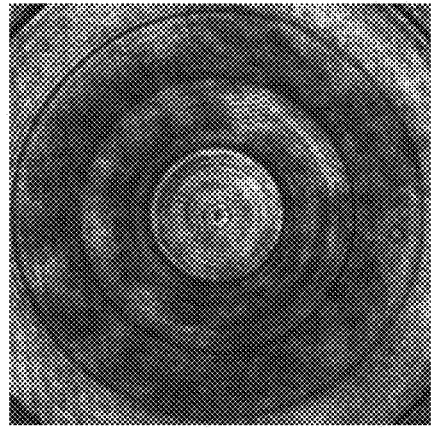
Figure 51D:
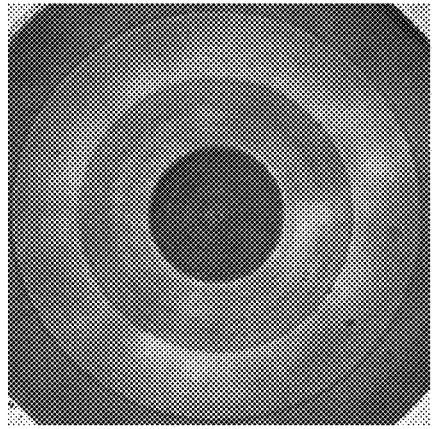

In Example 4, the distance between the imaging device and the inspection object was measured with use of the experiment system (FIGS. 48A and 48B) of Example 3. It is to be noted that, in this experiment, the position of the imaging device is shifted such that the positional relationship illustrated in FIG. 50 is obtained, and distance x was computed by the above-mentioned method. Results of the experiment are shown in FIGS. 51A to 51D. FIG. 51A and FIG. 51B are an intensity distribution and a phase distribution of an object beam detected on the imaging surface. FIG. 51C and FIG. 51D are respectively an intensity distribution and a phase distribution of an object beam obtained after a propagation calculation is performed from the imaging surface toward the inspection object by 5.2 mm. In FIG. 51A and in FIG. 51B, images were wholly blurred, and the contrast was low, whereas, in FIG. 51C and in FIG. 51D, the contrast was high in comparison with FIG. 51A and FIG. 51B. It is found from the above results that the distance between the imaging surface and the image surface is 5.2 mm.

It is to be noted that, while the contrast detection method can be performed only for the intensity distribution in the contrast detection system in digital cameras, the contrast detection method can be performed also for the phase distribution in the method shown in Example 4. Thus, in the method shown in Example 4, the distance can be precisely measured by using the intensity distribution and the phase distribution together. Accordingly, even when the inspection object is an object having vertically large and sharp irregularities, the phase measurement method according to the embodiment of the present invention can be applied as a method of acquiring the three-dimensional shape.

Example 5

In Example 5, an exemplary case is described where a phase of a beam emitted from a multi-mode fiber was measured with use of the reference-beam unnecessary type phase measuring device according to the embodiment of the present invention.

Figure 52:
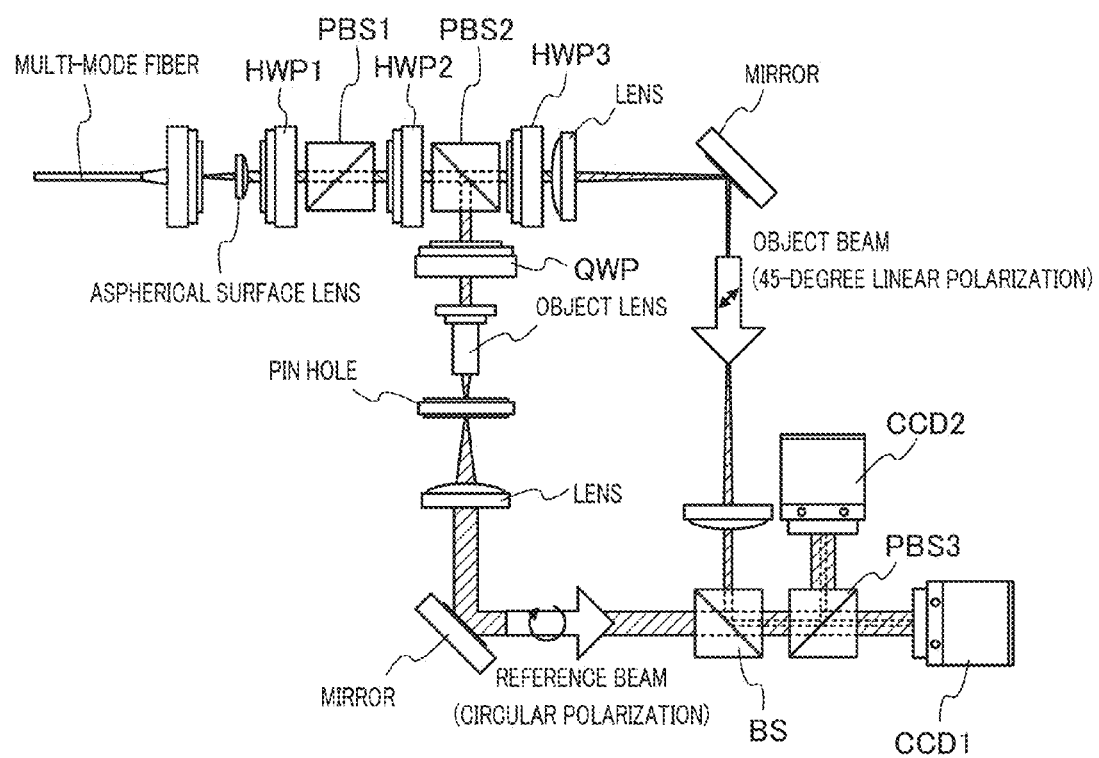
FIG. 52 illustrates a configuration of a reference-beam unnecessary type phase measuring device used in Example 5.

FIG. 52 illustrates a configuration of a reference-beam unnecessary type phase measuring device used in Example 5. A beam emitted from an optical fiber is greatly diffused in accordance with the numerical aperture (NA) of the fiber, and therefore it is necessary to collimate the beam with use of a lens. In this experiment, a beam emitted from an optical fiber is collimated with use of an aspherical surface lens, and further, the polarization direction and the power of the emission beam was adjusted with use of ½ wavelength plate 1 (HWP1) and polarization beam splitter 1 (PBS1). Thereafter, with use of polarization beam splitter 2 (PBS2), emission beam was split into components which become an object beam and reference beams (first reference beam and second reference beam). At this time, ½ wavelength plate 2 (HWP2) was used to adjust the intensity ratio of two optical waves split at PBS2.

The object beam (signal beam) split by PBS2 is converted into 45-degree linear polarization by ½ wavelength plate 3 (HWP3). An image of the rearward focus of an aspherical surface lens is imaged on two imaging devices (CCD1 and CCD2) by 4f optical system, beam splitter (BS) and polarization beam splitter 3 (PBS3).

On the other hand, the reference beam is converted into circular polarization by a ¼ wavelength plate (QWP). By a space filter composed of an object lens and a pin hole, only a low frequency component is extracted from the beam converted into circular polarization. The beam thus extracted has a spatially uniform phase distribution, and functions as a reference beam. The object beam and the reference beam generated in this manner were caused to interfere with each other with use of 2-channel holographic diversity interferometer, whereby two holograms whose phases are different from each other by 90 degrees were simultaneously acquired. From these two holograms, the intensity distribution and the phase distribution of the original object beam were computed by the conventional phase measurement method and the phase measurement method according to the embodiment of the present invention.

Figure 53A:
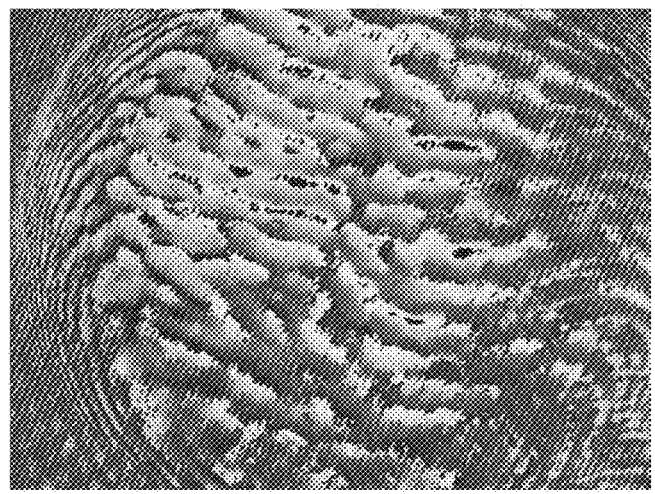
FIGS. 53A and 53B are images showing results of measurement in Example 5.
Figure 53B:
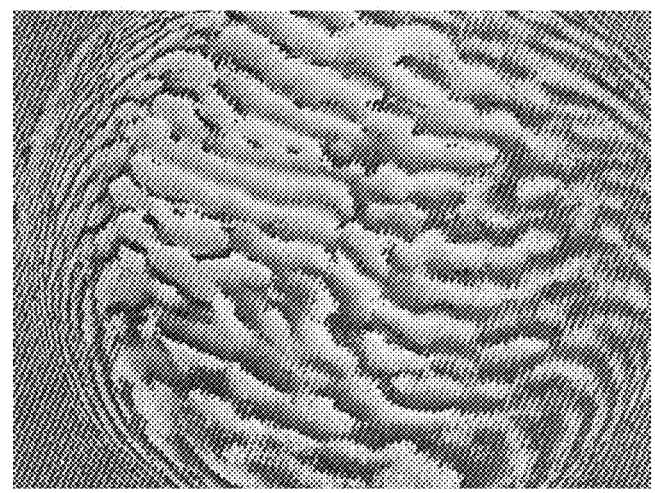

FIG. 53A is a phase distribution of a beam emitted from an optical fiber computed by the conventional phase measurement method. FIG. 53B is a phase distribution of a beam emitted from an optical fiber computed by the phase measurement method according to the embodiment of the present invention. In FIG. 53A, black portions which cannot be found in FIG. 53B show portions where no numerical value was computed. It is found from these results that the phase measurement method according to the embodiment of the present invention can significantly compensate for the measurement error which is undesirably caused in the conventional phase measurement method.

In Example 5, results of a case where the phase distribution of a beam emitted from a multi-mode fiber is measured is shown. The results of the measurement can be used for analyzing the composition and the rotation of the distribution of modes. In addition, it is also possible to perform a mode compensation by placing a spatial light modulator at a rearward focus position of the aspherical surface lens that collimates an emission beam, and by displaying a computer generated hologram on the spatial light modulator with use of the results of the analysis. Further, by measuring components split by polarization beam splitter 1 (PBS1) in the same manner, the phase measurement can be diversely performed for the polarization, and this can be applied to generation of a polarization hold type phase conjugate beam.

This application is entitled to and claims the benefit of Japanese Patent Application No. 2012-215000 filed on Sep. 27, 2012, the disclosure of which including the specification, drawings and abstract is incorporated herein by reference in its entirety.

INDUSTRIAL APPLICABILITY

The phase measuring device and the phase measurement method according to the embodiment of the present invention are applicable in various fields where phase measurement is required. For example, the phase measuring device and the phase measurement method according to the embodiment of the present invention are suitable for product inspection, biological measurement, optical communications, optical storage, optical information security and the like.

REFERENCE SIGNS LIST

BS beam splitter
CCD imaging device
HWP ½ wavelength plate
PBS polarization beam splitter
QWP ¼ wavelength plate

The invention claimed is:

1. An optical phase measuring method of measuring phase information contained in an object beam, the method comprising:
    detecting an intensity distribution of a test object beam in a first light intensity detection section and a second light intensity detection section;
    generating a first reference beam and a second reference beam which are different from each other in phase by changing a phase of a reference beam which is interferable with an object beam;
    detecting an intensity distribution of the first reference beam in the first light intensity detection section, and an intensity distribution of the second reference beam in the second light intensity detection section;
    making a first hologram from the object beam and the first reference beam, and a second hologram from the object beam and the second reference beam;
    detecting an intensity distribution of the first hologram in the first light intensity detection section, and an intensity distribution of the second hologram in the second light intensity detection section; and
    computing phase information contained in the object beam by directly using the intensity distribution of the test object beam, the intensity distribution of the first reference beam and the intensity distribution of the first hologram which are detected in the first light intensity detection section, and the intensity distribution of the test object beam, the intensity distribution of the second reference beam and the intensity distribution of the second hologram which are detected in the second light intensity detection section, without removing the intensity distribution of the test object beam and the intensity distribution of the first reference beam which are detected in the first light intensity detection section from the intensity distribution of the first hologram and without removing the intensity distribution of the test object beam and the intensity distribution of the second reference beam which are detected in the second light intensity detection section from the intensity distribution of the second hologram.

2. The optical phase measuring method according to claim 1, wherein the reference beam is generated by extracting a DC component from part of the object beam by spatial filtering.

3. An optical phase measuring device configured to measure phase information contained in an object beam, the optical phase measuring device comprising:
    a reference beam generation section configured to generate a first reference beam and a second reference beam which are different from each other in phase by changing a phase of a reference beam which is interferable with the object beam;
    a first hologram making section configured to make a first hologram from the object beam and the first reference beam;
    a second hologram making section configured to make a second hologram from the object beam and the second reference beam;
    a first light intensity detection section configured to detect an intensity distribution of a test object beam, an intensity distribution of the first reference beam and an intensity distribution of the first hologram;
    a second light intensity detection section configured to detect an intensity distribution of the test object beam, an intensity distribution of the second reference beam and an intensity distribution of the second hologram; and
    a processing section configured to compute phase information contained in the object beam by directly using the intensity distribution of the test object beam, the intensity distribution of the first reference beam and the intensity distribution of the first hologram which are detected in the first light intensity detection section, and the intensity distribution of the test object beam, the intensity distribution of the second reference beam and the intensity distribution of the second hologram which are detected in the second light intensity detection section, without removing the intensity distribution of the test object beam and the intensity distribution of the first reference beam which are detected in the first light intensity detection section from the intensity distribution of the first hologram and without removing the intensity distribution of the test object beam and the intensity distribution of the second reference beam which are detected in the second light intensity detection section from the intensity distribution of the second hologram.

4. The optical phase measuring device according to claim 3 further comprising:
    a second reference beam generation section configured to generate the reference beam by extracting a DC component from part of the object beam by spatial filtering.

5. The optical phase measuring device according to claim 4, wherein:
    the second reference beam generation section includes:
    a first beam splitter configured to split the object beam into two beams;
    a ½ wavelength plate configured to convert into 45-degree linear polarization a polarization state of one of the beams of the object beam split by the first beam splitter;
    a ¼ wavelength plate configured to convert into circular polarization a polarization state of the other part of the object beam split by the first beam splitter; and
    a space filter configured to extract a DC component from one of the object beam of the 45-degree linear polarization and the object beam of the circular polarization to generate the reference beam.

6. An optical communication apparatus comprising:
    the optical phase measuring device according to claim 5, the optical phase measuring device being configured to receive a pilot beam sent from an external communication apparatus via an optical fiber, and to measure spatial mode propagation information contained in the pilot beam;
    a phase conjugation calculation section configured to compute a light complex amplitude for cancelling conversion and rotation of a mode in the optical fiber based on spatial mode propagation information measured by the optical phase measuring device; and
    a transmission section configured to send a beam obtained by adding a time-series signal to a beam containing the light complex amplitude to the external communication apparatus via the optical fiber.

7. An optical communication apparatus comprising:
    the optical phase measuring device according to claim 4, the optical phase measuring device being configured to receive a pilot beam sent from an external communication apparatus via an optical fiber, and to measure spatial mode propagation information contained in the pilot beam;

a phase conjugation calculation section configured to compute a light complex amplitude for cancelling conversion and rotation of a mode in the optical fiber based on spatial mode propagation information measured by the optical phase measuring device; and a transmission section configured to send a beam obtained by adding a time-series signal to a beam containing the light complex amplitude to the external communication apparatus via the optical fiber.

8. An optical communication apparatus comprising:

the optical phase measuring device according to claim 3, the optical phase measuring device being configured to receive a pilot beam sent from an external communication apparatus via an optical fiber, and to measure spatial mode propagation information contained in the pilot beam;

a phase conjugation calculation section configured to compute a light complex amplitude for cancelling conversion and rotation of a mode in the optical fiber based on spatial mode propagation information measured by the optical phase measuring device; and a transmission section configured to send a beam obtained by adding a time-series signal to a beam containing the light complex amplitude to the external communication apparatus via the optical fiber.

\* \* \* \* \*